(12) United States Patent
Bhargava et al.

(10) Patent No.: US 12,309,819 B2
(45) Date of Patent: May 20, 2025

(54) METHODS AND APPARATUSES FOR RELAYING DATA IN WIRELESS NETWORKS

(71) Applicant: Board of Regents, The University of Texas System, Austin, TX (US)

(72) Inventors: Vidur Bhargava, Austin, TX (US); Sriram Vishwanath, Austin, TX (US); Jubin Jose, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/175,900

(22) Filed: Feb. 15, 2021

(65) Prior Publication Data
US 2021/0314961 A1 Oct. 7, 2021

Related U.S. Application Data

(63) Continuation of application No. 15/714,551, filed on Sep. 25, 2017, now Pat. No. 10,959,241, which is a
(Continued)

(51) Int. Cl.
*H04W 72/542* (2023.01)
*H04K 3/00* (2006.01)
(Continued)

(52) U.S. Cl.
CPC .......... *H04W 72/542* (2023.01); *H04K 3/222* (2013.01); *H04K 3/28* (2013.01);
(Continued)

(58) Field of Classification Search
CPC .... H04W 72/085; H04W 28/22; H04K 3/222; H04K 3/28
See application file for complete search history.

(56) References Cited

U.S. PATENT DOCUMENTS 6,680,907 B1 1/2004 Bonaventure
6,980,537 B1 12/2005 Liu
(Continued)

FOREIGN PATENT DOCUMENTS

CN 1663198 8/2005
CN 1716909 1/2006
(Continued)

OTHER PUBLICATIONS

Notice of Allowance issued in related U.S. Appl. No. 16/728,878 dated Sep. 16, 2021.
(Continued)

*Primary Examiner* — Kevin M Cunningham
(74) *Attorney, Agent, or Firm* — Pillsbury Winthrop Shaw Pittman LLP

(57) ABSTRACT

A hybrid cellular and non-cellular multi-hop communication device, including a hand-held wireless device having one or more antennas, a cellular wireless interface connected to at least some of the one or more antennas, and a non-cellular wireless interface connected to at least some of the one or more antennas. The non-cellular wireless interface may include a rate allocator configured to select a physical-layer rate of transmission of data from the non-cellular wireless interface based on a queue length of data to be transmitted from the hand-held cellular device and a transmitter configured to wirelessly transmit data from the queue and adjust physical-layer transmission parameters based on a physical-layer rate selected by the rate allocator.

22 Claims, 17 Drawing Sheets

Related U.S. Application Data continuation of application No. 13/813,349, filed as application No. PCT/US2011/045967 on Jul. 29, 2011, now Pat. No. 9,794,949, which is a continuation-in-part of application No. PCT/US2011/039180, filed on Jun. 3, 2011.

(60) Provisional application No. 61/369,181, filed on Jul. 30, 2010.

(51) Int. Cl.
  *H04W 28/22* (2009.01)
  *H04W 72/02* (2009.01)
  *H04W 16/14* (2009.01)
  *H04W 72/52* (2023.01)
  *H04W 72/541* (2023.01)
  *H04W 88/06* (2009.01)

(52) U.S. Cl.
  CPC ............ *H04K 3/45* (2013.01); *H04W 28/22* (2013.01); *H04W 72/02* (2013.01); *H04K 2203/16* (2013.01); *H04K 2203/18* (2013.01); *H04W 16/14* (2013.01); *H04W 72/52* (2023.01); *H04W 72/541* (2023.01); *H04W 88/06* (2013.01); *Y02D 30/70* (2020.08)

(56) References Cited

U.S. PATENT DOCUMENTS

| | | |
|---|---|---|
| 7,639,663 B1 | 12/2009 | Nerses et al. |
| 7,742,497 B2 | 6/2010 | Ganti et al. |
| 7,746,827 B2 | 6/2010 | Xue et al. |
| 7,969,910 B2 | 6/2011 | Barak et al. |
| 8,018,893 B2 | 9/2011 | Sartori et al. |
| 8,224,236 B2 | 7/2012 | Sukiasyan et al. |
| 8,284,721 B2 | 10/2012 | Chen et al. |
| 8,437,286 B2 | 5/2013 | Cai et al. |
| 8,478,283 B2 | 7/2013 | Periyalwar et al. |
| 8,504,053 B2 | 8/2013 | Hwang et al. |
| 8,520,630 B2 | 8/2013 | Ergen et al. |
| 8,665,760 B2 | 3/2014 | Sinivaara et al. |
| 8,737,912 B2 | 5/2014 | Ma et al. |
| 8,743,758 B1 | 6/2014 | Bhargava et al. |
| 8,908,609 B1 | 12/2014 | Naden et al. |
| 8,964,781 B2 | 2/2015 | Hunzinger et al. |
| 9,072,039 B2 | 6/2015 | Hu et al. |
| 9,148,908 B2 | 9/2015 | Bhargava et al. |
| 9,155,124 B2 | 10/2015 | Bhargava et al. |
| 9,363,006 B2 | 6/2016 | Bhargava et al. |
| 9,369,943 B2 | 6/2016 | Li et al. |
| 9,414,434 B2 | 8/2016 | Bhargava et al. |
| 9,451,514 B1 | 9/2016 | Michel et al. |
| 9,578,591 B2 | 2/2017 | Bhargava et al. |
| 9,794,949 B2 | 10/2017 | Bhargava et al. |
| 9,806,791 B2 | 10/2017 | Bhargava et al. |
| 9,942,921 B2 | 4/2018 | Bhargava et al. |
| 9,986,480 B2 | 5/2018 | Ta et al. |
| 10,123,268 B2 | 11/2018 | Bhargava et al. |
| 10,136,311 B2 | 11/2018 | Bhargava et al. |
| 10,205,505 B2 | 2/2019 | Michel et al. |
| 10,206,228 B2 | 2/2019 | Bhargava et al. |
| 10,292,019 B2 | 5/2019 | Ta et al. |
| 10,333,612 B2 | 6/2019 | Bhargava et al. |
| 10,517,027 B2 | 12/2019 | Ta et al. |
| 10,568,139 B2 | 2/2020 | Bhargava et al. |
| 10,575,170 B2 | 2/2020 | Bhargava et al. |
| 10,952,254 B2 | 3/2021 | Bhargava et al. |
| 10,959,241 B2 | 3/2021 | Bhargava et al. |
| 10,999,712 B2 | 5/2021 | Ta et al. |
| 11,240,844 B2 | 2/2022 | Bhargava et al. |
| 12,120,740 B2 | 10/2024 | Bhargava et al. |
| 2002/0042274 A1 | 4/2002 | Ades |
| 2002/0058502 A1 | 5/2002 | Stanforth |
| 2002/0077104 A1 | 6/2002 | Chen et al. |
| 2002/0136183 A1 | 9/2002 | Chen et al. |
| 2003/0235174 A1* | 12/2003 | Pichna ............... H04L 63/104 370/392 |
| 2004/0018849 A1* | 1/2004 | Schiff ............... H04W 52/267 455/427 |
| 2004/0023652 A1 | 2/2004 | Shah et al. |
| 2004/0192288 A1 | 9/2004 | Vishwanath |
| 2004/0196871 A1 | 10/2004 | Terry |
| 2004/0258092 A1 | 12/2004 | Sugaya |
| 2005/0002364 A1 | 1/2005 | Ozer et al. |
| 2005/0068229 A1 | 3/2005 | Moilanen et al. |
| 2005/0148315 A1 | 7/2005 | Sawada |
| 2005/0163144 A1 | 7/2005 | Srikrishna et al. |
| 2005/0239491 A1 | 10/2005 | Feder et al. |
| 2006/0002296 A1 | 1/2006 | Choi |
| 2006/0052099 A1 | 3/2006 | Parker |
| 2006/0133338 A1 | 6/2006 | Reznik et al. |
| 2006/0159053 A1 | 7/2006 | Donovan |
| 2006/0221999 A1 | 10/2006 | Bachrach et al. |
| 2007/0010196 A1 | 1/2007 | Periyalwar et al. |
| 2007/0015461 A1 | 1/2007 | Park et al. |
| 2007/0038743 A1 | 2/2007 | Hellhake et al. |
| 2007/0087756 A1 | 4/2007 | Hoffberg |
| 2007/0189256 A1 | 8/2007 | Oh et al. |
| 2007/0206551 A1 | 9/2007 | Moorti et al. |
| 2007/0238480 A1 | 10/2007 | Lin et al. |
| 2007/0248038 A1 | 10/2007 | Yamasaki et al. |
| 2007/0264932 A1 | 11/2007 | Suh et al. |
| 2007/0280172 A1 | 12/2007 | Tan et al. |
| 2007/0280188 A1 | 12/2007 | Kang et al. |
| 2007/0291715 A1 | 12/2007 | Laroia et al. |
| 2008/0031197 A1 | 2/2008 | Wang et al. |
| 2008/0043711 A1 | 2/2008 | Hart et al. |
| 2008/0045174 A1* | 2/2008 | Chen ............... H04B 7/2606 455/187.1 |
| 2008/0070510 A1 | 3/2008 | Doppler et al. |
| 2008/0070582 A1 | 3/2008 | Cai |
| 2008/0080436 A1 | 4/2008 | Sandhu et al. |
| 2008/0108369 A1 | 5/2008 | Visotsky et al. |
| 2008/0144522 A1 | 6/2008 | Chang et al. |
| 2008/0151802 A1 | 6/2008 | Sheu et al. |
| 2008/0165748 A1 | 7/2008 | Visotsky et al. |
| 2008/0170699 A1 | 7/2008 | Fratti et al. |
| 2008/0186900 A1 | 8/2008 | Chang et al. |
| 2008/0188177 A1 | 8/2008 | Tan et al. |
| 2008/0207117 A1 | 8/2008 | Lim et al. |
| 2008/0222250 A1 | 9/2008 | Datta |
| 2008/0239977 A1 | 10/2008 | Xue et al. |
| 2008/0260000 A1 | 10/2008 | Periyalwar et al. |
| 2008/0285495 A1 | 11/2008 | Wentink et al. |
| 2008/0285500 A1 | 11/2008 | Zhang et al. |
| 2008/0304555 A1 | 12/2008 | Larsson |
| 2009/0003216 A1 | 1/2009 | Radunovic et al. |
| 2009/0034458 A1 | 2/2009 | Horn et al. |
| 2009/0059949 A1 | 3/2009 | Singh et al. |
| 2009/0073916 A1 | 3/2009 | Zhang et al. |
| 2009/0075587 A1 | 3/2009 | Yu et al. |
| 2009/0088070 A1 | 4/2009 | Aaron |
| 2009/0168703 A1 | 7/2009 | Pandey et al. |
| 2009/0175214 A1 | 7/2009 | Sfar et al. |
| 2009/0176492 A1 | 7/2009 | Kwon et al. |
| 2009/0196177 A1 | 8/2009 | Teyeb et al. |
| 2009/0213815 A1 | 8/2009 | Sherman et al. |
| 2009/0247214 A1 | 10/2009 | Cai et al. |
| 2009/0252065 A1* | 10/2009 | Zhang ............... H04L 41/082 370/256 |
| 2009/0252079 A1 | 10/2009 | Zhang et al. |
| 2009/0260000 A1 | 10/2009 | Pilant et al. |
| 2009/0285178 A1 | 11/2009 | Chin et al. |
| 2009/0296602 A1 | 12/2009 | Bange et al. |
| 2009/0307484 A1 | 12/2009 | Zhang et al. |
| 2009/0310572 A1 | 12/2009 | Wang et al. |
| 2009/0323652 A1 | 12/2009 | Chen et al. |
| 2009/0325479 A1 | 12/2009 | Chakrabarti et al. |
| 2010/0022261 A1 | 1/2010 | Meier et al. |
| 2010/0027458 A1 | 2/2010 | Wu et al. |
| 2010/0103862 A1 | 4/2010 | Ulupinar et al. |
| 2010/0103869 A1 | 4/2010 | Naden |
| 2010/0121974 A1 | 5/2010 | Einarsson et al. |

(56) References Cited

U.S. PATENT DOCUMENTS

| | | | |
|---|---|---|---|
| 2010/0124200 | A1 | 5/2010 | Ergen et al. |
| 2010/0128701 | A1 | 5/2010 | Nagaraja |
| 2010/0142448 | A1 | 6/2010 | Schlicht et al. |
| 2010/0150157 | A1 | 6/2010 | Wang et al. |
| 2010/0159936 | A1 | 6/2010 | Brisebois et al. |
| 2010/0172291 | A1 | 7/2010 | Kim et al. |
| 2010/0238855 | A1 | 9/2010 | Yoshida et al. |
| 2010/0265842 | A1 | 10/2010 | Khandekar et al. |
| 2010/0267344 | A1 | 10/2010 | Guner et al. |
| 2010/0278110 | A1 | 11/2010 | Ozawa |
| 2010/0323614 | A1 | 12/2010 | Yu et al. |
| 2010/0329216 | A1 | 12/2010 | Jen |
| 2011/0228749 | A1 | 9/2011 | Nasrabadi et al. |
| 2011/0261708 | A1 | 10/2011 | Grandhi |
| 2011/0261709 | A1 | 10/2011 | Barghi et al. |
| 2011/0294415 | A1 | 12/2011 | Jeon et al. |
| 2011/0317633 | A1 | 12/2011 | Tan et al. |
| 2012/0083203 | A1 | 4/2012 | Truong et al. |
| 2012/0093071 | A1* | 4/2012 | Huang .............. H04B 7/2606 370/315 |
| 2012/0106428 | A1 | 5/2012 | Schlicht et al. |
| 2012/0127937 | A1 | 5/2012 | Singh et al. |
| 2012/0164948 | A1 | 6/2012 | Narasimha et al. |
| 2012/0195226 | A1 | 8/2012 | Liu et al. |
| 2012/0322362 | A1 | 12/2012 | Coon |
| 2013/0039262 | A1 | 2/2013 | Lim et al. |
| 2013/0040558 | A1 | 2/2013 | Kazmi |
| 2013/0059585 | A1 | 3/2013 | Giloh |
| 2013/0083722 | A1 | 4/2013 | Bhargava et al. |
| 2013/0163440 | A1 | 6/2013 | Issakov et al. |
| 2013/0235754 | A1 | 9/2013 | Lim et al. |
| 2013/0295921 | A1 | 11/2013 | Bhargava et al. |
| 2013/0335528 | A1 | 12/2013 | Vishwanath et al. |
| 2014/0171062 | A1 | 6/2014 | Fallgren et al. |
| 2014/0220970 | A1 | 8/2014 | Yang et al. |
| 2014/0365761 | A1 | 12/2014 | Deyoung |
| 2015/0237556 | A1 | 8/2015 | Giloh |
| 2015/0334629 | A1 | 11/2015 | Patil et al. |
| 2016/0315688 | A1 | 10/2016 | Bhargava et al. |
| 2016/0337971 | A1 | 11/2016 | Bhargava et al. |
| 2018/0092022 | A1 | 3/2018 | Huang et al. |
| 2019/0253844 | A1 | 8/2019 | Ta et al. |
| 2020/0145493 | A1 | 5/2020 | Wang et al. |
| 2020/0260492 | A1 | 8/2020 | Bhargava et al. |
| 2022/0014187 | A1 | 1/2022 | Letor et al. |
| 2022/0141874 | A1 | 5/2022 | Bhargava et al. |
| 2023/0345456 | A1 | 10/2023 | Dees et al. |

FOREIGN PATENT DOCUMENTS

| | | |
|---|---|---|
| CN | 1897758 | 1/2007 |
| CN | 101548481 | 9/2009 |
| DE | 10309228 | 9/2004 |
| EP | 0986218 | 3/2000 |
| EP | 1742425 | 1/2007 |
| EP | 1744502 | 1/2007 |
| EP | 2157806 | 2/2010 |
| EP | 2192699 | 6/2010 |
| EP | 3860280 | 8/2021 |
| JP | 2001-298391 | 10/2001 |
| JP | 2008-022558 | 1/2008 |
| JP | 2008-199131 | 8/2008 |
| JP | 2009-512389 | 3/2009 |
| WO | 2003055246 A1 | 7/2003 |
| WO | WO 2003/055246 | 7/2003 |
| WO | WO 2003/085891 | 10/2003 |
| WO | WO 2004/068742 | 8/2004 |
| WO | WO 2008/036784 | 3/2008 |
| WO | WO 2008/124987 | 10/2008 |
| WO | WO 2009/031184 | 3/2009 |
| WO | WO 2009/031282 | 3/2009 |
| WO | WO 2011/153507 | 12/2011 |
| WO | WO 2012/016187 | 2/2012 |
| WO | WO 2012/122508 | 9/2012 |

OTHER PUBLICATIONS

Balraj, "Qualcomm Research San Diego: LTE Direct Overview", 2012, in 23 pages.
Croft, "Wi-Fi Service Discovery over 802.11u Using Non-Native Generic Advertising Services (GAS-SD)", 50 pages, May 2014.
International Search Report and Written Opinion for International Application No. PCT/US2011/039180 dated Jan. 11, 2012.
International Search Report and Written Opinion for International Application No. PCT/US2011/045967 dated Mar. 19, 2012.
International Search Report and Written Opinion for International Application No. PCT/US2012/028571 dated Aug. 24, 2012.
International Preliminary Report on Patentability in International Application No. PCT/US2011/039180, dated Dec. 4, 2012.
International Preliminary Report on Patentability in International Application No. PCT/US2011/045967, dated Feb. 5, 2013.
International Preliminary Report on Patentability in International Application No. PCT/US2012/028571, dated Sep. 10, 2013.
Jose et al., "Distributed Rate Allocation for Wireless Networks", Apr. 6, 2010, pp. 1-39, XP055015975.
Jubin et al., "Distributed Rate Allocation for Wireless Networks", http:arxiv.org/abs/100232813, Apr. 6, 2010.
Search and Examination Report in Singapore Application No. 201301586-2, dated Jan. 23, 2014.
Non-Final Office Action in U.S. Appl. No. 13/701,449, dated Aug. 27, 2014, in 23 pages.
Non-Final Office Action in U.S. Appl. No. 13/852,007, dated Oct. 23, 2014, in 25 pages.
Extended European Search Report in EP Application No. 19152331.5, dated Apr. 2, 2019, in 8 pages.
Non-Final Office Action for U.S. Appl. No. 13/813,349, dated Feb. 23, 2015, pp. 1-13.
English translation of Japanese Office Action for application 2013-513400, dated Mar. 24, 2015, pp. 1-2.
Final Office Action in U.S. Appl. No. 13/852,007, dated Apr. 8, 2015, in 8 pages.
Final Office Action in U.S. Appl. No. 13/701,449, dated Apr. 13, 2015, in 7 pages.
English translation of Korean Office Action for application 10-2013-7000301, dated Apr. 20, 2015, pp. 1-2.
Notice of Allowance in U.S. Appl. No. 13/701,449, dated May 11, 2015.
Non-Final Office Action in U.S. Appl. No. 14/020,511, dated Jun. 10, 2015, in 21 pages.
Notice of Allowance in U.S. Appl. No. 13/852,007, dated Jun. 17, 2005, in 14 pages.
Chinese Office Action dated Sep. 15, 2015 for application CN 201180038261.7, pp. 1-8.
Non-Final Office Action in U.S. Appl. No. 14/823,506, dated Oct. 22, 2015, in 23 pages.
Final Office Action in U.S. Appl. No. 13/813,349, dated Oct. 26, 2015, in 18 pages.
Notice of Allowance in U.S. Appl. No. 14/823,506, dated Feb. 4, 2016, in 33 pages.
Final Office Action in U.S. Appl. No. 14/020,511, dated Mar. 1, 2016, in 14 pages.
Non-Final Office Action in U.S. Appl. No. 13/813,349, dated Jun. 9, 2016, in 16 pages.
Chinese Office Action dated Aug. 5, 2016 for application CN 201180038261.7, pp. 1-13.
Notice of Allowance in U.S. Appl. No. 14/020,511, dated Oct. 5, 2016, in 13 pages.
Final Office Action in U.S. Appl. No. 13/813,349, dated Jan. 27, 2017, in 9 pages.
Non-Final Office Action in U.S. Appl. No. 15/172,736, dated Mar. 9, 2017, in 8 pages.
Notice of Allowance in U.S. Appl. No. 13/813,349, dated Jun. 5, 2017, in 5 pages.
Notice of Allowance in U.S. Appl. No. 15/399,168, dated Dec. 6, 2017, in 17 pages.
Notice of Allowance in U.S. Appl. No. 15/172,736, dated Jun. 21, 2017, in 20 pages.

(56) References Cited

OTHER PUBLICATIONS

Examination Report for European Patent Application No. 11725847.5, dated Dec. 12, 2017, in 5 pages.
Non-Final Office Action in U.S. Appl. No. 15/223,761, dated Jan. 29, 2018, in 19 pages.
Non-Final Office Action in U.S. Appl. No. 15/714,551, dated Mar. 5, 2018, in 16 pages.
Non-Final Office Action in U.S. Appl. No. 15/714,500, dated Apr. 18, 2018, in 25 pages.
Notice of Allowance in U.S. Appl. No. 15/223,761, dated Jul. 2, 2018, in 5 pages.
Notice of Allowance in U.S. Appl. No. 15/913,238, dated Sep. 28, 2018, in 17 pages.
Final Office Action in U.S. Appl. No. 15/714,551, dated Nov. 15, 2018, in 16 pages.
Notice of Allowance in U.S. Appl. No. 15/714,500, dated Feb. 4, 2019, in 12 pages.
Office Action for Indian Patent Application No. 33/CHENP/2013, dated Apr. 30, 2019.
Non-Final Office Action in U.S. Appl. No. 15/714,551, dated Jun. 17, 2019, in 15 pages.
Notice of Allowance in U.S. Appl. No. 16/235,890, dated Sep. 30, 2019, in 22 pages.
Corrected Notice of Allowance in U.S. Appl. No. 16/235,890 dated Dec. 19, 2019, in 5 pages.
Final Office Action in U.S. Appl. No. 15/714,551, dated Feb. 13, 2020, in 8 pages.
Office Action in EP Application No. 19152331.5, dated Jun. 19, 2020, in 5 pages.
Notice of Allowance in U.S. Appl. No. 15/714,551, dated Jul. 1, 2020, in 6 pages.
Non-Final Office Action in U.S. Appl. No. 16/899,352, dated Jul. 15, 2020, in 17 pages.
Non-Final Office Action in U.S. Appl. No. 16/728,878, dated Aug. 12, 2020, in 24 pages.
Notice of Allowance in U.S. Appl. No. 16/899,352 dates Nov. 5, 2020, in 11 pages.
Examiner's Google Patent Search cited in U.S. Appl. No. 16/899,352 dated Nov. 2, 2020, in 3 pages.
Office Action in Indian Application No. 201948044835, dated Jun. 2, 2021, in 5 pages.
European Search Report in Application No. 20216199.8, dated Apr. 21, 2021, in 8 pages.
Office Action in Chinese Application No. 201811127797.6, dated Sep. 6, 2021.
Office Action in Chinese Application No. 201811127797.6, dated Feb. 15, 2022.
English Translation of Notice of Reexamination for related Chinese Patent Application 201811127797.6 issued Feb. 27, 2023, 9 pages.
Non-Final Office Action for related U.S. Appl. No. 17/552,753 issued Mar. 10, 2023, 29 pages.
Office Action for related Chinese Patent Application No. 201811127797.6, dated Jul. 19, 2023, 12 pages.
Notice of Allowance for related Chinese Patent Application No. 201811127797.6, dated Nov. 8, 2023, 4 pages.
European Search Report for related European Patent Application No. 20216199.8, dated Sep. 11, 2023, 5 pages.
Final Office Action for related U.S. Appl. No. 17/552,753 issued Nov. 16, 2023, 26 pages.

* cited by examiner

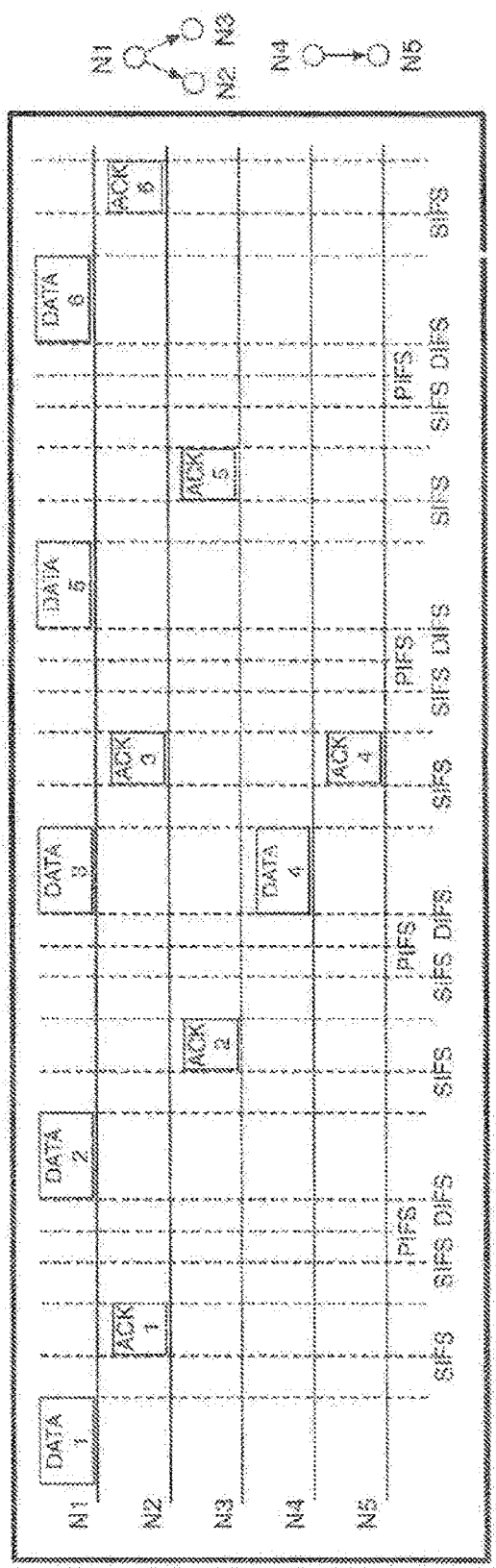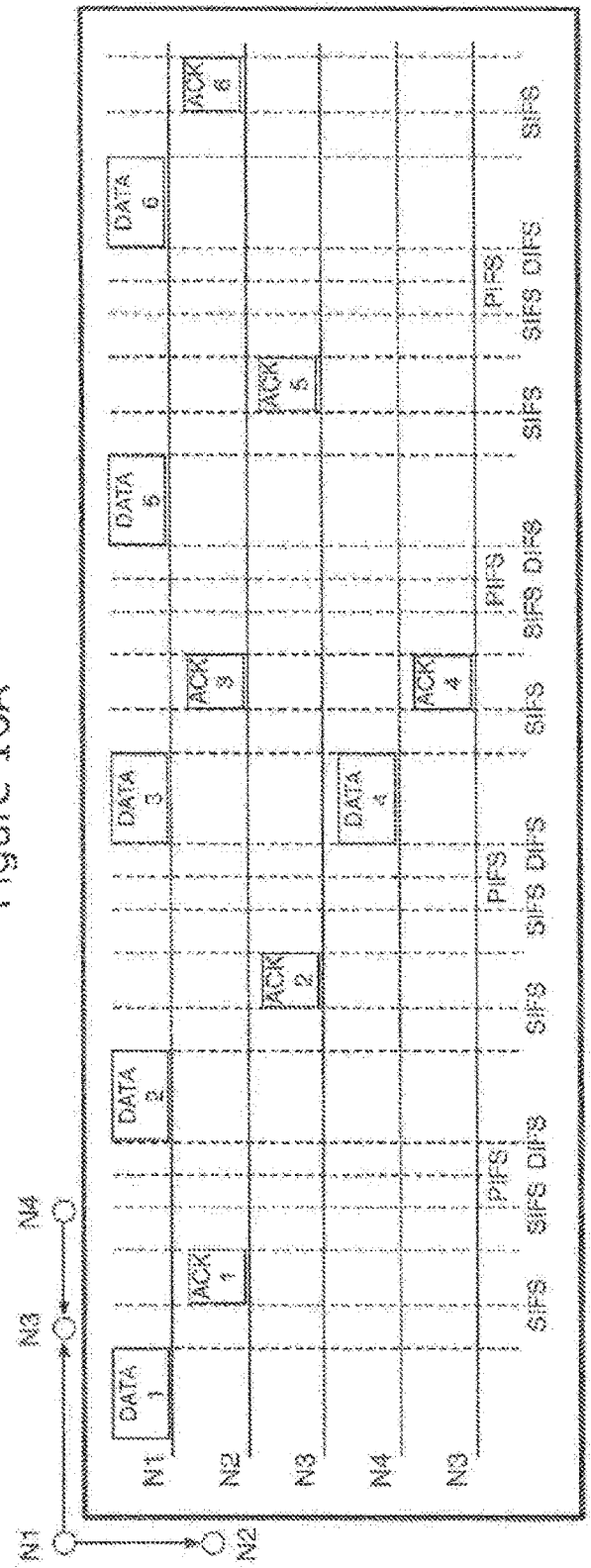
Figure 16A
Figure 16B

METHODS AND APPARATUSES FOR RELAYING DATA IN WIRELESS NETWORKS

CROSS-REFERENCE TO RELATED APPLICATIONS

The present application is a continuation of U.S. patent application Ser. No. 15/714,551, filed on 25 Sep. 2017. U.S. patent application Ser. No. 15/714,551 is a continuation of Ser. No. 13/813,349, filed on 23 Apr. 2013, which is a US national-phase entry of international application PCT/US2011/045967, filed 29 Jul. 2011, and PCT/US2011/045967 claims priority to U. S. Provisional Application 61/369,181, filed 30 Jul. 2010. International application PCT/US2011/045967 is a continuation-in-part of international application PCT/US2011/039180, filed 3 Jun. 2011. Each of the parent applications listed above is incorporated by reference in its entirety for all purposes.

TECHNICAL FIELD

The present invention relates to wireless networks and, more specifically, to collision detection and distributed rate allocation in wireless networks.

BACKGROUND OF THE INVENTION

Some conventional wireless networks adopt a central authority to manage communications between the nodes of the network and allocate rates for the communications. For example, in a conventional state of the art cellular network, the nodes of the network may include cellular telephones, and other mobile devices configured for enhanced multimedia applications. The communications between such nodes may include both voice and non-voice data traffic, with requirements or preferences for a variety of data rates based on the application.

FIG. 1 depicts an exemplary conventional cellular network 100. A central authority 110, such as a base station is commonly employed to manage the traffic and allocate data rates in cellular network 100. The devices at any two nodes of the cellular network 100, such as 104 and 106 may communicate with each other by routing all communications via the central authority 110. The communication link between a node and central authority 110 is commonly referred to as a "single hop." Links 120, 130, 140 and 150 represent single hops between nodes 102, 104, 106 and 108 respectively and central authority 110.

Some current technology is limited to single hops. Consequently, in some instances, this current technology does not permit efficient communication between the two nodes 104 and 106 without the involvement of central authority 110. The involvement of the central authority 110 leads to well known problems, such as, for example in cellular phone networks: dropped calls, low reception, increased drain on battery life, etc., because the devices at individual nodes may not always be located at sufficient proximity to the base station, or the base station may be limited in the amount of traffic it can handle.

Accordingly, multi-nodal network implementations that do not always depend on a central authority for certain functions have been explored. Such implementations are commonly known as "distributed" or "ad-hoc" networks, wherein each node is configured to manage its own data transmission without always requiring relatively heavy involvement of a central authority. A common problem encountered in distributed network implementations is that of interference among several communicating nodes located in close proximity to one another. Another problem is the issue of efficient resource allocation of the wireless medium. Data intensive applications are commonly supported by mobile devices, and without a central authority to handle resource allocation, some nodes may consume the available communication channel while starving other nodes.

Therefore, certain existing implementations of distributed networks have been limited by requiring knowledge at each node of other nodes in the system in order to allocate system resources among the nodes. However, over a large number of nodes, and with high data traffic, some implementations known in prior art are often rendered very inefficient, leading to high overheads and low throughputs. Accordingly, there is a need in the art for distributed rate allocation among the several nodes in a throughput-optimal or throughput-cognizant manner, wherein interference is minimized or reduced and knowledge at each node of every other node is not required.

Further, certain wireless networks, including single hop and multi-hop, centralized and decentralized wireless networks, do not adequately select the rate at which constituent wireless devices, or nodes, attempt to transmit data. Selecting an appropriate rate may be particularly challenging when wireless devices use shared resources of a wireless medium, e.g., shared frequencies, shared times, shared codes, and in systems with beam forming, shared directions, or other orthogonalizations, and combinations thereof, for example. For instance, in some wireless networks, wireless devices attempt to maximize the rate of transmission of that wireless device without adequately accounting for the effect of that transmission on the ability of other wireless devices to share the same shared resources of the wireless medium, potentially resulting in a lower collective date rate for the network as a whole. Additionally, in some wireless networks, wireless devices do not share the same resources of the wireless medium, in part, because it is difficult to determine whether the transmissions of one wireless device are colliding with the transmissions of another wireless device and preventing resolution of signals from the other wireless device.

BRIEF DESCRIPTION OF THE SEVERAL VIEWS OF THE DRAWING

A better understanding of the present invention can be obtained when the following detailed description is considered in conjunction with the following drawings:

FIGS. 14A-16B are timing diagrams of snooping techniques for detecting collisions.

DETAILED DESCRIPTION

Figure 1:
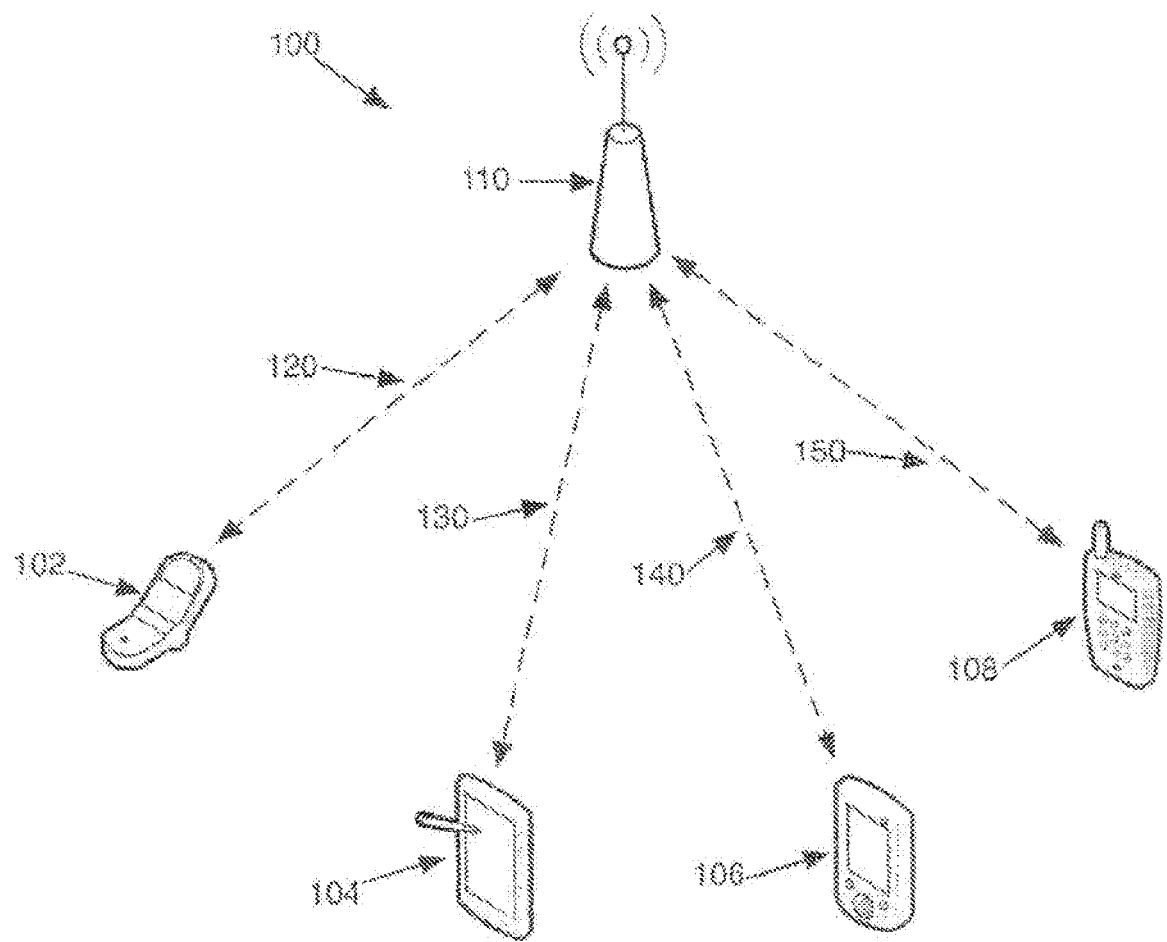
FIG. 1 illustrates an exemplary conventional single-hop cellular network.

The present invention includes a method, a device, a system, and computer program product (e.g., a non-transitory computer medium having a computer program) for improving the capacity of a wireless network. Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention. Moreover it will be understood that the terminology used herein is for the purpose of describing particular embodiments only and it is not intended to be limiting of embodiments of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The term "computer" is used in a broad sense to refer to devices that compute, e.g., smart phones, microcontrollers, etc., and is not limited to a personal computer. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and procedural programming languages, such as the "C" programming language or similar programming languages.

Aspects of the present invention are described below with reference to flowchart illustrations or block diagrams of methods, apparatus (systems) and computer program products according to embodiments of the present invention. It will be understood that each block of the flowchart illustrations or block diagrams, and combinations of blocks in the flowchart illustrations or block diagrams, can be implemented by computer program instructions. These computer program instructions may be provided to a controller or processor, such that the instructions, which execute via the controller or processor, create means for implementing the function/acts specified in the flowchart or block diagram block or blocks.

These computer program instructions may also be stored in a computer readable medium that can direct a device to function in a particular manner, such that the instructions stored in the computer readable medium produce an article of manufacture including instructions which implement the function/act specified in the flowchart or block diagram block or blocks.

Figure 4:
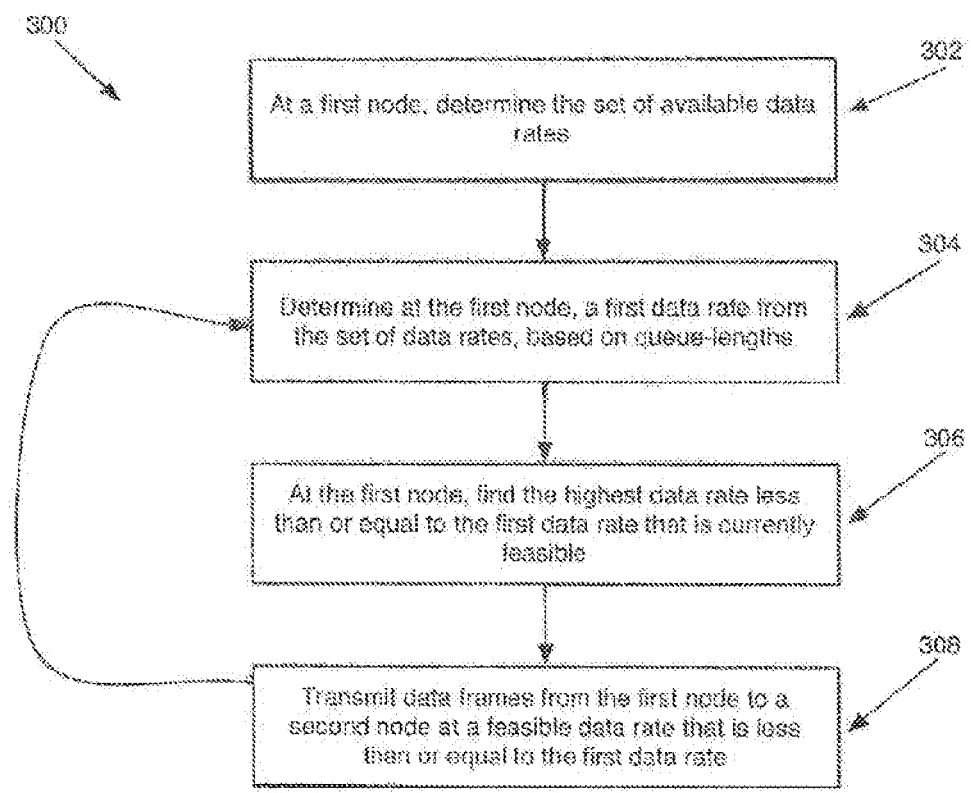
FIG. 4 is a flow chart depicting a method for rate allocation according to embodiments.
Figure 5:
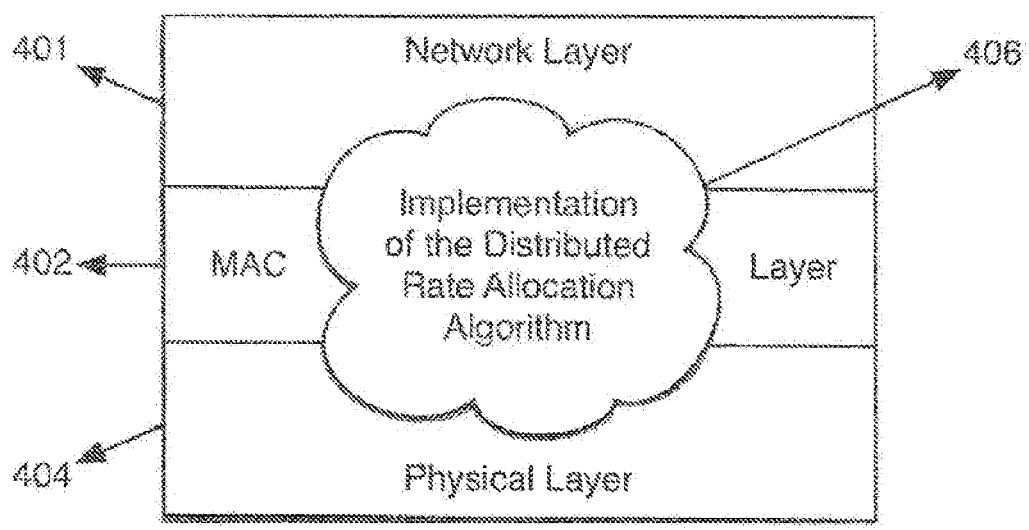
FIG. 5 is a diagram of wireless networking layers.

Embodiments employ algorithms for distributed rate allocation in wireless networks. Detailed scope of the algorithms and associated theorems for mathematically proving the algorithms are described in the publication authored by co-inventors of the present application, Jose, et al. "Distributed Rate_Allocation for Wireless Networks," (hereinafter referred to as "Jose") and incorporated in its entirety herein. As illustrated in FIG. 4, embodiments include wireless network implementation 406 adapted across three layers, network layer 401, medium access control (MAC) layer 402 and physical layer 404, of the well known seven layer network model, commonly also referred to as the Open System Interconnect (OSI) Reference Model.

"Rate allocation" in particular embodiments refers generally to allocation of resources in a wireless network. More particularly, rate allocation refers to allocation of resources such as data rates in a particular shared portion of a wireless medium, e.g., a frequency channel (as specified by communication protocols, such as IEEE 802.11, cellular communication protocols, local area network wireless protocols, wide area network wireless protocols, and personal area network wireless protocols), shared among the nodes of a network. Some embodiments include distributed wireless networks in which each node is individually capable of controlling parameters of wireless transmission, such as a rate of transmission on the shared channel of the wireless network. Aspects of the invention are expected to facilitate the formation of relatively stable wireless networks, and rate allocation across the nodes of the wireless network is throughput optimal, or throughput enhanced relative to other techniques. The terms "stable" and "throughput optimal" are explained with reference to FIG. 2.

Figure 2:
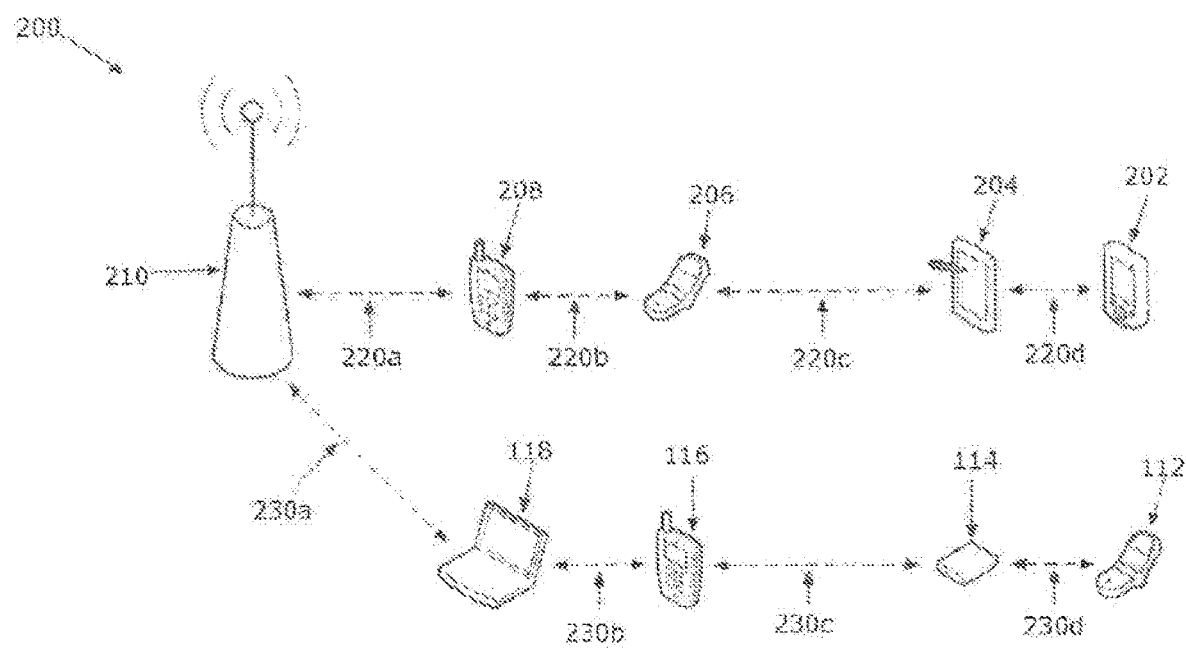
FIG. 2 illustrates a multi-hop wireless network according to an embodiment.

FIG. 2 illustrates an example of a wireless network 200 configured for distributed rate allocation among several nodes. In contrast to the prior art cellular network 100 illustrated in FIG. 1, the wireless network 200 of the present embodiment is not limited to single hop communication, and does not require the involvement of central authority 210 to control data transmission/reception at each node. For example, nodes 116 and 114, in this embodiment, are configured to establish relatively efficient communication with each other over link 230c without involvement of central authority 210 or with relatively little involvement. Moreover, as illustrated, node 116 of the present embodiment may be configured to establish a multi hop communication with central authority 210 by establishing communication with node 118 over link 230b and then hopping off node 118 to communicate with central authority 210 over link 230a. Moreover, variations of the topology illustrated in FIG. 2 are within the scope of embodiments.

In particular embodiments, a frequency channel is shared and is available for data transmission by the nodes 112-118 and 202-208 illustrated in FIG. 2. In this example, the case of data reception is covered under the general category of data transmission, because data transmitted by a node is received by another node, and therefore data reception will not be explicitly discussed in reference to this example.

The nodes 112-118 and 202-208 may be hybrid-cellular/non-cellular wireless devices configured to form a multi-hop connection via non-cellular connections (e.g., on a wireless network that is not tightly controlled by a cellular base station, such as an ad hoc or other decentralized wireless network) to a cellular base station. The device 210, in some embodiments, may be a cellular base station, and the nodes 208 and 118 may receive non-cellular transmissions from nodes 206 or 116 and retransmit data from those transmissions on a cellular interface to the cellular base station 210. In some instances, the nodes 208 or 118 may receive cellular transmissions from the device 210 and re-transmit data from those transmissions to other wireless devices 206 or 116 on a non-cellular interface. Uplink data or downlink data may be transmitted over multiple hops, as illustrated, across the nodes 202-208 and 112-118. Terminating the connection with a cellular link to the device 210 is expected to expand the range of cellular networks without increasing the transmission power of the device 210 to reach devices 202 or 112. Further, forming the non-cellular portions of the connection via an ad hoc or other decentralized non-cellular network is expected to relieve the device 210 of the overhead of mediating those connections, thereby reducing the load on cellular networks. In other embodiments, the system 200 may not correct directly to a cellular carrier's network, and device 210 may be an access point, e.g., an 802.11(n) network, or an 802.11 AP network, or the like. In this example, the distance over which the wireless device 210 is expected to increase due to the multiple hops. In yet other embodiments, the system 200 may only have single hops, as the present techniques are applicable to both multi-hop and single-hop systems, as the techniques are expected to improve systems with both a large number of single hops or systems with an increased crowding of the wireless medium associated from multi-hop systems.

Each node of FIG. 2 may have data packets that it would like to transmit on the shared channel to another node. Each node is said to have a "queue length" indicating a number of data packets (or other quantity of data, such as number of bits or bytes) that are waiting in a queue to be transmitted at that node. In some embodiments, the queue length may be an amount of data stored in an output buffer for a transmitter of a wireless device.

In some embodiments, each node can have multiple separate queue-lengths (i.e. more than one queue-length could be considered in the rate allocation algorithm at a node) associated with the node. For instance, in a single-hop route, the node may maintain a queue or queue length for each destination or node to which the node connects, a separate queue or queue length for each class of quality of service of traffic, or a separate queue or queue length for each permutation of these factors. Alternatively, or additionally, in multi-hop use cases, each node may maintain a queue or queue length for each destination or node to which the node connects, a separate queue or queue length for each quality of service class of traffic, a separate queue or queue length for each multi-hop route, or a separate queue or queue length for each permutation of these factors. The relevant queue length for the transmission of a given packet may be selected based on the queue from which the packet was pulled.

With continuing reference to FIG. 2, in general, wireless network 200 is said to be stable if the queue lengths at each node do not exceed a predetermined, e.g., stored or calculated, maximum queue length value for each node, which may be selected based on the size of a output buffer on a wireless device, e.g., less than 100% of the buffer size, less than 90% of the buffer size, or less than 50% of the buffer size. In other words, in this example, the network is stable if all the queues are being drained over a given period of time, and each node is getting its fair share of the shared channel. Therefore, in a stable network, no single node can monopolize the shared channel in order to drain its queue at the cost of starving other nodes of the shared channel, and causing their queues to expand in an uncontrolled manner. Embodiments, however, are not limited to stable networks.

With continuing reference to FIG. 2, distributed rate allocation is expected to be useful in the wireless network 200. Networks solely controlled by a central authority can facilitate reasonably efficient utilization of the network resources. However, some device may not be in the coverage area of the central authority and thus will not be able to operate efficiently. Moreover, in multi-hop wireless networks similar to the one shown in FIG. 2, it is difficult for the central authority to know everything (e.g. channel quality of link 220b, battery life remaining in device 206, throughput requirement of node 206, etc.) about all devices at all times. In such scenarios, decentralized ways of efficiently utilizing the network resources are needed. Some of the presently described decentralized and distributed rate allocation techniques are expected to allow devices to relatively efficiently use the network resources (e.g. shared wireless spectrum, resources of other nearby devices, etc.). Therefore, by facilitating distributed rate allocation in wireless networks, embodiments are expected to effectively reduce the need for a central authority and facilitate efficient implementations of wireless networks.

Principles of the present invention are also useful for co-located single-hop networks. Some co-located embodiments operate in the same frequency band. For instance, an office building may include several wireless base-stations operating in the same frequency band. In this example, several devices may be associated with each base-station at any given time. Some of these co-located base-stations and their associated devices may interfere with each other when communicating over the wireless channel. Without rate allocation, usually only one interfering base-station or device can transmit at any given instant of time. In several situations, this leads to an inefficient use of the shared wireless spectrum, leading to lower total throughput and thus lower average throughput for each device. With the use of some of the presently described distributed rate allocation techniques, several base-stations and devices may transmit in parallel at any given instant of time. This is expected to increase the total throughput and thus increase the average throughput for each device.

The throughput may be characterized a number of ways, however particular measures are more relevant to many of the embodiments herein. Performance of wireless devices typically may be characterized according to a network-layer rate of the wireless device or a physical-layer rate of the wireless device. The network-layer rate refers to the volume of network-layer bits per unit time during transmission output by the wireless device, whereas the physical-layer rate refers to the volume of physical later bits per unit time during transmission output by the wireless device. The physical-layer rate is a function of the complexity of the modulation scheme (e.g., 64 QAM to 256 QAM) (more complexity increases the physical-layer rate), the amount of channel coding (less channel coding will increase the rate because of less redundancy), the amount of spectrum over which signals are transmitted (more spectrum increases the rate), or the use of multiple-input-multiple-output (MIMO) for a number of spatial streams (more spatial streams increase), the duration of any guard band interval (smaller guard band intervals increase the rate), and other wireless transmission parameters. The physical-layer rate is generally higher than the network-layer rate because of overhead added at the network and medium-access control (MAC) layer. For purposes of configuring a wireless device for wireless transmission of signals, e.g., selecting a transmission power level, the physical-layer rate is the relevant measure, and the term "rate" herein refers to the physical-layer rate, unless otherwise indicated.

An exemplary method for achieving relatively efficient rate allocation in a distributed wireless network will now be discussed. Wireless standards usually define a set of physical-layer rates for data transmission on the wireless channel, e.g., predetermined discrete rates or a generally continuous range of rates. In some systems, each node is limited to transmit data packets in its queue at one of the rates chosen from the defined set of rates. The set of rates can include a "zero rate," referring to no transmission. During operation, each node may choose a data rate from the set of data rates, and a particular combination of data rates may be established across all the nodes at any given time or at certain times. At any given time, or at certain times, certain combinations of data rates may be feasible. At any given time, or at certain times, the combinations of data rates that are feasible simultaneously (or generally simultaneously) form the rate region of the system of wireless nodes. In some embodiments, nodes may choose rates such that the combination of rates chosen by all interfering nodes belongs to the rate region. Moreover, the combination chosen may tend to facilitate high overall system throughput relative to a system in which the nodes greedily select a rate. In the embodiments, the distributed rate allocation may help devices determine feasible combinations of rates belonging to the rate region and also tend to ensure that the overall system throughput is reasonably high. Moreover, in some embodiments, the rate allocation may be performed without the presence of a central authority (though some embodiments may also employ a central authority for certain tasks), and certain embodiments are expected to tend to keep the network stable.

With continuing reference to FIG. 2, node 114 will be discussed for illustrative purposes. It is assumed that node 114 has a queue length "QL114" representing a number of data packets that node 114 wishes to transmit on link 230c to node 116. The queue length need not be quantified in terms of data packets, however, and may be characterized by other quantities of an amount of data. In the present example, the transmission may occur on the shared channel or other shared resources of a wireless medium, e.g., on a non-orthogonal set of resources such that transmissions interfere with one another. Rate allocation, in this example, on the shared channel is distributed. Node 114 may select a data rate to transmit data packets that tends to keep the wireless network 200 stable, and that the chosen data rate may also be selected such that the rate tends to keep the total throughput of the wireless network 200 reasonably high relative to systems employing a greedy rate allocation in which each node simply attempts to maximize its own rate of transmission.

Similar to some conventional techniques such as Carrier Sense Multiple Access (CSMA), in this embodiment, node 114 may first sense the shared channel to determine whether the shared channel is generally free (or completely free) for transmission, e.g., whether there is activity on the shared channel that would discourage transmission. Techniques such as CSMA typically implement an on-off scheduling, wherein if activity is sensed, data transmission is scheduled to be "off", but if no activity is sensed, then data transmission is "on" and data transmission proceeds at a predetermined data rate. However, in contrast to certain conventional techniques, such as these implementations of CSMA, some embodiments may include nodes that each select a data rate from the rate region after sensing channel activity. Thus nodes using certain principles of the present invention may transmit even when some activity is sensed by choosing a rate from the above-described rate region, such that the chosen rate is feasible (e.g., excessive collisions or a rate of collisions above a threshold do not occur) in parallel with other transmissions from other nodes on the same or overlapping resources of the wireless medium. That is, the transmissions may interfere, but not so much that they cause excessive collisions above a threshold, a rate of collisions above a threshold, or a rate of change of collisions above a threshold.

Choosing a data rate from the rate region, in some embodiments, may be implemented as a Markov chain or other Markov process. A Markov chain generally refers to a discrete random, or stochastic, process, e.g., a system that can be in various states, and that changes randomly in discrete steps, in contrast to a deterministic process. (It should be noted that the term "random" herein also refers to pseudo-random events.) The state of at least part of a system during the next step only depends on the current state of the system in a Markov chain. The changes of state of the system are called transitions, and probabilities are associated with various state-changes, and are called transition probabilities. For example, with respect to node 114 of the present embodiment, if no activity is sensed by node 114 on the resources of the wireless medium to be used by node 114, a data rate is chosen by node 114 from the rate region, based at least in part or wholly on the current state of node 114. For instance, if node 114 is in a first state in which the node is being configured to transmit at a first data rate, then node 114 may transition to a second state in which the node is being configured to transmit at a second data rate, based on a probability of transitioning from the first state having the first data rate to the second state having the second data rate.

Thus, in some embodiments, rates are selected based, in part, on a stochastic input. A stochastic input may be obtained through a variety of techniques. For instance node 114 may have a stochastic module or randomization module having a linear shift register that may output a generally non-deterministic value (e.g., a random or pseudo-random value) that is used by node 114 to transition from one state to the next state when selecting a data rate. In another example, a stochastic module or randomization module may sense a non-deterministic property of node 114 or the environment in which node 114 operates, e.g., noise on a particular radio frequency, in order to output a random value.

In some embodiments, at node 114, the probability for choosing (or transitioning to) a data rate from the rate region is also a function of queue length QL114 of node 114. The function of queue length QL114 may be defined in such a manner that if the queue length is high, then the probability of selecting a high data rate is also appropriately high. In some embodiments, a relatively large queue, represented by large values of queue length QL114, may tend to be drained at a relatively high data rate relative to nodes with a lower queue length, thereby contributing to the stability of wireless network 200. Jose provides mathematical proof, demonstrating that certain functions of queue length QL114 which satisfy the above requirements also ensure that the data rate so chosen by the function contributes to throughput-optimality, though the present technique is not limited to the functions listed in Jose or only to throughput-optimal rate selections, as the present techniques can be used to select sub-optimal rates that still improve networks, e.g., by approximating an optimal rate selection. If any algorithm can stabilize a network by draining the queues, so can a throughput-optimal algorithm. A logarithmic function, for example, can be chosen according to Jose. Accordingly, embodiments provide techniques for near throughput-optimal distributed rate allocation in wireless networks.

In some embodiments, at node 114, the probability for choosing (or transitioning to) a data rate from the rate region may also be a function of the cumulative backlog, arrival rate, and service rate of data (i.e. data packets, data bits, data bytes, or some other quantity of data) at node 114. In some embodiments, the combination of cumulative backlog, arrival rate, and service rate of data at node 114 could be approximated as an estimated queue-length or estimated portion of a queue-length at node 114. In some embodiments, the combination of cumulative backlog, arrival rate, and service rate of data at node 114 could be considered separately according to the various parameters. For example, in single hop use cases, separate estimated queue-lengths may be calculated for each unique destination, for each unique QoS_Traffic_Class, or for each unique combination of (Destination, QoS_Traffic_Class). Similarly, in a multi-hop example, estimated queue lengths may be calculated for the preceding categories as well as a route.

In some embodiments, the queue length may be combined with (e.g., multiplied by or taken to an exponent of) a random value to select a rate, such that the selection remains non-deterministic though the probability of selecting various rates is unequal. For instance, node 114 may tend to select higher rates with a higher probability when the queue length of node 114 is high relative to thresholds or relative to other nodes, though in this example, node 114 may occasionally still select lower rate due to the contribution of the random value.

The rate may be selected according to a function 'f' that is a function of queue length and the random value. In some embodiments, the function f may be a generally monotonic, completely monotonic, geometric, arithmetic, etc., function that increases, or generally increases, the probability of selecting a high rate as the queue length increases. An embodiment is described by Algorithm 1 of the Q-CMRA paper. The Jose reference further teaches a family of distributions that may be used when choosing the rate; the family of distributions is also captured in Algorithm 1 of the Q-CMRA paper.

Figure 3:
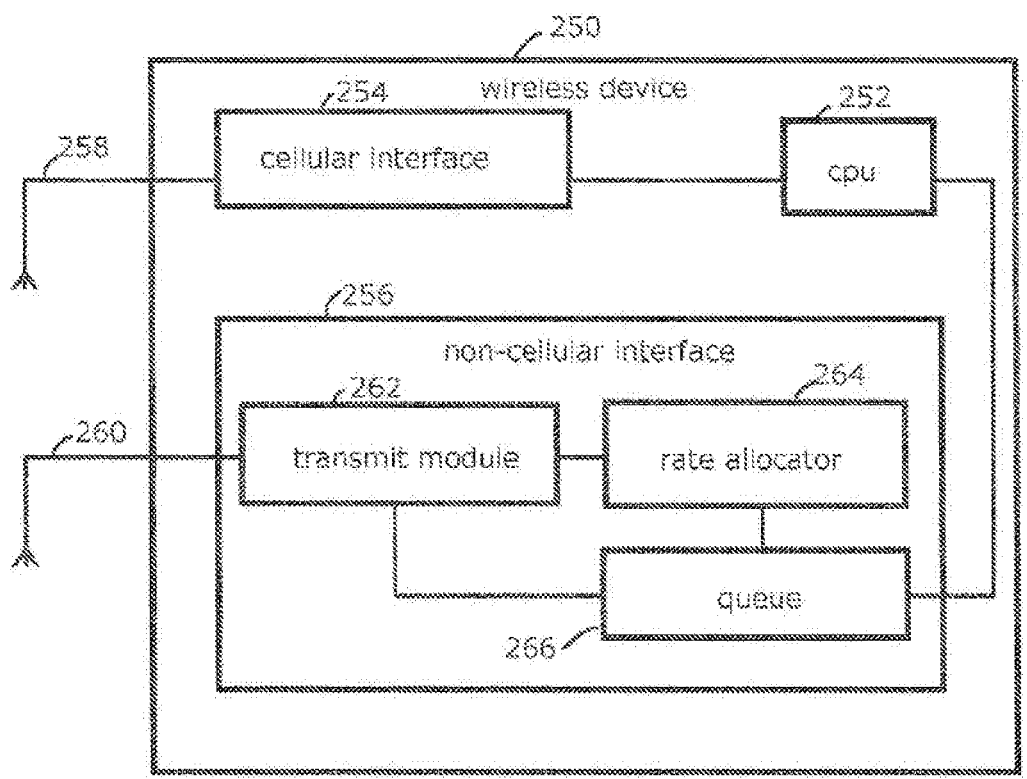
FIG. 3 is a block diagram of a wireless device in accordance with an embodiment.

FIG. 3 illustrates an example of a wireless device 250 in accordance with an embodiment. The wireless device 250 may be a variety of different types of wireless devices. For example, the wireless device 250 may be a hand-held wireless device, such as a cell phone or smart phone, or other type of mobile wireless device, such as a laptop, tablet computer, or special-purpose wireless device, such as hand-held point-of-sale terminal, a hand-held inventory-management terminal, a global positioning system navigation device, or a sensor connected to a wireless network. The wireless device 250 may include a number of components that are not depicted in FIG. 3 for clarity. For example, the wireless device 250 may include a microphone, a speaker, a touch screen display, a compass, an accelerometer, and a global-positioning system sensor. The wireless device 250 may also include persistent and non-persistent memory connected to the CPU.

The illustrated wireless device 250 includes a CPU 252, a cellular interface 254, and a non-cellular interface 256. In other embodiments, the wireless device may not include the cellular interface 254, such as in devices configured solely for access to 802.11 networks, which is not to suggest that any other feature described herein may also be omitted in certain embodiments.

The CPU 252 may be a single or multi-core processor capable of executing instructions for providing an operating system to the wireless device. The CPU 252 may also connect to various components of the wireless device that gather data for transmission, such as analog to digital converters connected to a microphone, a camera, buttons by which a user may enter commands, and a touch screen.

The CPU 252 may output data through either the cellular interface 254 or the non-cellular interface 256. The cellular interface 254 may include components for managing and effectuating a connection between the wireless device 252 and a cellular base station of a cellular network. In some embodiments, the cellular connection may be centrally controlled by the base station, such that the base station instructs the cellular interface 254 when to transmit, which wireless resources to use when transmitting, and the power and data rate with which to transmit. The cellular interface 254 may transmit signals on antenna 258 connected to the cellular interface 254.

The non-cellular interface 256 may be capable of connecting wirelessly to other devices without the connection being established or controlled by a cellular base station. For example, the non-cellular interface may be capable of participating in ad hoc or other distributed wireless networks. In some embodiments, the non-cellular interface may be a wireless interface for transmitting and receiving data on an 802.11 wireless network, a Bluetooth wireless network, a Zigbee wireless network, or other non-cellular wireless networks. The non-cellular interface may transmit and receive signals via an antenna 260. In some embodiments, the antenna 260 may include multiple antennas, for example two or three or more antennas for beam-forming, diversity transmission and reception, or forming multiple simultaneous or concurrent connections, or spatial-streams. Other examples of combinations of cellular and non-cellular interfaces include 802.11 (cellular) and 60 GHz (non-cellular); 802.11 (cellular), hopping-interface (non-cellular; e.g. 802.11, licensed-spectrum-interface, etc.), and HSPA/LTE/WiMax (cellular)

The illustrated non-cellular interface 256 includes a transmit module 262, a rate allocator module 264, and a queue 266. The queue 266 may include a first-in first-out buffer or a ring buffer for storing data to be transmitted by the wireless device 250. The transmit module 262 may be configured to retrieve this data from the queue 266 and transmit the data through the antenna 260. The transmit module 262 may transmit the data at a certain power level and at a certain rate that are selected by the rate allocator module 264. In some embodiments, the rate allocator module 264 may receive a signal from the queue 266 indicative of the amount of data stored in the queue 266, and the rate allocator 264 may select a rate and a transmit power-level for the transmit module based, in part, on the amount of data in the queue, for example a queue length. While the rate allocator 264 is depicted as a separate block from the queue 266 and the CPU 252, some, or all, of the functionality of these blocks may be implemented within a single device, for example on a single integrated circuit or across multiple integrated circuits. A number of variations of the rate allocator module 264 are described below.

It will be appreciated that embodiments include various methods for performing the processes, functions or algorithms disclosed herein. For example, as illustrated in the flow diagram in FIG. 4, an embodiment may include determining the set of available data rates (or a subset of the set of available data rates), as depicted in block 302. Such a set of data rates is often defined by a wireless standard, such as IEEE 802.11, GSM, UMTS, HSPA, LTE, WiMax, etc. The set of data rates could include a zero data rate corresponding to no transmission. As depicted in block 304, at a first node, a first data rate is determined based on queue-lengths, e.g., the queue-length may be one factor among several (other factors could include subscription-plan, user-profile, time-of-day, location, etc.) or the sole factor in selecting the rate. In some embodiments of a single-hop wireless network, queue-length may correspond to the queue-length at the first node. In some embodiments of a multi-hop wireless-network, queue-lengths may correspond to the difference in queue-lengths at the first node and any nearby node that is on the multi-hop path to the intended final destination. Next, as shown in block 306, at the first node, the process may include finding the highest data rate less than or equal to the first data rate that is currently feasible. Feasibility may be established for a rate when sending frames to a specific node. Moving on to block 308, the first node may transmit data frames to a second node at a feasible data rate that is less than or equal to the first data rate. This process may be repeated periodically or at varying intervals. Some embodiments including the method illustrated in FIG. 4 are expected to achieve stability of the wireless network and to achieve near throughput-optimal rate allocation, though sub-optimal or less than stable implementations are contemplated as well.

In addition to (or replacement of) queue-length(s), one or more of the following factors could be used: a subscription plan (e.g., an amount of subscription-fees paid for wireless access); a user profile (e.g., business-user vs. regular-consumer); the date and time-of-day (e.g., to reduce the probability of using high rates during peak daytime hours to reduce potential interference caused during chaotic times or vice-versa); a location (e.g., to reduce the probability of using high rates in densely populated downtown areas to reduce potential interference caused during chaotic times or vice-versa); or credits (e.g., to increase the probability of using high rates for a wireless device that has more credits for wirelessly cooperating/co-existing with other wireless devices or vice-versa).

Figure 6:
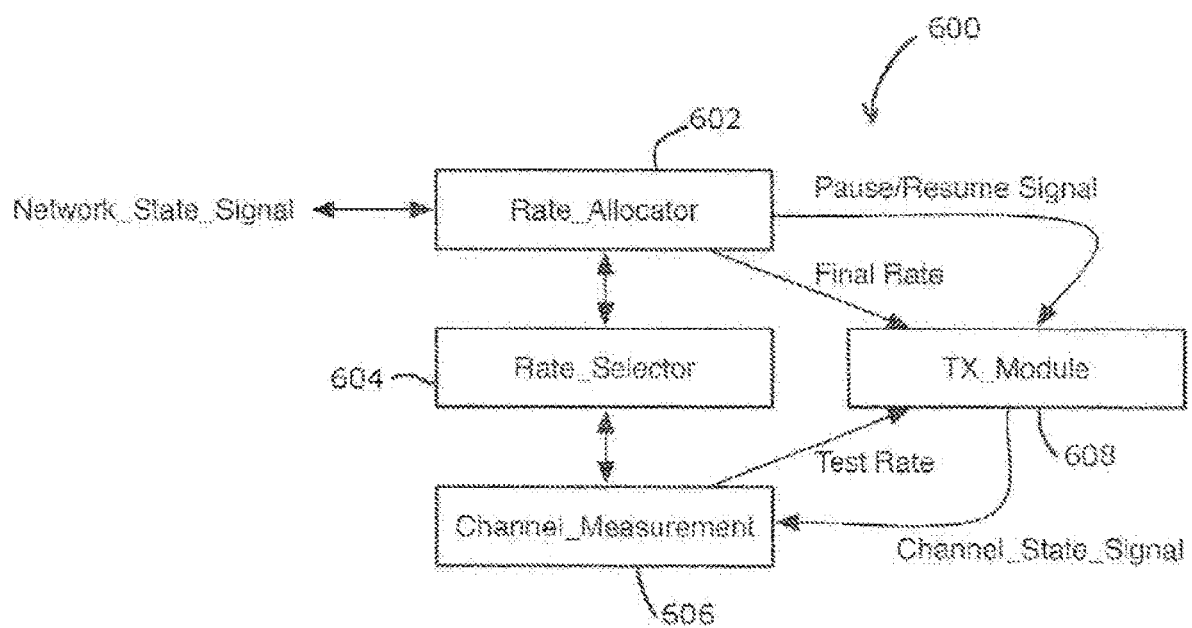
FIG. 6 is a block diagram of a non-cellular interface according to embodiments.

FIG. 6 illustrates an example of portions of a non-cellular interface 600 that may implement the method of FIG. 4. The non-cellular interface 600 may include a rate allocator 602, a rate selector 604, a channel measurement module 606, and a transmit module 608. The rate allocator 602 receive a network state signal and based, at least in part, on the network state signal and inputs from the rate selector 604 determine a physical-layer rate of transmission and transmit power-level for the transmit module 608. In some embodiments, the rate selector 604 determine a maximum physical-layer rate for the transmit module 608, and the transmit module 608 may transmit data at rates less than or equal to that maximum physical-layer rate. The network state signal may include a queue length signal (e.g., a length of the queue or a rate of change of the length of the queue), a signal indicative of subscription fees for a user associated with the wireless device, a user profile, and a date and time. To select a physical-layer rate, in some embodiments, the illustrated rate allocator 602 may determine a maximum proposed physical-layer rate based on the network state signal. The maximum proposed physical-layer rate may be output from the rate allocator 602 to the rate selector 604. Based on the maximum proposed physical-layer rate (e.g., based at least in part on this value), in this embodiment, the rate selector 604 may evaluate the feasibility of physical-layer rates less than the maximum proposed physical-layer rate and corresponding transmit power-levels and return to the rate allocator 602 the highest feasible physical-layer rate less than or equal to the maximum proposed physical-layer rate and the corresponding transmit power-level.

To this end, in this embodiment, the rate selector 604 may output a test physical-layer rate and transmit power-level to the channel measurement module 606, which may test the feasibility of that rate and power level and return a signal to the rate selector 604 indicative of the feasibility of the test physical-layer rate and transmit power-level. The channel measurement module 606 may output the test physical-layer rate and power level to the transmit module 608, which may transmit a data frame at the test physical-layer rate and power level.

After transmitting, the transmit module 608 may receive a signals indicative of the channel state, which may include feedback from other wireless devices indicative of whether the test transmission caused a collision at a wireless devices receiving transmissions from another transmitter wireless device, e.g., from another transmitter transmitting data frames on the same resources of the wireless medium as the wireless device having the non-cellular interface 600. The signals indicative of the channel state may also include a signal indicative of whether the frame transmitted by the transmit module 600 was received, e.g., an acknowledgement frame. The channel state signal may include data indicative of an amount of interference and other aspects of the current wireless environment at either the wireless device receiving signals from the transmit module 608 (as transmitted from the receiver to the transmit module 608) or at the transmit module 608, e.g., a channel quality indicator (CQI), a pre-processing signal to interference and noise ratio (SINR), a post processing SINR, a signal to noise ratio (SNR), a receive signal strength indication (RSSI), or a received channel power indication (RCPI).

In this embodiment, data from the signals indicative of channel state are returned as feedback to the channel measurement module in a channel state signal. And based on the feedback, the channel measurement module 606 may determine whether the test physical-layer rate is feasible. For instance, if the channel state signal indicates a collision was caused by the test transmission, in response, the channel measurement module may determine that the test physical-layer rate was not feasible. If the channel state signal indicates that the frame transmitted by the transmit module 608 was not received, and the channel state signal does not indicate that the transmission caused a collision for other wireless devices, the test physical-layer rate may be determined to be infeasible and a higher test physical-layer rate may be supplied to the channel measurement module 606 by the rate selector.

If the test physical-layer rate is feasible, in response, the rate selector module may provide the test physical-layer rate to the rate allocator 602 as a feasible physical-layer rate. Otherwise, in response, the rate selector module may increment the test physical-layer rate to a lower physical-layer rate to a lower test physical-layer rate and transmit this rate to the channel measurement module 606 to repeat the test at a new rate. Rates may be tested from the maximum physical later rate down to a zero rate until a feasible rate is found. The rate selector 604 may output the highest feasible physical-layer rate that is less than or equal to the maximum physical later rate to the rate allocator 602, which may provide the feasible physical-layer rate to the transmit module 608. In this embodiment, the transmit module 608 may transmit data frames at the feasible physical-layer rate. To this end, the transmit module 608 may select a combination of physical later rate parameters that yield a rate less than or equal to the physical-layer rate, e.g., a modulation scheme, a guard interval, an amount of channel coding, an amount of spectrum over which signals are transmitted, a number of spatial streams, and other wireless transmission parameters. The feasible physical-layer rate may be updated periodically or in response to a detected change in the wireless environment or a change in the network state signal.

Figure 7:
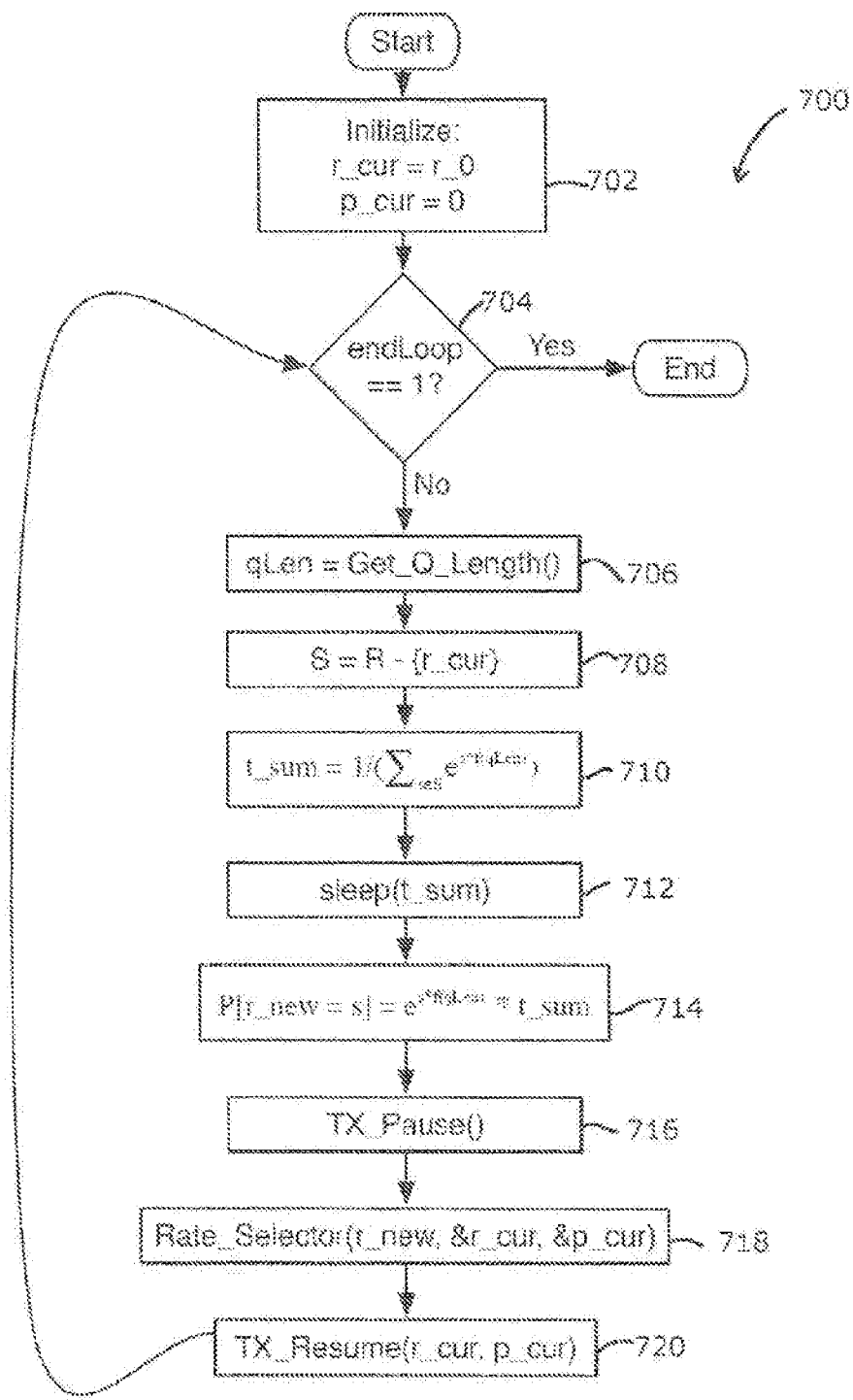
FIGS. 7 and 8 are flow charts of methods for allocating a rate.

Another example implementation of a rate allocation algorithm is shown below in Table 1. As with the other processes described herein, including those of FIG. 3 and Table 2 and Table 3 below, the example of Table 1 may be implemented as a module in software stored on a tangible machine readable medium, or as hardware, e.g., in microcode, or a combination thereof. Depending on the implementation, the values passed and received by the Rate_Allocator module may be encoded in signals transmitted between hardware modules or the values may be exchanged by passing references to memory (e.g., memory addresses or variable names) in which the values are stored or by creating new copies of those values in memory accessible by the module, as is the case with values sent and received by the other processes described herein. The steps of Table 1 are depicted in a corresponding flow chart of FIG. 7, which depicts the operation of the Rate_Allocation module. In FIG. 7, R is the set of rates, [r_0, r, 1, r 2, . . . r_k], where r_0 is no transmission; and f(x) may be a monotonically increasing function, such as log(x), and the endLoop variable indicates whether the process is repeated.

may terminate the rate allocation algorithm by setting endLoop=1. The function f(qLen) in Table 1 may be a generally (or fully) monotonically increasing function of queue length. For instance, f(qLen) may be a slowly increasing function, such as log(qLen) (or other function having a negative, or generally negative, second derivative of queue length within the expected range of queue lengths, e.g., between zero and a max queue length) and is expected to keep the frequency at which rates are updated within reasonable limits.

In some embodiments, the Rate_Allocator module may non-deterministically choose rates from a probability distribution. For example, "r_new" is assigned the value "s" non-deterministically using the probability distribution shown in step 720 of FIG. 7 and the corresponding steps of Table 1. Non-deterministic rate allocation may be useful for preventing one node from hogging access to the wireless channel all the time and allowing nodes with large queue-lengths to co-exist without locking each other out.

In some embodiments, as shown in steps 710 and 712 of FIG. 7, and the corresponding steps in Table 1, the Rate_Allocator module may non-deterministically choose the frequencies at which rates are updated at a node. Non-deterministic rate updates may be useful for reducing the chance of more than one node trying to update its rate at any given instant of time and reducing errors in the estimation of rate feasibility at any given instant of time.

Again referring to Table 1, in this embodiment, during each iteration, the Rate_Allocation module finds $qLen$ by calling the Get_Q_Length module, which may be a module configured to interrogate the queue and return an indication of the amount of data present in the queue. In the single-hop case, qLen may be simply the length of the transmitter's queue. For the multi-hop case, qLen may be the difference in the queue lengths of the transmitter and the next receiver on the multi-hop path to a particular final destination or some other combination of queue lengths of nodes on a multi-hop path. In this example, S is the set R without the data rate $r_{cur}$, or the maximum data rate that is currently being used. In some embodiments, the time between updates may be a random number that follows an exponential

TABLE 1

Algorithm 1 Rate Allocation Algorithm

Chooses the maximum physical-layer rate based on queue-length(s).
Initialize:
Let R = [$r_0, r_1, r_2, ..., r_k$] be the set of rates. $r_0$ = 0, corresponding to no transmission.
Let f(x) be an increasing function, such as log(x).
endLoop ← 0 when a connection is established. endLoop ← 1 when the connection is closed.
Rate_Allocation( )
   $r_{cur}$ = $r_0$; $p_{cur}$ = 0;
   while endLoop ≠ 1 do
      qLen = Get_Q_Length( );
      S = R − {$r_{cur}$};
      $t_{sum}$ = 1/($\Sigma_{s \in S} e^{s \cdot f(qLen)}$);
      sleep($t_{sum}$);
      P[$r_{new}$ = s] = $e^{s \cdot f(qLen)}$ ∗ $t_{sum}$;
      TX_Pause( );
      Rate_Selector($r_{new}$, &$r_{cur}$, &$p_{cur}$);
      TX_Resume($r_{cur}$, $p_{cur}$);
end while In embodiments implementing the technique of Table 1, R is the set containing all rates defined by a wireless standard or available to the embodiment, including the rate r 0=0 (corresponding to no transmission). The wireless driver or other module of a node may activate the rate allocation module and set endLoop=0 when a connection is established. When the connection is closed, the wireless driver distribution with rate lambda_{sum} and mean time t{sum}, though in other embodiments may simply wait for the mean time before initiating the next rate update. In this embodiment, the value t_{sum} depends on qLen and controls the frequency at which the algorithm tries to update the rate. When qLen is large, the rate will be updated more frequently. In this example, where s belongs to the set S, r_{new} is equal to s with probability e^{s*f(qLen)}/(lambda_{sum}). Thus in this embodiment, r_{new} could be any of the rates in R, except for the current rate r_{cur}. In this example, a higher rate always has a higher probability of being chosen as r_{new}, and the probability of choosing the higher rate goes further up as qLen increases.

TPL) by reference to the Rate_Allocation module. The Rate_Allocation module may then reinitialize transmission of regular data frames with r_{cur} and p_{cur}.

Figure 8:
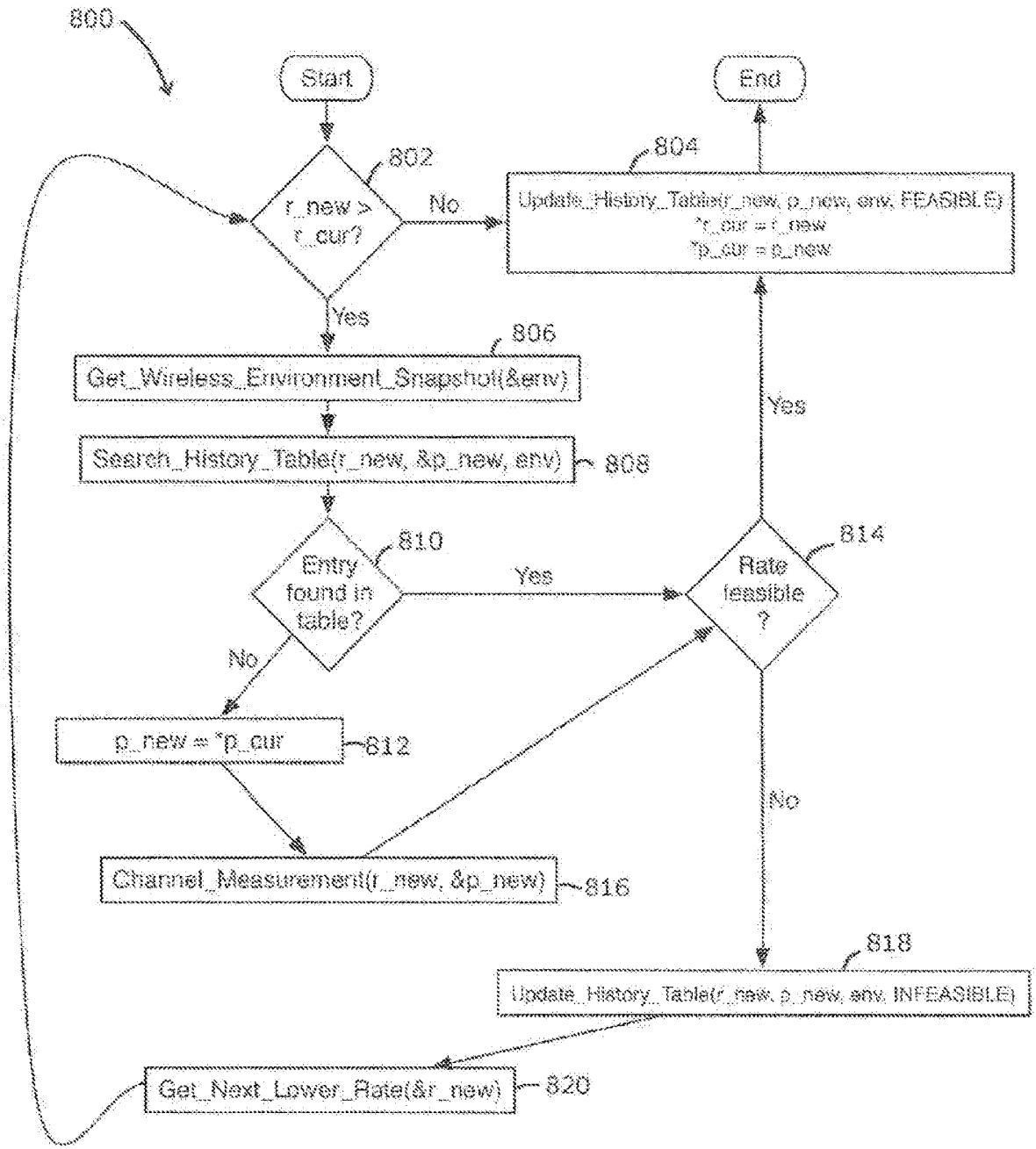

Table 2, below, depicts an example implementation of the Rate_Selector module. The steps are depicted in a corresponding flow chart of FIG. 8, which depicts the operation of the Rate_Selector module.

TABLE 2

Algorithm 2 Rate Selector Algorithm

Uses either a history table or channel measurements to find the highest rate (less than or equal to $r_{new}$) that is currently feasible.
Rate_Selector($r_{new}$, *$r_{cur}$, *$p_{cur}$)
    updateRate = 0;
    if $r_{new}$ < *$r_{cur}$ then
        Snoop_Next_Frame(&$r_{other}$, &rssi$_{other}$);
        val = Search_History_Table($r_{new}$, &p$_{new}$, $r_{other}$, rssi$_{other}$);
        if val == NOT_FOUND || val == INFEASIBLE then
            p$_{new}$ == Find_Lowest_Feasible_TX_Power(*p$_{cur}$);
        end if
        updateRate = 1;
    else
        while $r_{new}$ > *$r_{cur}$ && updateRate = 0 do
            Snoop_Next_Frame(&$r_{other}$, &rssi$_{other}$);
            val = Search_History_Table($r_{new}$, &p$_{new}$, $r_{other}$, rssi$_{other}$);
            if val == FEASIBLE then
                updateRate = 1;
            else if val == NOT_FOUND then
                p$_{new}$ = *p$_{cur}$;
                if Channel_Measurement($r_{new}$, &p$_{new}$) == 1 then
                    updateRate = 1;
                else
                    Update_History_Table($r_{new}$, p$_{new}$, $r_{other}$, rssi$_{other}$, INFEASIBLE);
                    Get_Next_Lower_Rate(&$r_{new}$);
                end if
            else if val == INFEASIBLE then
                Get_Next_Lower_Rate(&$r_{new}$);
            end if
        end while
    end if
    if updateRate == 1 then
        Update History Table($r_{new}$, p$_{new}$, $r_{other}$, rssi$_{other}$, FEASIBLE);
        *$r_{cur}$ = $r_{new}$; *p$_{cur}$ = p$_{new}$;
    end if As depicted in Table 1, in this embodiment, once r_{new} is selected, the Rate_Allocation module may temporarily pause transmission of regular data frames. Pausing transmission of regular data frames (for the time it takes Rate_Selector to establish the feasibility of a given rate) may improve the accuracy of the Rate_Selector module. After such a pause, embodiments may invoke the Rate_Selector module and pass to the Rate_Selector module r_{new} (the new rate to try) by value, r_{cur}$ (the current rate being used) by reference, and $p_{cur}$ (the current transmit power-level, or TPL, being used) by reference.

In this embodiment, as explained below, the Rate_Selector module may obtain information from a history table to find the highest rate less than or equal to the given rate r_{new} that is feasible, or is likely to be feasible, in the current wireless environment. The history table may be stored in memory, and data may be added or retrieved by writing or reading from memory. Or in some embodiments, the Rate_Selector module may empirically measure the channel by transmitting data and receiving feedback from a receiving device to find the highest rate less than or equal to the given rate r_{new} that is feasible in the current wireless environment. As described in detail in the following subsection, in some embodiments, the Rate_Selector module may return r_{cur} (the highest rate less than or equal to the given rate that is currently feasible) and p_{cur} (the target In this embodiment, the Rate_Selector module may find the highest rate less than or equal to the given rate r_{new} that is feasible in the current wireless environment. To this end, the Rate_Selector module may be passed the variable r_{new} by value, and the variables r_{cur} and p_{cur} by reference. When testing whether a rate is feasible, Rate_Selector may first search the history table to reduce overhead. The history table may be an estimate of the rate region. Depending on the complexity of the network and available device resources, the history table may be implemented as a hash table, B-tree, a 2-D array, or other data structure. In some embodiments, the Rate_Selector module may identify a feasible rate based, at least in part, on previous rates that proved feasible or infeasible for the wireless device.

In the example of Table 2, each device may maintain (e.g., in this context, obtain data for, populate, and store in memory) its own history table, and each row of the table (or other entry format, depending on the data structure selected) may include or otherwise be associated with a time-to-live (TTL) value, a value indicative of how recently the entry was updated. For example, if a device updates an entry of the device's history table, the device may also set a TTL value associated with (e.g., in the same row, or as an attribute of) that entry to the maximum value, indicating the maximum time over which the value will be given weight when determining the feasibility of future rates. In some embodiments, the maximum TTL value may be one of the following: 1) Less than 1 second when several highly mobile devices are present in the vicinity; 2) More than 1 second when only a few mobile devices are present in the vicinity; or 3) Adaptively calculated based on historical data (e.g., accuracy of history table or rate region estimate).

The entry may also include or otherwise be associated with context values indicative of the feasibility of a rate subject to other parameters, e.g., at a transmit power, in the presence of an amount of interference. For instance, a device (e.g., the device maintaining the history table) may have tried to use rate r_{new} and transmit power-level (TPL) p_{new} in the presence of rssi_{other} interference from another transmitter while the other transmitter was using rate $r_{other}$. Within a row, a 0 in the Feasible column may depict that such a combination was infeasible whereas a 1 may depict that such a combination was feasible. In other embodiments, other data structures may associate feasibility information with transmission parameters in other ways. Further, since a transmitter node may have several destinations, the history table may also record the source and destination addresses and associate those addresses with the above described values.

Again referring to Table 2, in some embodiments, in order to search the history table, a device may use values for r_{new}, r_{other}, and rssi_{other} to identify one or more records of the history table. These values may be obtained with a variety of techniques. For example, r_{new} could be provided to the Rate_Selector module by the Rate_Allocation module described above. The other values, r_{other} and rssi_{other}, which may correspond to the strongest interferer, may be obtained by snooping the preamble of an interfering frame (or the entire interfering frame and the corresponding acknowledgment). In some embodiments, r_{other}, and rssi_{other} may characterize the strongest interferer. In other embodiments, the snooping receiver may be capable of multi-packet reception, and packets from multiple interfering devices may be snooped or otherwise obtained for use with the history table. Snooping may be performed by the Rate_Selector module using the MAC/PHY/Radio hardware of the underlying wireless chipset (examples of wireless chipsets include, but are not limited to, 802.11 chipsets, Bluetooth chipsets, UWB chipsets, WiGig chipsets, etc.). Once a device has all three values, the Rate_Selector module of the device may search the history table for a close enough match to check whether the combination of rates and powers is feasible in the current wireless environment. In some embodiments, the device may define what constitutes a close match conservatively at the start. For example, the snooped value of rssi_{other} may be considered close to an entry of the history table only if it exactly matches the corresponding value in the entry of the history table. In another example, the snooped value of r_{other} may be considered close to an entry of the history table only if it is less than or equal to the corresponding value in the entry of the history table. In some embodiments, searching with the above constraints may yield several close matches in the history table. The Search_History_Table sub-module of the Rate_Selector module can then find the closest match among the close matches (e.g. by using the closeness of individual values, TTL of entries being considered, priority of the wireless device, queue-length of the wireless device, value of r_{new} being tried, etc.) to determine the feasibility of the three values being used in this example (i.e. r_{new}, r_{other}, and rssi_{other}).

Further, in some embodiments, the Rate_Selector module may adaptively change the criteria for a close match depending on historical data and the accuracy of the history table at estimating the rate region and rate feasibility. For example, if rate feasibility estimates are over 90% accurate, the snooped value of rssi_{other} may be considered close to an entry of the history table only if it is within 3 dB (or some other units) of the corresponding value in the entry of the history table. In another example, if rate feasibility estimates are 90% accurate, the snooped value of r_{other} may be considered close to an entry of the history table only if it less than, equal to, or one level more than the corresponding value in the entry of the history table. In some instances, searching with the above constraints may yield several close matches in the history table. The Search_History_Table sub-module of the Rate_Selector module may then find the closest match among the close matches (e.g. by using the closeness of individual values, TTL of entries being considered, priority of the wireless device, queue-length of the wireless device, value of r_{new} being tried, etc.) to determine the feasibility of the three values being used in this example (i.e. r_{new}, r_{other}, and rssi_{other}).

Again referring to Table 2, in this embodiment, the Rate_Selector module may determine if *r_{cur} is greater than r_{new}, and in response (e.g., solely in response to this determination, or in response to this determination and other factors), the Rate_Selector module may determine that r_{new} is feasible. The device may then determine the value of TPL p_{new}, which is a proposed new transmit power-level. In some embodiments, the Rate_Selector module may obtain p_{new} from the history table when searching the history table by using the Search_History_Table sub-module. It should be noted that, in this embodiment, p_{new} is passed by reference and can be filled in by the sub-module if a feasible close-enough match is found) If a close enough feasible match exists in the history table, the obtained value of p_{new} may be the new transmit power-level. The TPL of closely matched entries in the history table is/are an indicator of a potentially feasible TPL, but some records may become stale before their expiry due to drastic changes in the wireless environment. In some embodiments, even when a close enough match is found in the history table, the Rate_Selector module described in Table 2 may perform a relatively quick feasibility test to improve robustness. In this example, feasibility may be determined by actually transmitting a frame at rate r_{new} and transmit power-level p_{new}, and receiving any ACK frame from intended receiver. If an ACK is received, the feasibility indication from the history table for the combination of r_{new} and p_{new} may be considered as accurate. If no ACK is received, the feasibility indication from the history table for the combination of r_{new} and p_{new} may be considered as inaccurate; moreover, the corresponding entry of the history table could be deleted, updated, or invalidated to prevent further errors in estimating rate feasibility.

If no feasible match exists in the history table (e.g., if val equals NOT FOUND), the Rate_Selector module may determine a TPL by using *p_{cur} TPL to transmit data, sensing ACK signals from a receiving device indicating receipt, and gradually reducing the power of subsequent data transmissions until the TPL reaches the reaches a relatively low feasible amount, e.g., by reducing until no ACK is received and backing off. This approach, in some embodiments, is believed to be advantageous because, if *r_{cur}>r_{new}, the target TPL p_{new} will often be less than or equal to *$p_{cur}.

In some embodiments, the Rate_Selector module may use, e.g., exchange control and data signals with and request operations by, the following sub-modules:

1. A Snoop_Next_Frame module, which in some embodiments may snoops frame (i.e. data, control, management, etc. frames) being exchanged between other wireless devices. Snooping may provide the following information about the frames: a) RSSI/SNR/SINR/CQI of snooped frame at the snooping wireless device; b) absolute transmit power that was used at the transmitter of the snooped frame (e.g. this could be included in the snooped frame; or it could be based on information gathered from other frames transmitted by the same transmitted at a different instant of time, such as beacons); c) physical-layer rate of snooped frame; d) length of snooped frames (e.g. in units of bytes; or in units of time); e) source, destination, or relay MAC/IP addresses associated with the snooped frame; f) and other Radio/Baseband/MAC/Network/Transport/Application layer information associated with the snooped frame, such as number of antennas, beam-forming weights, absolute transmit power, topology estimate, schedule, estimated latency/jitter, timeouts, application-ID, etc.

2. A Search_History_Table, which in some embodiments may search the history table for the closest match based on inputs/parameters provided. If a match is found, indicates whether the input rate is feasible based on cataloging of historical feasibility data. If no match is found, indicates that no match currently exists.

3. A TX_Frame module, which in some embodiments may transmits a data frame at a given (maximum) rate and power using the MAC/Baseband/Radio hardware of the underlying wireless chipset. In some embodiments, this sub-module may transmit the data frame according to a specified deterministic schedule. This sub-module also provides the result of transmission to the calling module/sub-module. Result can be estimated based on received ACK frames or other channel-state measurements.

4. A Delete_History_Table module, which in some embodiments may delete/invalidate (close-enough) entries from the history table corresponding to the inputs/parameters provided. If no (close-enough) entries are found, this sub-module will not modify the history table.

5. An Update_History_Table module, which in some embodiments may update (close-enough) entries from the history table corresponding to the inputs/parameters provided. If no (close-enough) entries are found, this sub-module adds a new entry to the history table corresponding to the inputs/parameters provided.

6. A Get_Next_Lower_Rate, which in some embodiments may gets the next lower physical-layer rate (based on the input physical-layer rate) from the set/sub-set of available physical-layer rates.

Again referring to Table 2, the Rate_Selector module of this embodiment is also configured to address the case when $*r\_\{cur\} < r\_\{new\}$. (As used herein, the symbols "<", ">", and "=" are intended to describe embodiments in which the values on either side of the symbols are greater than, less then, or equal to one another as well as other embodiments in which the values are approximately greater than or equal to, approximately less than or equal to, or approximately equal to one another, as the corresponding relationships are also generally applicable to approximate values.) As before, if a close enough feasible match is found in the history table, as the term "close enough" is characterized above, the search operation on the history table performed by the Search_History_Table module may provide the target TPL $p\_\{new\}$. However, if no close enough (valid/fresh) entry is found in the history table, the Rate_Selector module may measure the channel to test the feasibility of the given rate In this embodiment, measurement is performed by calling the Channel_Measurement module. The Channel_Measurement module may test rates for a variety of different modules when those modules are in need of an indication of channel measurements. In some embodiments, the Channel_Measurement module may be passed $r\_\{new\}$ (the rate to be tested) by value and $p\_\{new\}$ by reference. In some embodiments, the Rate_Selector module may pass the value of $*p\_\{cur\}$ as $p\_\{new\}$ to the Channel_Measurement module. This approach, in some embodiments, is believed to be advantageous because, if $*r\_\{cur\} < r\_\{new\}$, the corresponding TPL $p\_\{new\}$ will often be greater than or equal to $*p\_\{cur\}$. As is explained later, Channel_Measurement may then increment $p\_\{new\}$ to the target value.

Again referring to Table 2, if channel measurement performed by the Channel_Measurement module indicates that the given rate is not feasible in the current wireless environment, the history table may be updated to reflect the infeasibility for future reference, e.g., by the Update_History_Table module. Moreover, if another rate exists between $r\_\{new\}$ and $*r\_\{cur\}$, the same or a similar process could be repeated with the lower rate to check whether the lower rate is feasible. If channel measurement done by the Channel_Measurement module indicates that the given rate is feasible in the current wireless environment, the Rate_Selector module may receive the target TPL $p\_\{new\}$ from the Channel_Measurement module. In some embodiments, the Rate_Selector module may then update $*r\_\{cur\}$ to contain the highest rate (less than or equal to the originally provided rate) that is feasible in the current wireless environment. The Rate_Selector module may also update $*p\_\{cur\}$ to contain the target TPL for transmitting data frames at rate $*r\_\{cur\}$ to the intended receiver. The updated values may then be returned to the Rate_Allocation module.

Some embodiments measure the channel to test the feasibility of a given rate in the current wireless environment. In other embodiments, channel measurement may refer to the process of obtaining the likelihood of a rate being feasible in the current wireless environment. The likelihood estimate could take the hardware/software capabilities (e.g. half-duplex, full-duplex, single-packet reception, multi-packet reception, distributed, centralized, hybrid, etc.) of the wireless device (i.e. the device executing the Channel_Measurement module) into account. One way to facilitate channel measurement is by using jamming (or alternatively request) frames. In some embodiments, a jamming frame may be used as a jamming signal, which is a signal that preempts other devices from transmitting data signals. In some other embodiments, the jamming frame may operate as a feedback signal from other wireless devices indicating whether a parallel transmission caused a collision for the other wireless devices, as explained below.

Random access networks, such as 802.11, use different inter-frame spacings (IFSs) to facilitate MAC protocol design. IFS values are time slots between frames during which a device can transmit for a particular purpose to gain control of the wireless medium. If a device transmits in an IFS slot, other devices waiting for a later slot will generally wait for the device to complete a transmission. Higher priority transmissions have shorter IFS slots, allowing those transmissions to preempt lower priority transmissions. For example, a short IFS (SIFS) duration separates RTS, CTS, DATA, and ACK frames. A slightly longer polling IFS (PIFS) duration separates previously transmitted frames from higher priority management frames. An even longer distributed IFS (DIFS) duration separates previously transmitted frames from subsequent data frames. Thus by delegating different tasks to different IFSs, wireless networks can be controlled, managed, and operated in a distributed manner. Such a distributed architecture could provide a foundation for designing MAC protocols for mobile ad-hoc networks. While current random-access wireless standards, such as 802.11, may not be ideal for mobile ad-hoc networks, certain embodiments implement suitable MAC protocols through the use of jamming frames or other jamming signals. In some implementations, the jamming frames are transmitted during a lesser IFS than data frames, an example of which is shown in a timing diagram of FIG. 9, which depicts transmissions by three nodes 502, 504, and 506 vertically and time horizontally.

In some embodiments, the jamming frames have a number of properties. For instance, the JIFS may be different from the PIFS, or in other embodiments, the JIFS may be approximately equal to the PIFS. The jamming frames, in some embodiments, may be used for cooperation and coordination between different groups of nodes: all nodes; different base-stations; transmitters using deterministic schedules; transmitters transmitting downlink frame; transmitters when transmitting downlink frames. In some embodiments, the jamming frames considered jamming signals, which may prompt certain behaviors in other wireless devices. In some embodiments, jamming/request frames may be used by a wireless device to get other wireless devices to converge to a specific schedule, converge to a specific asymmetric schedule, or converge to a specific route.

Figure 9:
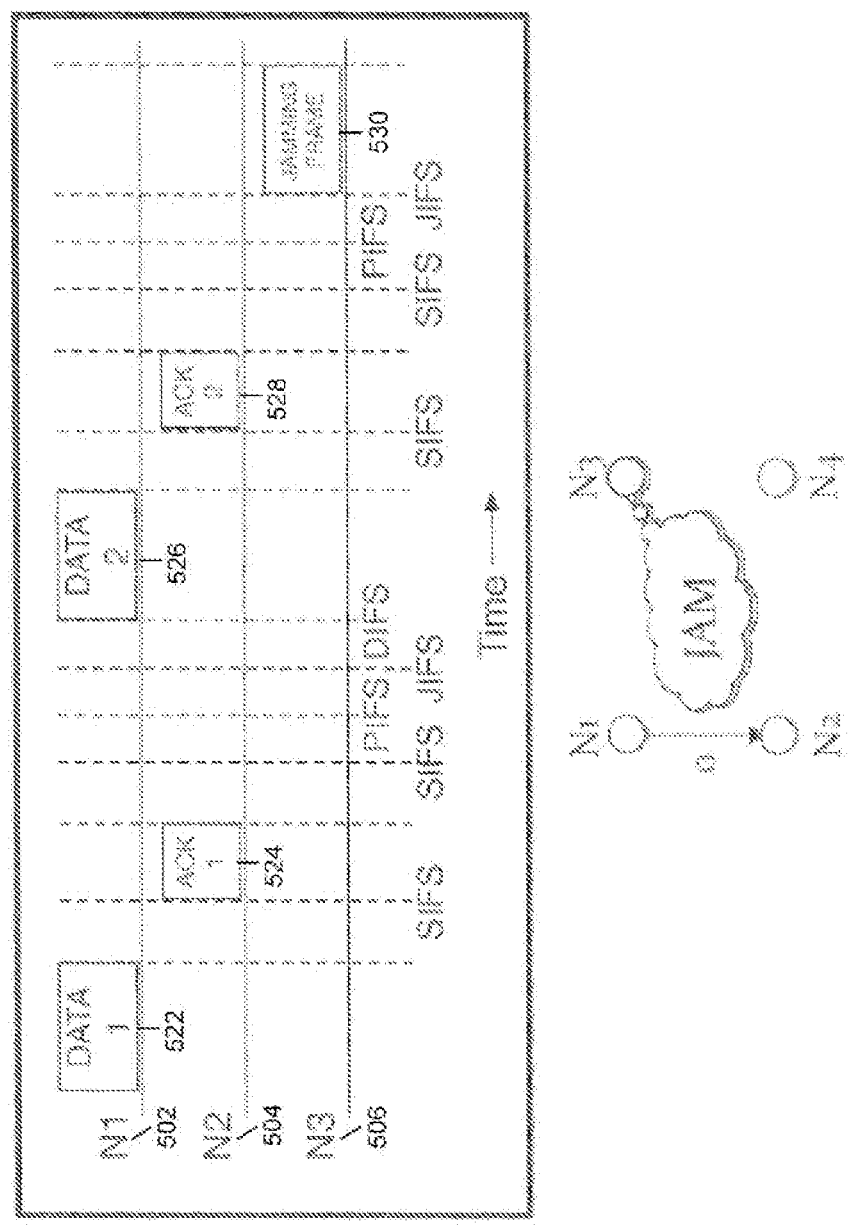
FIG. 9 is a timing diagram illustrating jamming frames.

As shown in FIG. 9, in some embodiments, a jamming frame 530 may be scheduled for transmission jamming IFS (JIFS) time after the previous frame, e.g., after ACK (or acknowledgement) signal 528, as illustrated, or after the other signals 522, 524, or 526. In this example, node 502 transmits data frames to node 504. However, in this example, data frames can only be transmitted DIFS time after any previous frame is done transmitting, during the designated IFS for that type of transmission. If another device begins transmitting prior to the onset of the DIFS, in this example, the other device gains control of the wireless medium, and other devices will wait until the next appropriate IFS after that transmission for the type of transmissions that they have in queue, assuming that yet another device does not transmit during an earlier portion of that IFS and seize control of the wireless medium. This IFS protocol is followed so that higher priority management and control frames can be exchanged to keep the wireless network functional and stable, though other embodiments may achieve this result with other techniques. Other techniques used by other embodiments may include the following: 1) generally simultaneous or concurrent out-of-band transmission, where out-of-band corresponds to a different orthogonal domain, such as in a different frequency, time-slot, code, etc.; 2) generally simultaneous or concurrent in-band transmissions for wireless devices to and/or from wireless devices with multi-frame or multi-packet reception and/or transmission capability, where in-band corresponds to in the same orthogonal domain, such as in the same frequency, time-slot, code, etc.; and 3) generally simultaneous or concurrent in-band transmissions for wireless devices to or (i.e., and/or) from wireless devices with full-duplex reception or transmission capability, where in-band corresponds to in the same orthogonal domain, such as in the same frequency, time-slot, code, etc.

Figure 10:
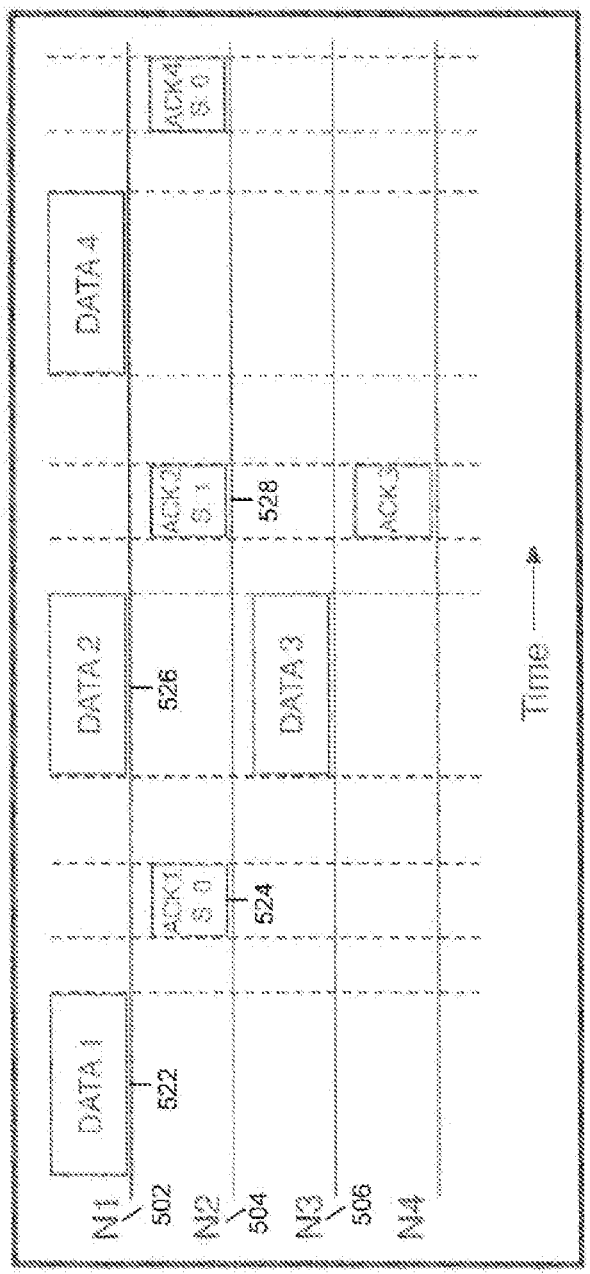
FIG. 10 is a timing diagram illustrating snooping of acknowledgement frames.
Figure 10:
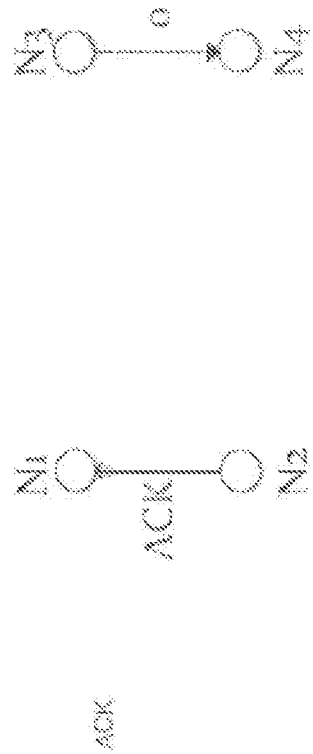

In the example of FIG. 10, node 506 may suddenly want to start transmitting data frames. However, node 506 cannot do so without causing a collision, as other devices are using the wireless medium. Thus in this example, node 506 transmits a jamming frame 530 JIFS time after the previous frame 528. Node 502 may receive the jamming frame and could interpret the jamming frame based on its presence, its contents, its length, or the number of jamming frames received. For example, node 502 may interpret the jamming frame transmitted by node 506 to mean that node 506 also wants to transmit, and thus node 502 should start using a different scheduling algorithm, such as randomized back-off, to co-exist with node 506. Thus in this example jamming frames do not break the management and control functionality of wireless networks, e.g., 802.11 networks. Moreover, jamming frames may be used by nodes to send messages/requests to other nearby nodes without causing collisions and without waiting for a free DIFS.

Some embodiments may use jamming frames to convey messages/requests between nodes without causing collisions. For example, some nodes may differentiate between collisions and being jammed. Moreover, in some implementations, mechanisms such as exponential randomized back-off that are unfavorable for nodes that experience collisions are not expected to be affected by the use of jamming frames. Furthermore, some embodiments may differentiate between intentional jamming frames and traditional collisions, which is expected to help nodes detect the presence of hidden nodes, e.g., nodes in range of hidden nodes can indicate to out of range nodes about the presence of hidden nodes using jamming frames. In some embodiments, the Channel_Measurement module (and its established flow counterpart) may use jamming frames to facilitate channel measurements, as described below.

In some embodiments, jamming frames may be used for testing the feasibility of a given rate. For instance, a first wireless device may attempt to transmit a frame at a first data rate and a first transmit power-level. And a second wireless device may be transmitting frames without using randomized back-off. When testing the feasibility of a rate, the first device may attempt to transmit frames in parallel with the second device. If the first device receives no ACK from its intended receiver, the first device may increase the transmit power-level by a single step, or other variable increment, and retransmits the frame. As the first device tries to test the feasibility of the first data rate, the first device may cause collisions for the second device. And when the second device senses a number of collisions, e.g., more than a threshold or more than a threshold rate of collisions or change in the rate of collisions, in response (e.g., solely in response to such a determination, or in response to such a determination and other factors), the second device could start sending jamming frames. These jamming frames may potentially jam the channel for the first device, thereby preempting additional data frame transmissions by the first device by seizing control of the wireless medium prior to the onset of the DIFS. If the first device senses a jam, e.g., by receiving a jamming signal during the JIFS, the first device may conclude in response that the given rate is not feasible. If no jamming frames are received at the first device from the second device within a pre-determined amount of time (or an amount of time dynamically or otherwise determined), the first device may conclude that the first data rate is feasible at the estimated transmit power-level and update a transmission history table of the first device and continue transmitting at the feasible rate. In other embodiments, other signals may operate as the feedback signal, e.g., an out-of band signal on a different channel, or data encoded in a beacon, for instance, may signal to other wireless devices that a collision occurred.

As mentioned above, the Channel_Measurement module may be implemented in support of various channel measurement algorithms. In some embodiments of this module, if the given rate is feasible, the Channel_Measurement module may return 1 by value and the target TPL by reference. If the given rate is not feasible, the Channel_Measurement module may return a 0 by value and the infeasible TPL by reference. A first example of a channel measurement algorithm (CM1) is described below in Table 3 with reference to a first embodiment of a Channel_Measurement module. In the CM1 embodiment, the Channel_Measurement module may use jamming frames to test the feasibility of a rate in the current wireless environment.

TABLE 3

Algorithm 3 Channel Measurement Algorithm 1 (CM1)

Uses jamming frames to test whether rate $r_{new}$ is feasible in the current wireless environment.
Channel_Measurement($r_{new}$, $*p_{new}$)
  ourFlow = TX_Frame($r_{new}$, $*p_{new}$);
  while ourFlow != ACK do
    if ourFlow == NO_ACK then
      if $*p_{new}$ == MAX_POWER then
        return 0;
      end if
      $*p_{new}$ = $*p_{new}$ + 1;
    else if ourFlow == JAMMED then
      return 0;
    end if
    ourFlow = TX_Frame($r_{new}$, $*p_{new}$)
  end while
  wait = JAM_WAIT;
  while wait > 0 do
    if TX_Frame($r_{new}$,$*p_{new}$) == JAMMED then
      return 0;
    end if
    wait = wait − 1;
  end while
  return 1;

The operation of the CM1 embodiment of Table 3 can be understood with reference to an example scenario in which a first device tries to transmit a frame at rate r_{new} and TPL *p_{new}. In this example, a second device may be transmitting frames without using randomized back-off. In some scenarios, randomized back-off may be avoided by facilitating parallel transmissions that interfere with one another, but not so much as to cause a collision. When testing the feasibility of a rate, a first device may attempt to transmit frames in parallel with the second device. If the first device receives no ACK from the intended recipient of frames transmitted by the first device, the Channel_Measurement module of the first device may respond by increasing the TPL by a single step (or other increment) and the first device may retransmit the frame. TPL may be increased by the Channel_Measurement module until an ACK is received up to a maximum of MAX POWER. As the first device tries to test the feasibility of rate r_{new}, the first device may cause collisions for the second device. When the second device senses a few collisions (e.g., more than a threshold, more than a threshold rate of collisions, or more than a threshold change in a rate of collisions), the second device may respond by transmitting jamming frames, or other preemption signals or feedback signals. The first device may sense collisions by receiving the jamming frames or other signals and, in response, determining that a collision occurred and that the previous rate is infeasible. In the embodiment of Table 3, these jamming frames are expected to jam the channel for the first device, thereby preempting transmissions of data frames by the first device. If the first device senses a jam, e.g., by receiving a jamming frame during the JIFS from the second device, the first device may respond by it concluding that the given rate presently in use by the first device is not feasible and the Channel_Measurement module may return a 0 to the caller Rate_Selector module. Thus, the first device may receive a feedback signal indicative of whether parallel transmissions by the first device and another device caused a collision for the other device and, based at least in part on this feedback signal, the Channel_Measurement module of the first device may select a physical-layer rate.

Again referring to Table 3, if the first device receives an ACK for a sent frame, the first device may respond by trying to transmit JAM WAIT number of frames at rate r_{new} and the target TPL *p_{new} while waiting for any jamming frames from the second device. This extra step may be employed in some embodiments because the second device may take some time to detect enough collisions before transmitting jamming frames. If the first device receives a jamming frame during this step, the first device, e.g., a Channel_Measurement module in the first device, may respond by determining that the given rate is not feasible and may return a zero to the caller module Rate_Selector. If the first device transmits an additional JAM WAIT frames and receives no jamming frames from the second device, the first device may respond by determining that the given rate is feasible at the estimated TPL and returns a 1 to the Rate_Selector module.

Table 4 below depicts the operation of another example of a Channel_Measurement module. The example Channel_Measurement module shown in Table 4 differs from the previous embodiment in how the Channel_Measurement module measures the channel and tests the feasibility of a given rate in the current wireless environment. The Channel_Measurement module of Table 4 may implement another example of a channel measurement algorithm, referred to as CM2. While in certain implementations of the previously described CM1 embodiment the onus was on the transmitter of the established flow to indicate infeasibility to the new transmitter by transmitting jamming frames or other feedback signals, CM2 makes the new transmitter do most of the work when testing the feasibility of a new rate. In some embodiments, in the Frame Control field of the ACK frame, e.g., in certain 802.11 ACK frames, there may be several unused bits, such as ToDS, FromDS, Retry, More Data, Protected Frame, and Order bits. In some embodiments, one of the unused bits may be used as a sequence (SEQ) bit, which indicates the sequential relationship between at least two frames, e.g., whether one frame was transmitted before another consecutive frame, or the relative sequence of transmission of three consecutive or non-consecutive frames. In CM2, the Channel_Measurement module may use the SEQ-bit of ACK frames to facilitate efforts by another transmitter to test the feasibility of a given rate in the current wireless environment. In other embodiments, sequence may be indicated without use of a sequence bit. For instance, in certain embodiments, if fragmentation is turned off, a receiver may copy the Sequence Control field of the received data frame and place it into the duration field of the ACK that the receiver transmits to signal reception of a frame from another device to the other device. As explained below, changes in the sequence bit or other sequence indicator may provide feedback to devices transmitting in parallel regarding whether the parallel transmission is feasible.

Get_Next_SEQ_Bit module, in some embodiments, may be configured to do the following:

1. The Get_Next_SEQ_Bit sub-module may be called by another module/sub-module on the device, such as the Channel_Measurement module in this example. In some embodiments, no input may be provided to the Get_Next_SEQ_Bit sub-module.

2. The Get_Next_SEQ_Bit sub-module may continue listening/sensing/receiving on the wireless channel until an ACK frame is snooped or until a timeout occurs for the sub-module.

3. If an ACK frame is snooped, in response, the Get_Next_SEQ_Bit sub-module may extracts the SEQ-bit from the snooped ACK frame and returns it to the caller, such as the Channel_Measurement module in this example.

4. If an ACK frame is not snooped before the sub-module timeout (e.g. in some embodiments, this timeout could be configured as 5 ms) occurs, in response the Get_Next_SEQ_Bit sub-module may return an error code indicating that no ACK was snooped to the caller, such as the Channel_Measurement module in this example.

The Channel_Measurement module may assign the extracted SEQ-bit value to the variable oldSEQBit, thereby storing the value in memory, as occurs during the other operations described herein whereby a value is assigned to a variable.

TABLE 4

Algorithm 4 Channel Measurement Algorithm 2 (CM2)

Uses the SEQ-bit of ACK frames to test whether $r_{new}$ is feasible in the current wireless environment.

```
Channel_Measurement(r_new, *p_new)
    oldSEQBit = Get_Next_SEQ_Bit( );
    while 1 do
        ourFlow = TX_Frame(r_new, *p_new);
        newSEQBit = Get_Next_SEQ_Bit( );
        if oldSEQBit == -1 || newSEQBit == -1 || newSEQBit == oldSEQBit then
            if ourFlow == NO_ACK then
                if *p_new == MAX_POWER then
                    return 0;
                end if
                *p_new = *p_new + 1;
            else
                return 1;
            end if
        else
            return 0;
        end if
        oldSEQBit = newSEQBit
    end while
```

The operation of the Channel_Measurement module of Table 4 can be explained with reference to the signal timing diagram of FIG. 10. In FIG. 10, Node_3 has an instance of the Channel_Measurement module implementing CM2 and described in Table 4. This Channel_Measurement module may establish the feasibility of a rate for Node_3. As illustrated, Node_1 transmits Data Frame 1. This data frame is received by Node_2, which determines that the frame was successfully received, and in response, transmits ACK 1 to acknowledge receipt of Data Frame 1 to Node_1.

As described in Table 4 and depicted in FIG. 10, Node_3 (e.g., using a Get_Next_SEQ_Bit sub-module of Node_3 does the snooping as well) may snoop ACK 1 (e.g., by sensing whether other wireless devices, such as Node_1 and Node_2, are exchanging an ACK signal, and receiving that ACK signal). In response to receipt of ACK 1, the Channel_Measurement module of Node_3 may use a Get_Next_SEQ_Bit module to extract the SEQ-bit from ACK1. The Next, as illustrated in FIG. 11, Node_3 may transmit Data Frame 3 to Node_4 in parallel with a transmission by Node_1 of Data Frame 2 to Node_2. In some scenarios and embodiments, these parallel transmissions may occur at approximately the same time or during overlapping durations. The parallel transmissions by the two wireless devices to different recipient devices may use the same, approximately the same, or overlapping resources of the wireless medium. For instance, the parallel transmissions may use the same or overlapping orthogonalizations, such that, for example, each transmission occurs at approximately the same time, on approximately the same frequencies, using approximately the same codes in the case of code division multiplexed signals. That is, in some embodiments, Data Frame 2 and Data Frame 3 may be interfering transmissions from Node_1 and from Node_3 using the same or some of the same wireless transmission parameters.

Node_3 may attempt to evaluate the feasibility of the rate and transmission power level with which Node_3 transmitted Data Frame 3 by determining whether this transmission caused a collision that prevented the Data Frame 2 transmitted in parallel from being received. To this end, Node_3 may attempt to snoop the ACK 2 signal. Due to the parallel transmissions, however, Node_3 may, in some instances, not successfully snoop ACK 2 from Node_2 because node_3 may also attempt to determine whether Data Frame 3 was received by Node_4 by receiving the ACK 3 signal from node_4 indicating successful receipt of Data Frame 3. In some cases, however, Node_3 may be able to receive both ACK 2 and ACK 3, and may skip the next step.

Again referring to both Table 4 and FIG. 11, in some scenarios, Node_3 may thus have no idea about whether ACK 2 was transmitted from Node_2 to Node_1, and thus, Node_3 may not know whether Data Frame 2 was successfully transmitted and received while it was busy transmitting its own Data Frame 3. If Node_3 receives ACK 3, Node_3 knows that its Data Frame 3 was successfully received by its intended receiver Node_4. Node_3 may subsequently determine whether the parallel transmission of data frame 3 caused a collision that broke the flow from Node_1 to Node_2. Thus, next Node_3 may snoop ACK 4, the acknowledgment signal precipitated by receipt of the next data frame, Data Frame 4, transmitted by Node_1. Node_3 may pass data from the acknowledgment signal ACK 4 to the Get_Next_SEQ_Bit module to extract the SEQ-bit from ACK4, and then assign the extracted SEQ-bit value to the variable newSEQBit.

Again referring to both Table 4 and FIG. 11, in operation, in a scenario in which the oldSEQBit is equal to 0, the value of newSEQBit could either be 0 or 1. If newSEQBit is 0, node_3 may determine that the transmission of data frame 3 did not break the flow from Node_1 to Node_2 in time slot 2 because the next frame transmitted by Node_1, data frame 4, is fresh or is a different data frame, as indicated by the sequence bit having returned back to zero. If Node_3 did not receive ACK 3 from Node_4 in time slot 2, Node_3 may repeat the ACK snooping process while using a higher TPL. Otherwise Node_3 (e.g., the Channel_Measurement module of Node_3) may conclude that the given rate is feasible and returns 1 to the caller module Rate_Selector. If newSEQBit is 1, Node_3 may determine that the transmission of data frame 3 in parallel with the transmission of data frame 2 broke the flow from Node_1 to Node_2 because Data Frame 4 is a retransmission of Data Frame 2, as indicated by the sequence bit not having returned back to zero. Thus, Node_3 (e.g., the Channel_Measurement module of Node_3) may conclude that the rate is not feasible and returns a 0 to the caller module Rate_Selector based, at least in part, on the change or absence of change of a sequence indicator signal.

While the present embodiments are described with reference to a sequence bit, other embodiments may use other sequence identifiers. For example, a multi-bit sequence identifier may identify a sequence with which frames are to be transmitted in a longer string of consecutive frames. As with the one bit example, in these embodiments, collisions may be detected in the Channel_Measurement module by determining whether a parallel transmission prevented the reception of a data frame exchange by other devices by examining whether subsequent acknowledgment frames indicate the absence of the sequence indicator having been incremented.

Again referring to both Table 4 and FIG. 11, in some embodiments, the Get_Next_SEQ_Bit module returns a −1 if no ACK is snooped from a nearby node. Vulnerable receivers and interfere ring transmitters may not be present when no ACK is snooped from nearby nodes. Additionally, it should be noted that the present techniques are consistent with scenarios in which Data Frame 2 and Data Frame 3 are different sizes. The ACK frame may be sent by a receiver without using carrier sensing as long as the receiver receives the data frame correctly. Detecting successful reception of parallel transmissions is believed to be beneficial for getting more spatial reuse in wireless networks. Such approaches are expected to allow some interfering links to be turned on in parallel, thus minimizing, or reducing, contention and maximizing, or increasing, utility of the scarce wireless spectrum.

In some embodiments, an ACK may be transmitted by a receiver taking the following into account:

a. Estimated path/channel loss to corresponding transmitter. E.g. the transmit power-level of the ACK may be adjusted based on this estimate, with higher path loss tending to increase the transmit power-level.

b. Rate used by corresponding transmitter to transmit corresponding data frame. For example, the transmit power-level of the ACK may be adjusted based on this estimate, with a higher rate tending to cause a higher transmit power-level.

c. SEQ-bit (or some other sequence identifier), power-level, rate, etc. used by snooping node when performing channel measurements. For instance, the transmit power-level of the ACK may be adjusted based on this estimate. This may further help the snooping node (e.g. the Channel_Measurement module in the snooping node) perform channel measurements.

In some other embodiments, ACKs may be processes according to the following rules:

d. The Snoop_Next_Frame in Rate_Selector module may snoop DATA and/or ACK (depending on which is available). Depending on whichever is available, snooping of such frames is expected to help estimate the likelihood of the feasibility of a rate in advance.

e. In some embodiments, a DATA frame may not be snooped by a snooping node, but the corresponding ACK may be snooped by the snooping node. If the transmit power-level of the ACK transmitted by a receiver takes the physical-layer rate used by the corresponding transmitter of the DATA frame into account, the following may occur in some embodiments: 1) The snooping node may estimate the physical-layer rate used by the transmitter of the DATA frame from the RSSI/SNR/SINR/CQI of the snooped ACK; and 2) In some embodiments, the snooping node may also need to have a path/channel loss estimate from the transmitter of the ACK frame beforehand. This could be facilitated, for example, via beacon frames, or by inclusion of the absolute transmit power-level in the ACK frame itself.

f. In some embodiments, ACK frames may only contain the MAC address of the corresponding transmitted of the DATA frame. The snooping node may use this information to further improve the accuracy of channel measurements.

g. In some embodiments, ACK frames may be augmented to include the MAC address of the transmitter of the ACK frame and the MAC address of the receiver of the ACK frame. E.g. 802.11n Block ACK and Block ACK Request frames have both MAC addresses. Such augmentations may further improve the accuracy of channel measurements.

In some embodiments, other aspects of signals may serve as the feedback signal indicating feasibility. For instance, nodes may use data frames of two different sizes to facilitate checking of feasibility of a rate in the current wireless environment. If a collision occurs, the same size frame may be sent again. If a collision does not occur, the next data frame sent may use the other size. A first node that is testing the feasibility of a rate may snoop frames from a second node that indicate the size of a first data frame being transmitted by the second node. The first node then may subsequently transmit a second data frame in parallel with a third data frame being transmitted by the second node. After that, the first node may try to snoop frames from the second node that indicate the size of a fourth data frame being transmitted by the second node. If the second data frame from the first node collided with the third data frame from the second node, the fourth data frame transmitted by the second node may be the same size as the third data frame. In particular, if a collision had occurred between the second data frame and the third data frame, the fourth data frame may not be the same size as the first data frame. If no collision had occurred between the second data frame and the third data frame, the fourth data frame may be the same size as the first data frame. As long as the first node can snoop the size of the first data frame and the fourth data frame, in some embodiments, the first node may determine whether a collision occurred between the second data frame and the third data frame. If no collision occurred between the second data frame and the third data frame, the first node may determine that the data rate and transmit power-level that it used for the second data frame is feasible in the current wireless environment.

A third example Channel_Measurement module implementing another channel measurement algorithm (CM3) is described in Table 5 below. The Channel_Measurement module of this embodiment may transmit fresh frames using size FRAME_SIZE_1 bytes and size FRAME_SIZE_2 bytes alternatingly to facilitate efforts by another transmitter to test the feasibility of a given rate in the current wireless environment. If a collision occurs, a frame of the same size as before is retransmitted. Alternating frame size may allow other transmitters to sense stale frames and detect any collisions that they may have been caused in the previous time slots. The other transmitters may snoop the frames, determine the size of the frames, and if the sequence of sizes does not change during a parallel transmission, in response, determine that the parallel transmission cost a collision and was unfeasible. The duration field of the RTS and CTS frames may be calculated based on the size of the following data frame. If the rate used remains the same, the duration is expected to be different for data frames of different sizes. Thus, in this example, the frame size may serve as a sequence indicator that provides feedback. It should be noted that the Get Next RTS Duration or Get Next CTS Duration modules return a −1 if no RTS or CTS is snooped from a nearby node. Potential interferers or vulnerable receivers may not be present when no RTS or CTS is snooped from nearby nodes.

TABLE 5

Algorithm 5 Channel Measurement Algorithm 3 (CM3)

This algorithm uses frames of size FRAME_SIZE_1 bytes and size FRAME_SIZE_2 bytes
alternatingly to test whether rate $r_{new}$ is feasible in the current wireless environment. If a
collision occurs, the same frame is sent again.
Channel_Measurement($r_{new}$, *$p_{new}$)
   oldDuration = Get_Next_RTS_Duration( );
   if oldDuration == −1 then
     oldDuration = Get_Next_CTS_Duration( );
     durationFlag = 1;
   else
     durationFlag = 0;
   end if
   while 1 do
     ourFlow = TX_Frame($r_{new}$, *$p_{new}$);
     if durationFlag == 0 then
       newDuration = Get_Next_RTS_Duration( );
     else
       newDuration = Get_Next_CTS_Duration( );
     end if
     if oldDuration == −1 || newDuration == −1 || newDuration == oldDuration then
       if ourFlow == NO_ACK then
         if *$p_{new}$ == MAX_POWER then
           return 0;
         end if
         *$p_{new}$ = *$p_{new}$ + 1;
       else
         return 1;
       end if
     else
       return 0;
     end if
     oldDuration = newDuration
   end while As shown in Table 5, similar to snooping of ACKs to extract the SEQ-bit in CM2, a node that is testing the feasibility of a rate may use CM3 to snoop either RTS or CTS frames and extracts the duration field in order to synchronize a sequence indicator in memory with the sequence indicator presently used during exchanges between other nodes. After synchronizing the sequence indicator in memory with the sequence indicator used by the other nodes, the node may transmit a data frame in parallel with pre-existing flows. In some embodiments, 802.11 devices may not be able to transmit and receive at the same time. In such embodiments, the device attempting to transmit in parallel may snoop either RTS or CTS frames in subsequent transmissions between the other nodes to detect any collisions that it may have caused during the parallel transmission. The subsequently snooped sequence indicators may be compared with the synchronized sequence indicator stored in memory to determine whether the parallel transmission caused a collision and prevented the sequence indicator from incrementing in the transmissions between the other nodes. CM3 is an extension of CM2 and CM1 that is believed to be more robust in certain scenarios. In some embodiments, ACK, RTS and CTS frames may be robustly modulated using a lower PHY rate and thus can be decoded by relatively distant nodes. In contrast, an ACK may not be received and decoded by all potential interferers, as might occur in a manifestation of the hidden node problem. CM3 is expected to mitigate this problem to some extent by using the larger combined coverage of the RTS and CTS frames.

The present technique is not limited to the use of different frame sizes to indicate sequence. Other properties of the frames may be modified or selected to indicate the sequence of the frames. For example, nodes may encode a sequence indicator in one of the unused bits in the RTS and CTS frames as a SEQ-bit.

The example channel measurement algorithms presented above place most of the burden of identifying feasible rates on transmitters. However, in some embodiments, receivers can aid their transmitters in channel measurement and estimation of rate feasibility. For example, in some embodiments, a transmitter may transmit an RTS signal to its intended receiver, and in response to receipt of the RTS signal, the receiver may determine whether to reply with a CTS based on its own estimate of rate feasibility.

In some embodiments, the receiver may determine whether to reply with a CTS based on its own estimate of rate feasibility with the following steps:

1. Receive RTS at the receiver from the transmitter, e.g., with an indication of the physical-layer rate to be used in the subsequent DATA frame; the length of the subsequent DATA frame; and the transmit power-level to be used in the subsequent DATA frame.

2. The receiver may maintain a history table (e.g. cataloging of feasible rates for transmission/reception in the current wireless environment; cataloging of feasible rates for transmission/reception in the current wireless environment for transmission to and reception from the transmitter in this example; cataloging of estimated rate region for transmission and reception; or cataloging of estimated rate region for transmission to and reception from the transmitter in this example).

3. Based on the received RTS frame and any other indications, the receiver may determine that the subsequent transmission of the DATA frame by the transmitter may or may not be feasible at that instant of time. Feasibility may be determined based on the following: the likelihood of success for the transmitter's transmission; or (i.e., and/or) the likelihood of success for other transmissions that may be occurring at that instant of time in the neighborhood of the receiver.

4. If the receiver determines that the subsequent transmission of the DATA frame by the transmitter may be feasible at that instant of time, in response, the receiver may reply back with a CTS frame to the transmitter. The CTS frame may also include a likelihood value estimated at the receiver (e.g. percentage value representing likelihood of success; percentage value representing likelihood of failure; ratio representing likelihood of success; ratio representing likelihood of failure). On receiving the CTS frame, in response, the transmitter may determine whether to transmit the subsequent DATA frame based on the likelihood value or some other indication.

5. If the receiver determines that the subsequent transmission of the DATA frame by the transmitter may not be feasible at that instant of time, the receiver may not reply back with a CTS frame to the transmitter. In some other embodiments, the receiver may reply back with a CTS frame, indicating that the transmitter's subsequent DATA frame may not be feasible in the current wireless environment. The CTS may also include a likelihood value estimated at the receiver (e.g. percentage value representing likelihood of success; percentage value representing likelihood of failure; ratio representing likelihood of success; ratio representing likelihood of failure). On receiving the CTS frame, transmitter may determine whether to transmit the subsequent DATA frame based on the likelihood value or some other indication.

Such an approach is expected to make channel measuring faster and more accurate than certain other approaches.

In some embodiments, topology estimation may provide a node an approximate indication of where the surrounding nodes are located and how the surrounding nodes are configured. An estimate of the locations of nearby nodes (e.g., nodes with a wireless distance close enough that the nodes may receive a transmission of a data frame) may help the node use the wireless spectrum and other network resources more efficiently. Moreover, in some embodiments, a node may use an estimated topology of the wireless network to predict the feasibility of a physical-layer rate in the current wireless environment.

In some embodiments, the topology of a wireless network may be estimated as follows:

1. The topology of other wireless devices may be estimated at a wireless device using management, control, and data frames received from the other wireless device. For example, beacon frames received from the other wireless devices may be used to estimate their topology relative to the wireless device. Beacon frames may be transmitted by other wireless devices periodically to alert surrounding devices of their presence. In some embodiments, topology estimates may consist of relative distance; relative wireless distance; absolute distance; absolute wireless distance; relative direction; relative wireless direction; absolute direction; absolute wireless direction. In some embodiments, a beacon frame may include the absolute transmit power-level used by the transmitter when transmitting the beacon frame. When the wireless device receives such a beacon frame, based on the indication of the absolute transmit power-level used and the RSSI/SNR/SINR/CQI with which the beacon was received at the receiver, the wireless device may measure the path-loss or channel-loss between the transmitter of the beacon frame and the wireless device. The measured path-loss or channel-loss estimate may then be used as an indication of the relative wireless distance. In some embodiments, the wireless device may have several radio antennas. When the wireless device receives a beacon frame, the wireless device may measure the wireless direction of the transmitter of the beacon frame based on the following: the beam-forming weights used by the transmitter of the beacon frame, which may be used to estimate the relative wireless direction of the transmitter at the wireless device; and the received signal at each of the antennas of the wireless device, which may be based on the parameters used for maximal-ratio-combining at the wireless device when receiving the beacon frame. This may be used to estimate the relative wireless direction of the transmitter at the wireless device. If the absolute orientation of the antennas on the wireless device is known (e.g. in a general-purpose processor (e.g., CPU) in the wireless device; in the computer program product being executed in the wireless device; in the memory of the wireless device), the absolute wireless direction of the transmitter at the wireless device may be obtained using the same mechanisms as were used to obtain the relative wireless direction, e.g., based on the same data.

2. In some embodiments, the wireless device may have an estimate of the topology of nearby nodes. Based on the topology estimate of Wireless_Device_A at the wireless device (e.g. wireless distance of Wireless_Device_A at the wireless device, wireless direction of Wireless_Device_A at the wireless device, RSSI/SNR/SINR/CQI/Beam-Forming-Weights/Maximal-Ratio-Combining-Parameters of frames received from Wireless_Device_A at the wireless device), the wireless device may determine a particular physical-layer rate to be feasible to/from/in-parallel-with Wireless_Device_A at any given instant of time (or in the current wireless environment).

3. If the wireless device determines that a particular physical-layer rate may be feasible to/from/in-parallel-with Wireless_Device_A, the wireless device may take appropriate action. For example, if the wireless device determines that a particular physical-layer rate may be feasible to Wireless_Device_A, the wireless device may, in response, subsequently transmit a data frame (at the physical-layer rate) to Wireless_Device_A. An another example, if the wireless device determines that a particular physical-layer rate may be feasible from Wireless_Device_A, in response, the wireless device may respond with a CTS frame to any RTS frame sent by Wireless_Device_A (effectively allowing Wireless_Device_A to transmit any subsequent data frame at the physical-layer rate). In some embodiments, the wireless device may determine that a particular physical-layer rate may be feasible in-parallel-with Wireless_Device_A's transmission and/or reception, and in response, the wireless device may subsequently transmit a data frame (at the physical-layer rate) in-parallel-with Wireless_Device_A.

4. If the wireless device determines that a particular physical-layer rate may not be feasible to/from/in-parallel-with Wireless_Device_A, in response, the wireless device may take appropriate action. For example, if the wireless device determines that a particular physical-layer rate may not be feasible to Wireless_Device_A, in response, the wireless device may not subsequently transmit a data frame (at the physical-layer rate) to Wireless_Device_A. In another example, if the wireless device determines that a particular physical-layer rate may not be feasible from Wireless_Device_A, in response, the wireless device may not respond with a CTS frame to any RTS frame sent by Wireless_Device_A (effectively disallowing Wireless_Device_A to transmit any subsequent data frame at the physical-layer rate). In some embodiments, if the wireless device determines that a particular physical-layer rate may not be feasible in-parallel-with Wireless_Device_A's transmission and/or reception, and in response, the wireless device may not subsequently transmit a data frame (at the physical-layer rate) in-parallel-with Wireless_Device_A.

Further, in some embodiments of a rate allocation module, the module may select a rate based on a function of the queue-length, and this function may depend on the current topology of nearby nodes and on how often the topology changes, e.g., the rate of change of the topology.

In another embodiment, data frames may be relatively large in size, e.g., larger than 1000 bytes, larger than 1500 bytes, or larger than 2000 bytes. In a wireless network having several wireless devices, the wireless devices may not be configured to receive what the other wireless devices are transmitting at any given time, e.g., due to simultaneous or concurrent transmissions. As a result, in some networks, certain wireless devices may not be capable of detecting collisions until after the wireless devices have transmitted an entire data frame. Further, in embodiments in which data frames are relatively long, the cost of a collision is relatively high. Thus, in some embodiments, smaller frames may be exchanged to reserve some part of the shared wireless medium before transmitting long data frames. Some wireless standards, such as IEEE 802.11, use Request-to-Send (RTS) and Clear-to-Send (CTS) frame exchanges. In some embodiments employing these standards, when a first node needs to transmit a long data frame to a second node, the first node may first transmit an RTS frame to the second node and if the second node receives the RTS and senses no other activity, or substantially no other activity, on the shared channel (e.g., shared wireless medium resources), the second node may respond by transmitting back a CTS frame. The first node may receive the CTS frame, and in response, then transmit the long data frame. In some embodiments, the short frames may be less than $\frac{1}{4}^{th}$ the size of the long frames. Nearby nodes that sense (e.g., snoop) either the RTS or CTS may, in response, wait for the subsequent data frame to be transmitted. Such mechanisms are expected to potentially reduce collisions and mitigate hidden node and exposed node problems, though the present techniques are not limited to systems employing these mechanisms.

Absolutely reserving the wireless spectrum for a single transmission is not a very efficient use of the wireless spectrum. Since wireless spectrum is limited, in other embodiments, spectrum is used more aggressively to get higher performance, e.g., a higher aggregate bit rate. In some embodiments, multiple interfering wireless transmissions occur in parallel without causing collisions. As mentioned above, multiple transmissions may be facilitated in parallel by testing the feasibility of rates using channel measurements. In other words, with the capability of estimating the rate region, nodes of some embodiments may decide whether they can transmit in parallel with the other nodes that are currently transmitting on the same or overlapping resources of the wireless medium. As explained above, a rate region may include combinations of rates, where each combination includes several link rates that are simultaneously feasible. Above, several techniques are described that, in some applications, facilitate efforts by the transmitter to protect its transmissions (e.g. by using jamming frames) or to detect collisions caused by the transmissions (e.g. by snooping frame sizes). In other embodiments, the receiver that receives frames may also facilitate efforts by the transmitter to determine whether a rate is feasible in the current wireless environment.

For example, when wireless devices are using the RTS/CTS frame exchanges described above and similar variants, the receiver may transmit a CTS frame at times other than just when the receiver senses no other transmission. Moreover, in some embodiments, the receiver may not outright reject the RTS from a potential transmitter in response to a sensed transmission on the same or similar wireless resources between other wireless devices. In some embodiments, a receiver may use topology estimation, an estimate of the rate region, and snooping of frames to determine whether the rate the potential transmitter wants to use will be feasible. The rate the potential transmitter wants to use may conveyed with a number of techniques, e.g., the rate may be carried-in/indicated-by the RTS; or the first data frame (for instance using a low physical-layer rate) in a block of data frames may indicate the maximum physical-layer rate the transmitter intends to use in the subsequent data frames; or beacons transmitted by the transmitter may indicate the maximum physical-layer rate the transmitter intends to use in the subsequent inter-beacon time; etc. If the receiver determines the rate that the potential transmitter wants to use is feasible, given any interfering transmissions currently happening, as perceived by the receiver, the receiver may reply to the transmitter with a CTS frame. Using this mechanism does not limit devices to always need exclusive access to the channel or other resources of the wireless medium. As long as the rate being used by the potential transmitter is feasible in the current wireless environment, the parallel transmission may be facilitated. Such assistance from the receiver to do channel measurements helps the potential transmitter to test the feasibility of a rate; it is also expected to facilitate efforts by nodes to make aggressive use of the scarce wireless spectrum, though the present techniques are not limited to embodiments wherein such assistance is provided.

It should be noted that mechanisms other than RTS/CTS frames are contemplated to facilitate channel measurements and to help establish the feasibility of a rate in the current wireless environment. The current wireless environment will be from the context of the device conducting channel measurements. When the transmitter receives assistance from its receiver when conducting channel measurements, the current wireless environment will be for both the transmitter and receiver. In practice, the current wireless environment of the receiver is more important, because the receiver often receives data frames at high physical-layer rates and thus requires a high SINR/CQI. In some embodiments, the current wireless environment of the receiver may be given more weight in the outcome of channel measurements.

In some embodiments, control channel signaling, subcarrier loading, and maximal matching, may be used, either in combination, sub-combination, or separately, to achieve the same or similar end result. For example, in some embodiments, control channel signaling may be used for conveying channel measurement or rate feasibility information. In these embodiments, a first wireless device may use out-of-band (different frequency, different dedicated time-slot, or different code, etc.) signals to indicate feasibility of a physical-layer rate to other wireless devices. At any given instant of time (or in the current wireless environment), in some embodiments, an indication of feasibility may be for transmitted to or received from a second wireless device. Inputs to the Rate Measurement module using control channel signaling may include the following: inputs from the history table; a rate region estimate; a snapshot of current wireless environment; results of channel measurement; a physical-layer rate; a mode (e.g. transmitter or receiver); or any signaling/messages received. In response to this channel measurement information, in some embodiments, a channel measurement module in a transmitting wireless device may determine which of the following control channel signaling to generate: a test transmission at given physical-layer rate; or not to test transmission at given physical-layer rate; etc. In response to the channel measurement information, in some embodiments, a channel measurement module in a receiving wireless device may determine which of the following control channel signaling to generate: allow reception at given physical-layer rate; or disallow reception at given physical-layer rate; etc. Thus, the module may output control channel signaling and any other indications relating to rate feasibility.

Alternatively, or additionally, some embodiments may convey channel measurement or rate feasibility information with sub-carrier loading. For example, a first wireless device may use sub-carrier loading (e.g. transmit a signal on a sub-carrier in an OFDM system) signals to indicate feasibility of a physical-layer rate to other wireless devices. In some embodiments, at any given instant of time (or in the current wireless environment), indications of feasibility could be transmitted to or received from a second wireless device. Some embodiments may convey data from the following sources: a history table; a rate region estimate; a snapshot of current wireless environment; results of channel measurement; a physical-layer rate; a mode (e.g. transmitter or receiver); or any signaling/messages received. In some embodiments, when the wireless device is transmitting, the wireless device may determine to generate the following sub-carrier signaling: test transmission at given physical-layer rate; or not test transmission at given physical-layer rate; etc. Similarly, when the wireless device is transmitting, the wireless device may determine to generate the following sub-carrier signaling: allow reception at given physical-layer rate; or disallow reception at given physical-layer rate; etc. Thus, the wireless device may output control channel signaling and any other indications.

In some embodiments, the wireless device may use iterative maximal matching. In these embodiments, a first wireless device may use iterative maximal matching to improve the estimation of rate feasibility; increase the amount of spatial reuse; or increase the number of parallel/simultaneous transmissions.

These techniques are expected to be advantageous relative to the conventional RTS/CTS frame exchanges because the techniques, in some embodiments, are expected to facilitate more efficient use of the shared wireless spectrum and also to facilitate distributed rate allocation.

In another embodiment, nearby nodes listening to (e.g., snooping) RTS-like or CTS-like frames may gather information about their surrounding wireless environment. RTS is a request by a transmitter to send subsequent data frame (s). CTS is an indication by a receiver to allow the transmitter to send subsequent data frame(s). Thus, RTS-like and CTS-like frames convey similar information. One such scheme of gathering information is expected to be particularly useful. In this embodiment, a first node may see an RTS-like frame as an indication of the strongest interferer when several interfering RTS-like frames are transmitted generally simultaneously by other wireless devices. The strongest interferer may subsequently influence the transmit power-level selected by the first node to communicate with a second node, e.g., the first node may select a transmit power-level based on (e.g., based on at least in part, or based exclusively on) the RTS-like frame received from the strongest interferer. In this embodiment, if the first node requires a high transmit power-level in order to communicate with the second node, then such communication between the first node and the second node may cause relatively high levels of interference for nearby nodes. When several interfering transmissions are occurring generally simultaneously, in parallel, the interfering transmissions may cause excessive interference for nearby nodes and hamper the ability of nearby nodes to send and receive frames. Thus, the first node may use an orthogonal slot, such as a different frequency-band, different time-slot, different code, etc.

On similar lines, a CTS-like frame may be snooped by a potential transmitting device and be considered by the potential transmitting device as an indication of one of the most vulnerable receivers, e.g., wireless devices that are susceptible to collisions caused by parallel transmissions. Nearby nodes may receive the CTS-like frame, store data indicative of the attributes of the CTS-like frame in memory, and recall such information to estimate the rate region and feasibility of rates in the current wireless environment. In some embodiments, CTS-like and ACK-like frames may be transmitted by receivers at a slightly higher power than that used by their transmitters to provide some extra protection from potential interferers. In some embodiments, distributed rate allocation may be based on an estimate of the rate region and an estimate of the feasibility of various rates in order to facilitate multiple interfering simultaneous transmissions, i.e., parallel transmissions. Thus, it is a natural step forward to enhance the meaning of RTS-like and CTS-like frames to mean something more and something different from what they have meant in the prior art. That is, while some of the present techniques use RTS-like and CTS-like frames, such those supported in some existing 802.11 protocols, the frames are used in a unique manner different from their intended purpose to facilitation distributed rate allocation.

The hidden node problem is believed to be one of the biggest problems in current wireless networks. And this problem is expected to get worse as the number of wireless devices grows and decentralized networks and distributed protocols are widely adopted. One description of the hidden node problem is as follows. In an illustrative scenario, there are four nearby nodes, namely a first node, a second node, a third node, and a fourth node. In this scenario, the four nodes are positioned such that the second node can hear transmissions from the first node and the third node. Moreover, the third node can hear transmissions from the second node and the fourth node. However, the first node can only hear the transmissions from the second node. Moreover, the fourth node can only hear the transmissions from the third node. Nodes in such a topology are expected to face severe performance degradation, even when RTS-like and CTS-like frames are used by transmitter nodes and receiver nodes respectively. For example, the first node may transmit data frames to the second node. Before sending a first data frame, the first node may sends a first RTS frame to the second node. The first RTS frame may only be heard by the second node because of the current topology described above. Next, the second node may respond to the first node by transmitting a first CTS frame to the first node. The first CTS frame may be received by the first node and may be snooped by the third node because of the current above-described topology. In response to the first CTS frame, the third node may determine to remain silent, e.g., to not transmit, so that the third node does not cause any interference for the second node. Once the first node receives the first CTS frame, in response, the first node may begin transmission of the first data frame to the second node. Also in the present exemplary scenario, the fourth node may transmit a second RTS frame to the third node. The third node may receive the RTS frame but not respond back with a CTS frame because the third node determined to stay silent while the second node is receiving the first data frame. However, the fourth node may determine, in view of having not receiving a CTS frame from the third node, that a collision has occurred. Moreover, in some examples, the fourth node may respond to the occurrence of a collision by executing an exponential randomized back-off like algorithm, or other algorithm that prompts the fourth node to potentially significantly delay subsequent transmissions, which is expected to further penalize the fourth node unnecessarily. The fourth node may try another time by sending a third RTS frame to the third node. However, the third node may receive this RTS frame and turn down the fourth node for the same reason as before. In this scenario, the fourth node does know the why the third node is not transmitting a CTS frame in response to the RTS frame. The fourth node may assume the worst and keep reducing the frequency with which it tries to send to the third node. The first node on the other hand may transmit a second data frame to the second node soon after transmitting the first data frame (because it may not see any collisions and thus may not be penalized unnecessarily). Unfortunately, the fourth node gets penalized unnecessarily and has no way of determining the best or a good time to send an RTS frame to the third node.

Accordingly, in another embodiment, the third node may transmit a delayed-CTS frame. In the above scenario, when the fourth node transmitted the second RTS frame to the third node, the third node could not immediately send a CTS frame because the third node determined to stay silent so that the third node does not cause interference for the second node. However, once the first data frame is done transmitting (which the third node may estimate from the first CTS frame that was transmitted), the third node may transmit a second delayed-CTS-frame to the fourth node in response. Receipt of the delayed CTS frame may alert the fourth node to an opportunity to transmit a third data frame to the third node (e.g., the fourth node may receive the delayed CTS frame, and in response, transmit the third data frame). The second node may determine to stay silent while the third data frame is being transmitted. Thus the delayed-CTS-like mechanism can be used to mitigate hidden node problems in wireless networks and improve the performance and capacity of wireless networks, though the present techniques are not limited to embodiments in which these mechanisms are employed.

Some of the above embodiments provide for different rates being used from the set of data rates. In another embodiment, a first data rate and a second data rate are associated with the same numerical value of the physical-layer rate. For example, 4-QAM with no channel coding (i.e. 2 bits/symbol) could be numerically the same as 16-QAM with ½ coding rate (4 bits/symbol*½=2 bits/symbol); 4-QAM using 40 MHz bandwidth could be numerically the same as 16-QAM using 20 MHz of bandwidth; etc. In another example, the first data rate and the second data rate may be the result of different modulation schemes, coding rates, spatial streams, guard intervals, and bandwidths. Although numerically equivalent, the first data rate may be more feasible than the second data rate in a certain topology/setting of nodes. For example, the first date rate may be more feasible because it may require lower SINR at receiver to decode. In some embodiments, the physical-layer rate using 4-QAM will require lower SINR at receiver than the one using 16-QAM. Thus, in some embodiments, the choice of data rates may depend on queue-lengths, topology estimation, rate region estimation, rate feasibility estimation, feedback of intended receivers, feedback from nearby nodes, jamming frames, history of successes, etc.

Facilitating interfering wireless transmissions to occur simultaneously is expected to improve the capacity of wireless networks. However, in some wireless networks, such simultaneous transmissions may need to be started at about the same time. In another embodiment, a first node may use a first data rate and a second node may use a second data rate. The second data rate may be twice the first data rate. In some scenarios, the first node and second node may both transmit 1500-byte frames in parallel. The first node may take approximately twice the time to transmit a frame as compared to the second node. Moreover, once the second node has finished transmitting a frame, the second node may wait for the first node to finish transmitting its frame (because, in this example wireless network, simultaneous transmissions may need to be started at about the same time)

before transmitting its next frame. Thus, in this example, the second node has an effective rate that is approximately the same as the first data rate. In some embodiments, mechanisms such as frame aggregation (FA) and transmit opportunity (TXOP) may allow a node to transmit multiple frames in succession. Different FA and TXOP values corresponding to different rates may be used such that all nodes or substantially all nodes transmit for almost the same amount of time, e.g., more than 70%, 90%, or 95% concurrency. In the above example, the second node may transmit two frames (back-to-back) while the first node transmits a single frame, thereby potentially allowing the second node to get an effective rate that is nearly equal to the second data rate.

With an ever increasing number of wireless devices operating over the same medium, a central research challenge is the development of access mechanisms that make optimal use of available resources, which is not to suggest that addressing the problem is the sole objective of the presently described techniques. To this end, multiple access control algorithms have been in the prior art. Of particular importance are random access schemes, as their decentralized and scalable structure has lead to widespread adoption in a variety of radio architectures and standards. Of these random access schemes, a particularly important subclass is the one that incorporates carrier-sensing (e.g. carrier-sense multiple-access (CSMA)) to determine if the medium is available prior to transmission, again which is not to suggest that the present techniques are limited to CSMA networks.

Indeed, CSMA with collision avoidance (CA) has become ubiquitous as it forms the access backbone of popular wireless standards, such as IEEE 802.11 (WiFi), among others. Traditional CSMA-CA implementations are generally strictly collision-averse and typically employ a linear-increase multiplicative decrease algorithm to determine each node's access rates. Such a design, although proven to be practically robust, is fairly conservative in its use of the wireless medium. Furthermore, CSMA also is generally limited to a binary available/not-available information gained through channel sensing, instead of using a more fine-grained measurement of channel state.

Many rate allocation schemes traditionally typically ignore the network dynamics and determine rate as a function of (net) channel interference and noise. In contrast, some of the presently described embodiments support multiple interfering transmissions simultaneously. Information theory teaches that it is essential to combine medium access with rate allocation in order to approach the (best known) rate limits of wireless networks, though the present techniques are not limited to systems that achieve or even target the best know rate limits. Separating the two is often suboptimal—abstracting the network to a graph generally does not capture various rate levels and interference among users, though again, some aspects of the present techniques may be used in systems in which medium access is separated from rate allocation. In a combined analysis, in some implementations, there is no underlying constraint graph, i.e., each transmitter in the system can be simultaneously active although communicating at a low rate.

Furthermore, in one embodiment, the rate allocation and scheduling may be jointly determined to increase the number of simultaneous transmissions in the network, thus increasing overall network throughput. Since there are multiple rates corresponding to every transmitter-receiver pair, and feasibility of a set of rates depends on the received signal-to-interference-and-noise-ratios (SINRs), which is mainly a function of transmit power-levels, network topology and channel variations. Therefore, the allocation of rates and powers in a distributed manner is a complicated problem.

Some prior art solves this problem in a simple and distributed manner, but with a significant performance hit. In particular, some of these algorithms aim at performing sub-optimal orthogonal access, which is performed reasonably well using carrier-sensing sub-routines with stringent thresholds. With this medium access strategy, existing wireless devices usually choose the highest possible rate based on the channel quality and success history. Even though these algorithms are sub-optimal, they are still in wide use due to their simplicity for implementation: a) The medium access is decentralized and is based on simple carrier sensing. b) The rate allocation is performed in a simple greedy manner.

When wireless spectrum is at a premium, many algorithms in the prior art are insufficient due to the sub-optimality in both medium access and rate allocation. These have been topics of research for a long time, but majority of the solutions proposed so far are complicated for widespread implementation. However, some of the presently described techniques are relatively simple and distributed, and throughput-optimal, or throughput-improved, rate allocation (that includes medium access as a special case) may be performed by using local queue-lengths. In addition to introducing a way to vary multiple attempt probabilities corresponding to different transmission rate, certain embodiments use channel measuring to improve throughput.

Channel measuring is expected to be a powerful concept, particularly when performed without much overhead, which is not to suggest that all of the present techniques are limited to systems performing channel measuring. We have already described several examples of different channel measuring algorithms. In some embodiments, the channel measuring algorithms are used by rate allocation modules that utilize local queue-lengths to vary attempt probabilities corresponding to different transmission rates. The chosen rates based on queue-lengths and channel measuring are expected to further constrain the required local transmission power level. In some embodiments, wireless devices selecting rates based on queue-lengths and channel measuring are expected to improve use the wireless spectrum.

Some implementations use spectrum management and transmit power control based on feedback from the receiver enhance spectral efficiency. However, these implementations use the maximum possible rate (given only the current channel conditions and some previous history) without considering utility-based metrics involving queue-lengths. While spectrum management and feedback-based transmit power control are expected to be an improvement, further improvements are expected with a queue-based rate allocator by jointly determining rate allocation and scheduling. Furthermore, in some embodiments, the total network throughput is expected to be enhanced by making aggressive use of the scarce wireless spectrum, though the present techniques may be used for other purposes, such as reducing transmission errors and increasing transmission distance. Certain embodiments also use queue-lengths and quality of service extensions to control the channel access probabilities and further enhance performance and fairness. For example, a wireless device with a longer queue-length may get a longer transmit-opportunity (TXOP). The device may effectively get access to the wireless channel for a longer amount of time because it has a longer queue-length. In some embodiments, TXOP is used as a QoS parameter.

In some embodiments, the total network throughput may be improved by using distributed and throughput-optimal (or throughput-improving) queue-based rate allocation algorithms. Some embodiments use traditional feedback-based transmit power control and then go a step further. These embodiments may constrain the required transmit power-level further based on need by using a queue-based rate allocator. This is expected to enhance spectral efficiency and increase the overall network throughput in the presence of several interfering links. Moreover, some embodiments may use distributed schemes to effectively improve spatial reuse and let queue-lengths control the amount of spatial reuse obtained. These principles may be implemented to enhance total network throughput or to achieve other objectives. Some embodiments may be implemented as co-located infrastructure networks or peer-to-peer networks.

Some embodiments apply distributed rate allocation schemes that are expected to allow wireless networks to operate in ways that were not possible with certain prior art systems. These prior art systems typically require orthogonal access for interfering transmitters and thus reduced the number of potential collisions. However, this prior approach was very conservative and led to inefficient use of the wireless spectrum and lower total network throughput. With an explosion in the number of wireless devices, there is a need in the art for schemes that make efficient use of the available network resources and wireless spectrum. Such schemes could improve the total throughput of wireless networks, though again, it should be noted that the present techniques may be adapted to achieve other objectives.

Some scheduling schemes, such as exponential randomized back-off, generally allow multiple wireless devices to share the same wireless spectrum, though typically not at the same time, e.g. generally not concurrently. However, as discussed above, some prior art uses scheduling schemes, such as randomized back-off, along with conservative on-off scheduling. In one embodiment, randomized back-off is not used, or in other embodiments, generally all random access techniques are not used to determine when a device transmits because devices may share the same or overlapping resources of the wireless medium. However, randomized back-off generally allows several wireless devices to share the wireless in a fair manner. Thus a more elegant way (in addition to the on-off scheduling used by the prior art) to respond to collisions is expected to be complimentary to the presently described distributed rate allocation and channel measuring schemes. A scheduling mechanism is needed that can combine exponential randomized back-off with channel measuring, estimation of local rate feasibility, estimation of rate regions, and estimation of topology, which is not to suggest that the present techniques are limited to systems that provide all of these features.

In another embodiment, each wireless device may choose a randomized back-off counter before transmitting each frame. Before a device transmits a frame, the device may count down its randomized back-off counter at a predetermined, or otherwise determined, rate. Moreover, in some embodiments, the device may only transmit once its randomized back-off counter hits a pre-determined, or otherwise determined, value. In some examples of the prior art, each device that senses a pre-determined amount of interference and noise stops counting down its randomized back-off counter until the interference and noise level falls below the pre-determined level. Such prior approaches can be thought of as on-off scheduling mechanisms. As mentioned above, such scheduling mechanisms are generally expected to lead to conservative and inefficient use of the wireless spectrum and network resources. In contrast, some embodiments include a device that may count down the devices chosen randomized back-off counter at a pre-determined rate as long as the rate (or rates) that it wants to use for the subsequent frames is (are) feasible in the current wireless environment. It should be notes that, in the present embodiment, as soon as a device's randomized back-off counter reaches zero, the device may transmit a frame. The wireless environment may change relatively rapidly as different devices start or stop transmitting frames. Therefore, constant or periodic monitoring of the wireless environment (e.g. through carrier sensing, snooping of frames, subcarrier loading, maximal matching, analyzing jamming frames, etc.) is performed in some embodiments, and in certain embodiments, the randomized back-off counter may only be counted down if the rate (or rates) to be used for transmitting subsequent frames will be feasible in the current wireless environment. Embodiments executing such a scheduling scheme are expected to gain from both the aggressiveness of distributed rate allocation and the fairness of the exponential randomized back-off algorithm. Moreover, several interfering transmissions may be facilitated in parallel to potentially improve spectral efficiency and total network throughput. Furthermore, in some embodiments, transmissions do not need to overlap perfectly with one another for the following reasons. A wireless device may count down its randomized back-off counter if the physical-layer rate (to be used by the wireless device for transmitting subsequent data frames) is feasible in the current wireless environment. Thus, the wireless device may be able to start transmitting a data frame in the middle of other transmissions. Consequently, in such embodiments, parallel transmissions may be facilitated even when they don't begin at the same instant of time (e.g. in the same mini-slot-time, within the same inter-frame-spacing period, etc.). Thus, in some embodiments, overall performance of the network is expected to be enhanced even when parallel transmissions do not overlap perfectly with one another.

The scheduling scheme mentioned above may be implemented in several ways. In one embodiment, a first wireless device may be ready to transmit frames to a second wireless device. Before transmitting the frames, the first wireless device may obtain an estimate of the topology of nodes near the first wireless device, estimate of the first wireless device's rate region, estimate of the second wireless device's rate region, estimate of the topology of nodes near the second wireless device, feedback from the second wireless device, feedback from other nearby wireless devices, and estimate of feasibility of rate (or rates) that the first wireless device wants to use for transmitting subsequent frames to the second wireless device. In this embodiment, the first wireless device may use these estimates to predict or estimate whether the rate (or rates) that the first wireless device is planning to use for subsequent frames is (are) feasible in the current wireless environment, e.g., feasibility may be determined based on these factors using one or more of the above-described techniques. Moreover, the first wireless device may determine a dynamic carrier-sensing threshold that could then be used to determine whether the randomized back-off counter should be counted down (e.g., decremented, or in other embodiments, incremented) based on these estimates. Such a dynamic carrier-sensing threshold could be updated periodically along with the other estimates. In some embodiments, the decision to count down the randomized back-off counter may also be based on periodic carrier-sensing by the first wireless device. For example, the near instantaneous value(s) obtained from carrier-sensing could then be used to compare with the dynamic carrier-sensing threshold, and based on the comparison the first wireless device could decide whether to count down its chosen randomized back-off counter at any given instant of time. In some embodiments, in order to decide whether to count down the randomized back-off counter at any instant of time (e.g. in a mini-slot time), a wireless device may need to query information (e.g. estimate of the topologies of other nearby wireless devices; estimate of the wireless device's rate region; cataloging of rate feasibility feedback from other nearby wireless devices; etc.) from the Rate_Allocator, Rate_Selector, and Channel_Measurement modules. Querying such information may considerably increase the complexity. Moreover, it may not be possible for the wireless device to make its decision (e.g. whether to count down the randomized back-off counter at that instant of time) quickly enough. On the other hand, the dynamic carrier-sensing threshold maintained by the wireless device may be only roughly based on some relevant information (e.g. estimate of the topologies of other nearby wireless devices; estimate of the wireless device's rate region; cataloging of any rate feasibility feedback from other nearby wireless devices; etc.). Thus, the calculation of the dynamic carrier-sensing threshold maintained by the wireless device may be optimized for speed. Furthermore, the decision to count down the randomized back-off counter at any instant of time may be based on a single comparison between the dynamic carrier-sensing threshold and the instantaneous carrier-sensing value. Thus, the decision-making complexity may be reduced at the wireless device by using the dynamic carrier-sensing threshold. Moreover, an error margin may be built into the dynamic carrier-sensing threshold to further improve its reliability.

In some embodiments, wireless devices may use channel measurement algorithms to test the feasibility of various physical-layer rates in the current wireless environment. A wireless device may estimate the feasibility of physical-layer rates in several ways (e.g. on its own; with assistance from other nearby wireless devices; etc.). Moreover, if the wireless device has multiple radios (e.g. radio interfaces; wireless interfaces; etc.) that may operate in multiple spectrum bands, channel measurement algorithms may need to take other characteristics into account (e.g. frequency dependent propagation characteristics; spatial variation of the quality of spectrum; multi-band multi-radio scheduling constraints; interference constraints in every band; RSSI/SNR/SINR/CQI constraints for each band and/or each radio; radio constraints for each radio; architecture of each radio; etc.).

Figure 11A:
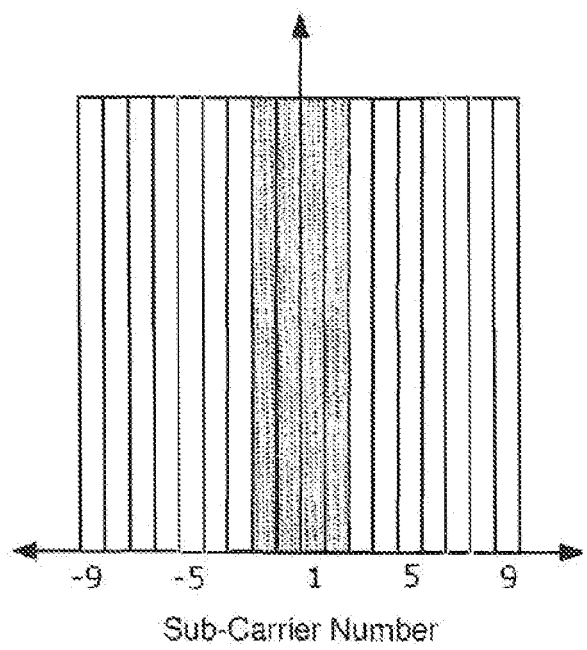
FIGS. 11A and B are diagrams of full duplex wireless communication.
Figure 11B:
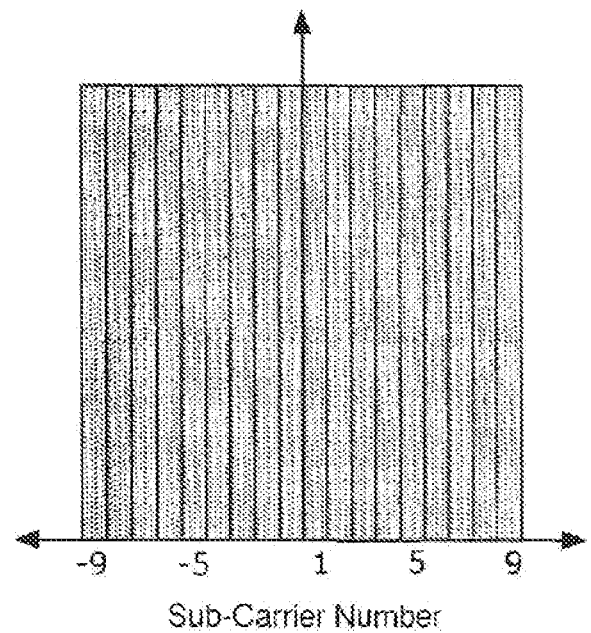

In some embodiments, wireless devices may use channel measurement algorithms to test the feasibility of various physical-layer rates in the current wireless environment. The wireless devices may estimate the feasibility of physical-layer rates in several ways (e.g. on their own; with assistance from other nearby wireless devices; etc.). Full-duplex radios can transmit and receive at the same time in the same frequency band. If the wireless devices have full-duplex capability, channel measurement algorithms may become more accurate. Using full-duplex capabilities, the wireless devices may provide assistance to and receive assistance from other nearby wireless devices when estimating the feasibility of physical-layer rates. For example, a transmitter may suspend transmission of a first frame if it receives a second frame (i.e. while transmitting the first frame) that it did not account for when estimating physical-layer rate feasibility. The transmitter may reassess the feasibility of its physical-layer rate by taking the received second frame (and/or other new information) into account. In another example, a receiver may simultaneously transmit a first frame (or signal) in the same frequency band in which it is receiving a second frame. The first frame may contain digital (e.g. bits or bytes) signaling (for example, the digital signaling may be indicative of: the physical-layer rate corresponding to the second frame; the RSSI/RCPI/SNR/SINR/CQI at the receiver corresponding to the second frame; the length of the second frame; the absolute transmit power-level being used by the transmitter of the second frame; the schedule corresponding to the second frame; etc.) that may be used by other nearby nodes to perform channel measurements and/or establish rate feasibility. The first frame may contain analog (e.g. phase, amplitude, or frequency modulation) signaling (for example, the analog signaling may be indicative of: the physical-layer rate corresponding to the second frame; the RSSI/RCPI/SNR/SINR/CQI at the receiver corresponding to the second frame; the length of the second frame; the absolute transmit power-level being used by the transmitter of the second frame; the schedule corresponding to the second frame; etc.) that may be used by other nearby nodes to perform channel measurements and/or establish rate feasibility. FIG. 11A is a generalized diagrammatic view of an example OFDM wireless transmission by a wireless terminal in accordance with an embodiment of the presently described technique. As shown in FIG. 11A, the first frame may occupy only a few sub-carriers (shaded in FIG. 11A) in the frequency band on which the second frame is being received, e.g., less than 20% of the available sub carriers, less than 50%, or less than 70%. FIG. 11B is a generalized diagrammatic view of an example OFDM wireless transmission by a wireless terminal in accordance with an embodiment of the presently described technique. As shown in FIG. 11B, the first frame may occupy the entire frequency band (shaded in FIG. 11B) on which the second frame is being received. Other embodiments may have more or fewer than the illustrated number of sub-carriers. Other nearby nodes that sense/snoop/receive the first frame may use the first frame (along with the Rate_Allocator, Rate_Selector, and/or Channel_Measurement modules) to perform channel measurements and/or establish rate feasibility.

In another embodiment, a wireless device may schedule a first type of frames using a first schedule and a second type of frames using a second schedule. If the first schedule and the second schedule differ, the combination of the first schedule and the second schedule could be called an asymmetric schedule. In some embodiments, the first type of frames may consist of downlink frames and the second type of frames may consist of uplink frames. FIG. 12A-D a generalized diagrammatic view of an example of schedules for wireless transmissions by wireless terminals in accordance with an embodiment of the presently described technique. In this embodiment, the schedule 1202 (FIG. 12A) is based on a contention resolution mechanism known as exponential randomized back-off (ERB) that is used by some random-access wireless networks, such as IEEE 802.11 networks. Timeline 1204 shows the progression of time. Previous frame 1206 could be a data, control, or management frame. A distributed-IFS (DIFS) 1208 may separate the previous frame and the first mini-slot 1210 in this example. Further, in this embodiment, each mini-slot is mini-slot-time (MST) long. When a wireless device needs to transmit a frame on the wireless channel, in accordance with the schedule 1202, it may choose a random (e.g., a pseudo-random function) counter and counts it down each time MST elapses. In some embodiments, a wireless device may only count down its counter when it perceives the wireless channel to be available or clear. The illustrated schedule 1202 is symmetric between downlink and uplink, as the distribution of potential IFS duration slots is generally equal between the two directions, e.g., there is an equal chance that any one of the IFS duration slots will be selected for uplink or downlink traffic.

Figure 12A:
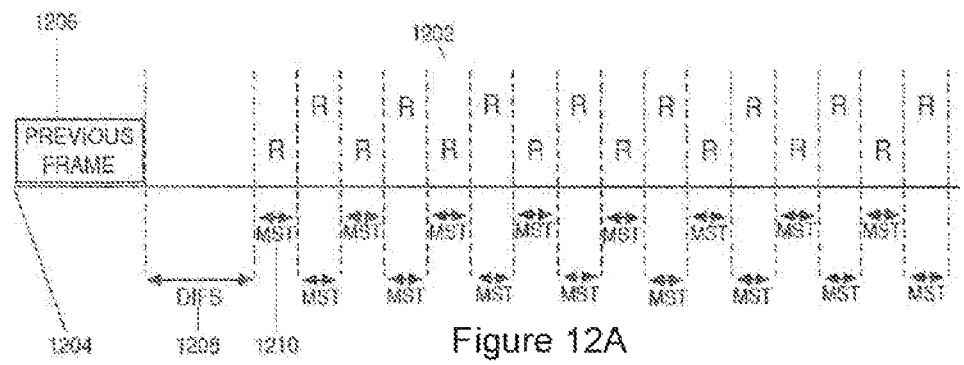
FIGS. 12A-D are diagrams of a deterministic schedules for distributed scheduling of wireless networks.
Figure 12B:
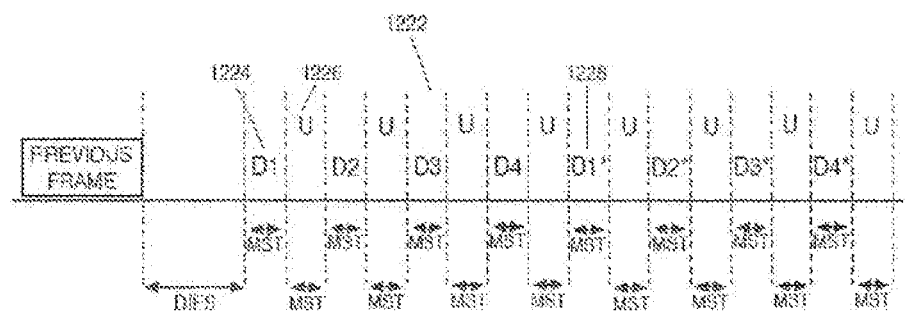
Figure 12C:
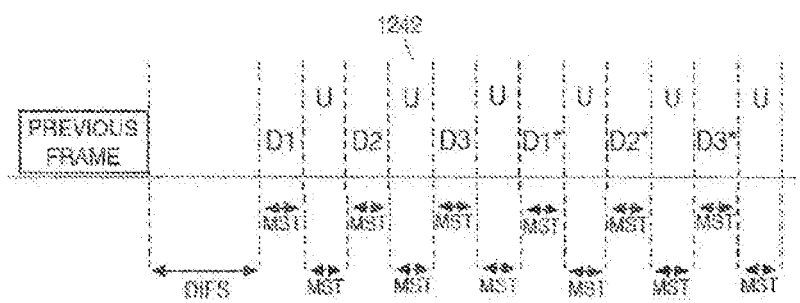
Figure 12D:
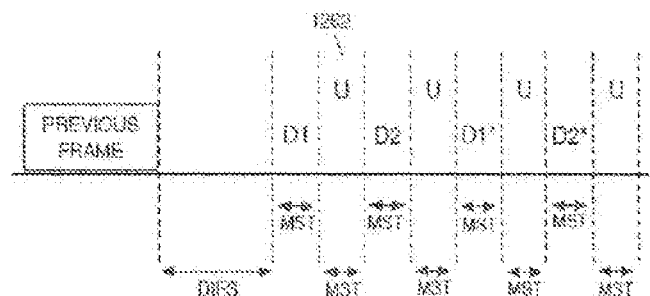
Figure 13:
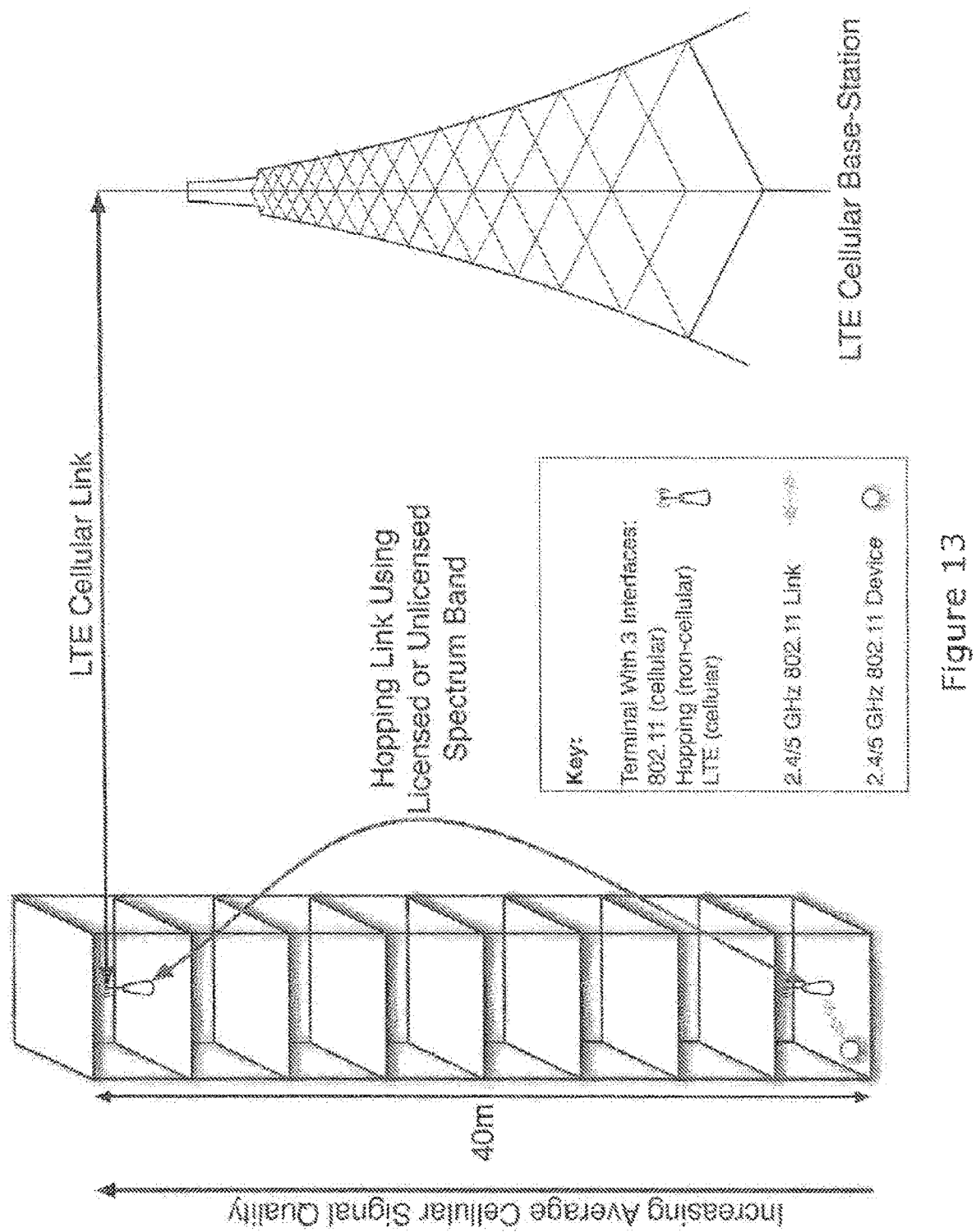
FIG. 13 depicts a multi-interface multi-hop network.
Figure 14A:
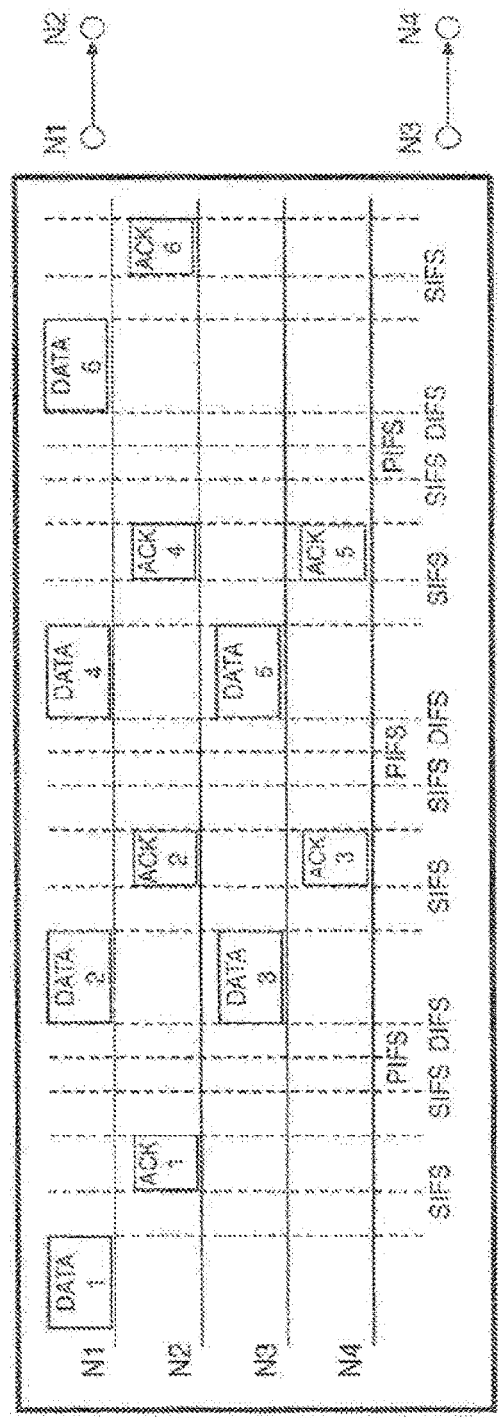
Figure 14B:
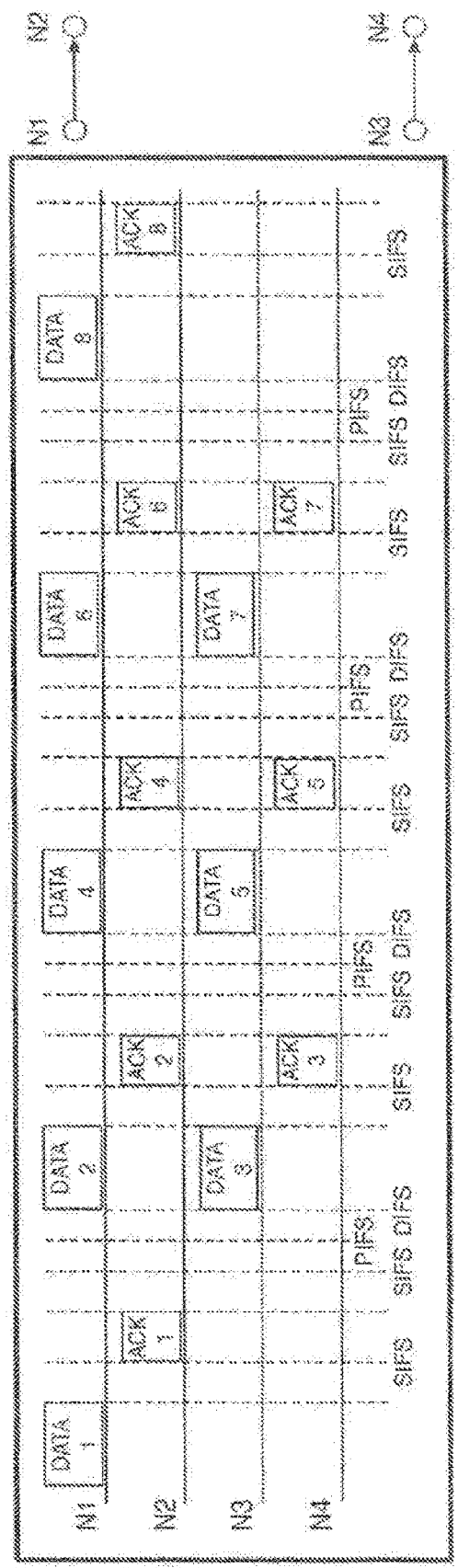
Figure 15A:
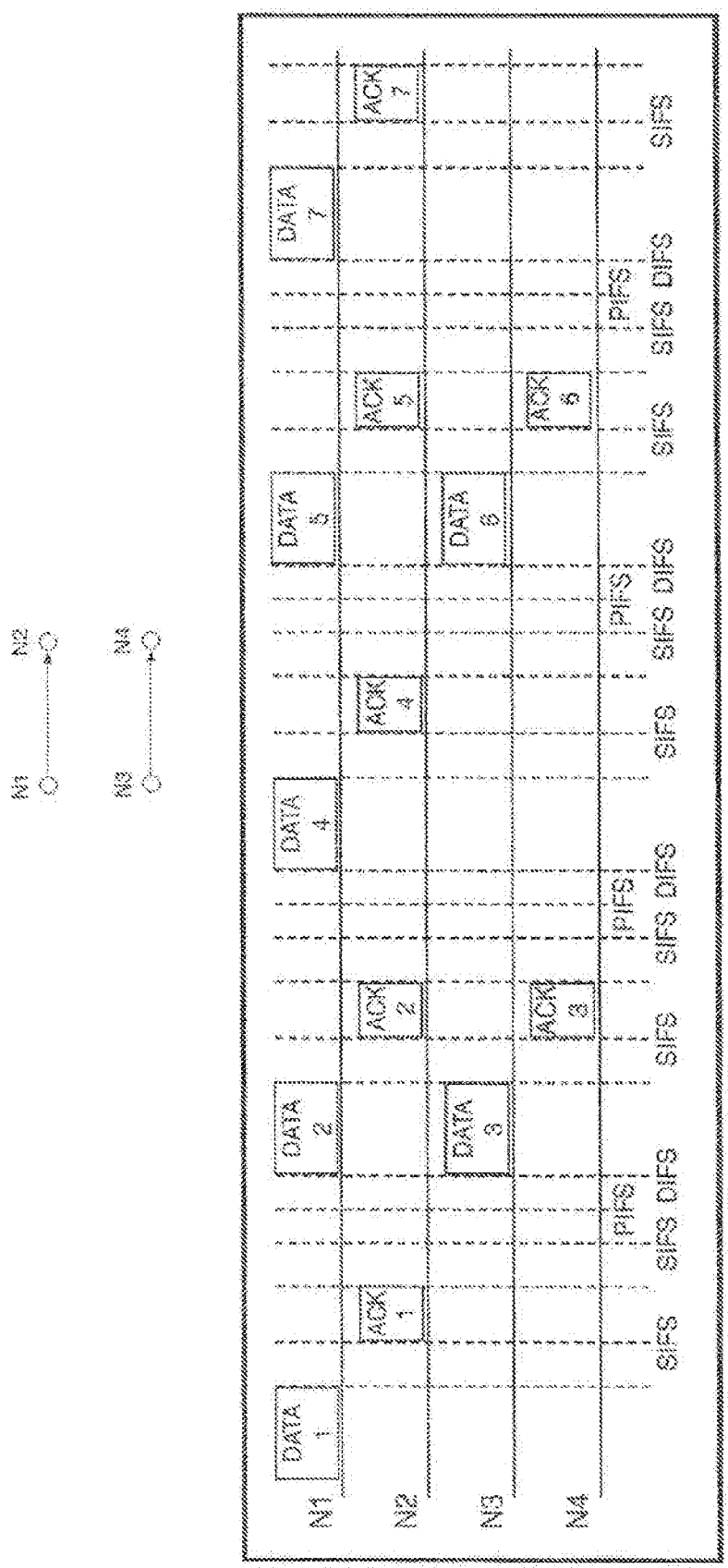
Figure 15B:
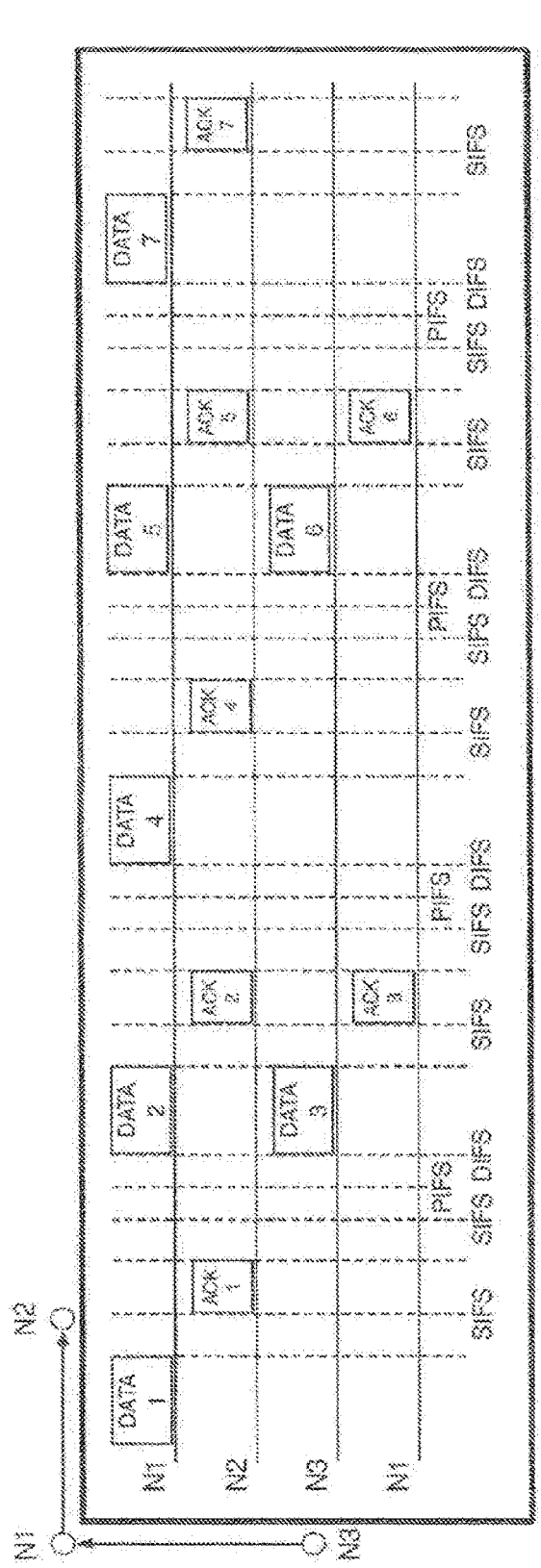
Figure 15C:
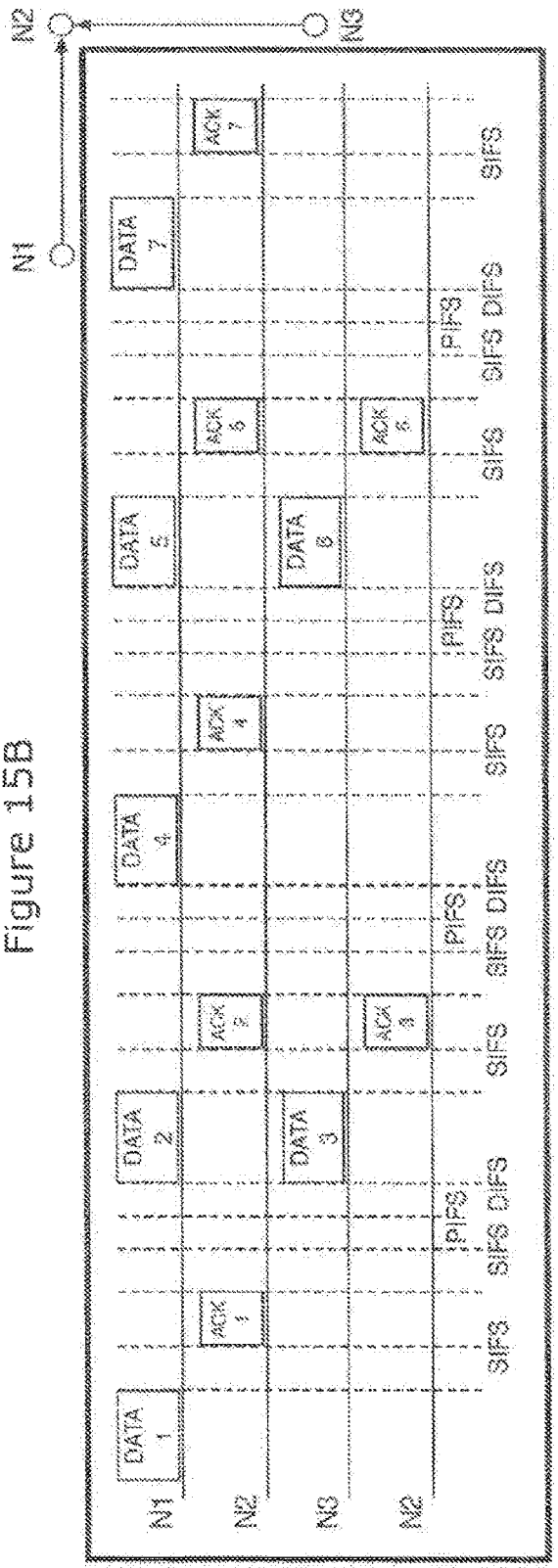

In contrast to schedule 1202, schedule 1222 of FIG. 12B is asymmetric and may be used, e.g., by a scheduler, to schedule different data in different ways. First mini-slot 1224 may be reserved for a first downlink transmitter (e.g., an access point in a single-hop network; a first subset of access-points in a single-hop network; a relay in a multi-hop network; a first subset of relays in a multi-hop network; a wireless device; a first subset of wireless devices; etc.). Second mini-slot 1226 may be available for any wireless device to use. Thus, in this example, every odd mini-slot is reserved for one or more transmitters of downlink frames. This is believed to allow for various transmitters of downlink frames to use a more deterministic schedule, as explained further below. However, in some systems, any wireless device can access the channel in every even mini-slot. To resolve contentions and collisions, wireless devices could use ERB to select among the even IFS duration slots. This, in certain applications, is believed to make wireless devices transmitting in even mini-slots to have a randomized or pseudo random schedule. For instance, wireless devices could use the even mini-slots to transmit uplink frames. In other embodiments, instead of differentiating traffic based on uplink and downlink directions, traffic may be differentiated based quantity, importance, desired quality-of-service, surrounding wireless environment, network congestion, network condition, queue-lengths, and throughput.

It should be noted that mini-slot 1224 is labeled D1 and mini-slot 1228 is labeled D1*. In this embodiment, the * indicates that D1* is an extra slot for the downlink transmitter that uses D1. One way to facilitate fairness between transmitters of downlink frames is to require the following allocation of traffic between D1 and D1* (or Dx and Dx*, where x is an integer). After using mini-slot D1, the first downlink transmitter may either wait for the current round of downlink transmitters to finish or use D1*. Since D1* comes after D4, the downlink transmitter corresponding to D4 is able to get access to the wireless in a fair manner, e.g., the wireless device using D1 does not always have an opportunity to preempt those using D2-D4. Moreover, in this embodiment, the overhead of a few MSTs to facilitate this fairness coexistence is not expected to hurt the performance much. If in this embodiment the first downlink transmitter uses D1*, that first wireless device may not use D1 in the next round for downlink transmitters. Thus, in this example, the first downlink transmitter is relatively fair to other downlink transmitter. Once an extra downlink mini-slot (marked with a *) is used by a wireless device, other wireless devices may assume that the current round of downlink transmissions is over and the next round is about to begin. In the next round, wireless devices can use their normal downlink slots (i.e. slots without a *) to transmit frames.

Schedules 1242 and 1262 are other asymmetric schedules that can also be used. The schedules 1242 and 1262 differ from schedule 1222 in that the number of slots available for downlink transmissions is reduced. Schedules 1242 and 1262 may, for example, be used when relatively few wireless devices (or relatively few subsets of wireless devices) are transmitting downlink data on the same wireless channel. In some embodiments, if wireless devices converge to schedule 1262 by organizing themselves into two subsets of downlink transmitters, they may achieve high performance and spectral efficiency.

In some embodiments, wireless devices may use asymmetric schedules in conjunction with the Rate_Allocator, Rate_Selector, and Channel_Measurement modules. This is expected to improve the performance and spectral efficiency of the system of wireless devices. In some embodiments, uplink traffic may be scheduled using ERB in an uplink mini-slot. In contrast, downlink traffic may be scheduled using deterministic downlink mini-slots. Downlink transmitters that decide to use the same downlink mini-slot may transmit frames in parallel. Such downlink transmitters may further use the Rate_Allocator, Rate_Selector, and Channel_Measurement modules to choose the downlink mini-slot.

For example, a first subset of downlink transmitters may use the information (e.g. estimate of the topologies of other nearby wireless devices; estimate of the wireless device's rate region; cataloging of rate feasibility feedback from other nearby wireless devices; etc.) gathered by the Rate_Allocator, Rate_Selector, and Channel_Measurement modules when deciding whether to use the first downlink mini-slot. Furthermore, the physical-layer rates used by the first subset of downlink transmitters downlink transmitters may depend on the outcome of the Rate_Allocator, Rate_Selector, and Channel_Measurement modules executing inside each downlink transmitter. In this example, the first subset of downlink transmitters is expected to often converge to more aggressive asymmetric schedules (e.g. schedules 1222 (FIG. 12B), 1242 (FIG. 12C), or 1262 (FIG. 12D)).

In other embodiments, downlink transmitters may initiate contention-free-periods in their downlink mini-slots. This may allow several downlink transmitters to hold contention-free-periods (e.g. in-parallel or not-in-parallel) without severely degrading the performance of the overall network.

Some aspects of the present techniques may be better understood with reference to the following list of features. From the foregoing it can be seen that the present invention provides a method for improving the capacity of a multi-nodal wireless communication network. The method comprises enabling two or more links between three or more nodes; associating a set of data rates with each of said two or more links, wherein a rate of transmission of data on a link is chosen from the set of data rates, and wherein the set of data rates includes a data rate of zero; associating queue lengths with each of said links, wherein the queue length of a link represents a count of a number of outstanding data packets assigned for transmission on that link; determining at a first node, a first data rate from the set of data rates for an associated first link, based on the queue length of the first link; sensing at the first node, a link activity for the first link; and if the link activity permits, transmitting outstanding data packets on the first link at a data rate less than or equal to the first data rate, such that the multi-nodal communication network is stable, in that the queue lengths associated with the links in the multi-nodal communication network remain below a specified maximum queue length value for each link.

The foregoing method may also further comprise determining at the first node, a transmission power for the first link, based on the queue length of the first link with the above described method, the transmission data rate is based on a combination of modulation schemes, coding rates, spatial streams, guard intervals, and bandwidths.

The above described method may also further comprise coupling the first link formed between the first node and a second node, with a second link formed between the second node and a third node, and determining a rate of transmission of data on the first link based on a difference between the queue length of the second link and the queue length of the first link.

The present invention also provides a wireless device, comprising a memory unit for storing a computer program improving the capacity of a multi-nodal wireless communication network; and a controller coupled to said memory unit, wherein said controller, responsive to said computer program, comprises circuitry for enabling two or more links between three or more nodes circuitry for associating a set of data rates with each of said two or more links, wherein a rate of transmission of data on a link is chosen from the set of data rates, and wherein the set of data rates includes a data rate of zero; circuitry for associating queue lengths with each of said links, wherein the queue length of a link represents a count of a number of outstanding data packets assigned for transmission on that link; circuitry for determining at a first node, a first data rate from the set of data rates for an associated first link, based on the queue length of the first link; circuitry for sensing at the first node, a link activity for the first link; and if the link activity permits, circuitry for transmitting outstanding data packets on the first link at a data rate less than or equal to the first data rate, such that the multi-nodal communication network is stable, in that the queue lengths associated with the links in the multi-nodal communication network remain below a specified maximum queue length value for each link.

The wireless device controller further may comprise circuitry for determining at the first node, a transmission power for the first link, based on the queue length of the first link.

The wireless device controller further may comprise circuitry for basing the transmission data rate on modulation schemes, coding rates, spatial streams, guard intervals, and bandwidths.

The wireless device controller further may comprise circuitry for coupling the first link formed between the first node and a second node, with a second link formed between the second node and a third node, and determining a rate of transmission of data on the first link based on a difference between the queue length of the second link and the queue length of the first link.

The present invention further provides computer program product embodied in a computer readable storage medium for improving the capacity of a multi-nodal wireless communication network. The computer program product comprises the programming instructions for enabling two or more links between three or more nodes; associating a set of data rates with each of said two or more links, wherein a rate of transmission of data on a link is chosen from the set of data rates, and wherein the set of data rates includes a data rate of zero; associating queue lengths with each of said links, wherein the queue length of a link represents a count of a number of outstanding data packets assigned for transmission on that link; determining at a first node, a first data rate from the set of data rates for an associated first link, based on the queue length of the first link; sensing at the first node, a link activity for the first link; and if the link activity permits, transmitting outstanding data packets on the first link at a data rate less than or equal to the first data rate, such that the multi-nodal communication network is stable, in that the queue lengths associated with the links in the multi-nodal communication network remain below a specified maximum queue length value for each link.

The computer program product further may comprise programming instructions for determining at the first node, a transmission power for the first link, based on the queue length of the first link. The computer program product further may comprise programming instructions for basing the transmission data rate on modulation schemes, coding rates, spatial streams, guard intervals, and bandwidths. The computer program product further may also comprise coupling the first link formed between the first node and a second node, with a second link formed between the second node and a third node, and determining a rate of transmission of data on the first link based on a difference between the queue length of the second link and the queue length of the first link.

Although the method, wireless device and computer program product are described in connection with several embodiments, it is not intended to be limited to the specific forms set forth herein, but on the contrary, it is intended to cover such alternatives, modifications and equivalents, including those as can be reasonably included within the spirit and scope of the invention as defined by the appended claims.

Although the method, wireless device and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method of relaying data on a multi-hop network, the method comprising:
relaying, with at least a first node of a plurality of nodes in a multi-hop network, data between a cellular base station and at least one cellular device via at least a first wireless communications channel and a second wireless communications channel, wherein the cellular base station controls transmission of the data over the first wireless communications channel that is between the cellular base station and the first node, wherein the first wireless communications channel is a cellular communications channel in accordance with a cellular technology standard, wherein the second wireless communications channel is between the first node and the at least one cellular device, and wherein the data is transmitted over the second wireless communications channel without involvement of the cellular base station;
obtaining a measurement associated with operation of the first node;
directing, with the cellular base station, the at least one cellular device to connect to a second node via at least a third wireless communications channel based at least in part on the measurement associated with the operation of the first node, wherein second data is transmitted over the third wireless communications channel without involvement of the cellular base station;
encrypting third data with a security key associated with the second node to create encrypted third data;
transmitting the encrypted third data from the second node to the cellular base station over at least a fourth wireless communications channel; and
relaying, with the second node, the second data between the cellular base station and the at least one cellular device via at least the third wireless communications channel and the fourth wireless communications channel, wherein the fourth wireless communications channel is between the second node and the cellular base station, and wherein the cellular base station controls transmission of the second data over the fourth wireless communications channel.

2. The method of claim 1 wherein the measurement associated with the operation of the first node is associated with a data rate of the first node.

3. The method of claim 2 wherein the data rate is determined based at least in part on a queue length associated with the first node.

4. The method of claim 1 wherein directing the at least one cellular device to connect to a second node is based at least in part on a control channel signal.

5. The method of claim 1 further comprising determining one or more transmission time slots for data packets associated with the data relayed by the second node.

6. The method of claim 1 further comprising directing, with the first node, the at least one cellular device to connect to the second node based at least in part on the measurement associated with the operation of the first node.

7. The method of claim 1 wherein the measurement associated with the operation of the first node is associated with the first wireless communications channel.

8. The method of claim 1 wherein the measurement associated with the operation of the first node is associated with the second wireless communications channel.

9. The method of claim 1 wherein a third node is in communication with the first node via the second wireless communications channel, and the third node is in communication with the at least one cellular device via at least a fifth wireless communications channel.

10. A computer program comprising non-transitory computer readable storage storing instructions that, when executed, cause the method of claim 1 to be performed.

11. A system that relays data on a multi-hop network, the system comprising:
a first node that relays data between a cellular base station and at least one cellular device via at least a first wireless communications channel and a second wireless communications channel, wherein the first wireless communications channel is a cellular communications channel in accordance with a cellular technology standard, wherein the first wireless communications channel is between the cellular base station and the first node, wherein the cellular base station controls transmission of the data over the first wireless communications channel, wherein the second wireless communications channel is between the first node and the at least one cellular device, and wherein the data is transmitted over the second wireless communications channel without involvement of the cellular base station; and
a second node that connects to the at least one cellular device via at least a third wireless communications channel in response to direction from the cellular base station that is based at least in part on a measurement associated with operation of the first node, wherein second data is transmitted over the third wireless communications channel without involvement of the cellular base station, wherein the second node relays the second data between the cellular base station and the at least one cellular device via at least the third wireless communications channel and a fourth wireless communications channel, wherein the fourth wireless communications channel is between the second node and the cellular base station, wherein the cellular base station controls transmission of the second data over the fourth wireless communications channel, wherein the second node encrypts third data with a security key associated with the second node to create encrypted third data, and wherein the second node transmits the encrypted third data to the cellular base station over at least the fourth wireless communications channel.

12. The system of claim 11 wherein the second node connects to the at least one cellular device based at least in part on a control channel signal.

13. The system of claim 11 wherein the first node directs the at least one cellular device to connect to the second node based at least in part on the measurement associated with the operation of the first node.

14. The system of claim 11 wherein the measurement associated with the operation of the first node is associated with the first wireless communications channel.

15. The system of claim 11 wherein the measurement associated with the operation of the first node is associated with the second wireless communications channel.

16. A communications system comprising:
at least one cellular base station comprising memory;
a first node that relays data between the at least one cellular base station and at least one cellular device via at least a first wireless communications channel and a second wireless communications channel; and
a second node;
wherein the first wireless communications channel is a cellular communications channel in accordance with a cellular technology standard;
wherein the first wireless communications channel is between the at least one cellular base station and the first node;
wherein the at least one cellular base station controls transmission of the data over the first wireless communications channel;
wherein the second wireless communications channel is between the first node and the at least one cellular device;
wherein the data is transmitted over the second wireless communications channel without involvement of the at least one cellular base station;
wherein the memory stores a measurement associated with operation of the first node;
wherein the at least one cellular base station directs the at least one cellular device to connect to a second node via at least a third wireless communications channel based at least in part on the measurement associated with the operation of the first node;
wherein second data is transmitted over the third wireless communications channel without involvement of the at least one cellular base station;
wherein the second node relays the second data between the at least one cellular base station and the at least one cellular device via at least the third wireless communications channel and a fourth wireless communications channel, and the fourth wireless communications channel is between the second node and the at least one cellular base station;
wherein the at least one cellular base station controls transmission of the second data over the fourth wireless communications channel;
wherein the second node encrypts third data with a security key associated with the second node to create encrypted third data; and
wherein the second node transmits the encrypted third data to the at least one cellular base station over at least the fourth wireless communications channel.

17. The communications system of claim 16 wherein directing the at least one cellular device to connect to the second node is based at least in part on a control channel signal.

18. The communications system of claim 16 wherein the first node directs the at least one cellular device to connect to the second node based at least in part on the measurement associated with the operation of the first node.

19. The communications system of claim 16 wherein the measurement associated with the operation of the first node is associated with the first wireless communications channel.

20. The communications system of claim 16 wherein the measurement associated with the operation of the first node is associated with the second wireless communications channel.

21. The communications system of claim 16 wherein the at least one cellular base station is configured to wirelessly communicate according to a Long Term Evolution (LTE) standard.

22. The communications system of claim 16 wherein the second node comprises a rate allocator configured to select a physical-layer rate of transmission of the second data from the second node.

\* \* \* \* \*